United States Patent
Zhou et al.

(10) Patent No.: US 11,463,204 B2
(45) Date of Patent: Oct. 4, 2022

(54) METHOD AND APPARATUS FOR SIDELINK TRANSMISSION IN A WIRELESS COMMUNICATION SYSTEM

(71) Applicant: Samsung Electronics Co., Ltd., Suwon-si (KR)

(72) Inventors: Miao Zhou, Beijing (CN); Min Wu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/937,525

(22) Filed: Jul. 23, 2020

(65) Prior Publication Data

US 2021/0028891 A1   Jan. 28, 2021

(30) Foreign Application Priority Data

Jul. 23, 2019  (CN) .......................... 201910667674.X
Aug. 15, 2019 (CN) .......................... 201910755298.X
(Continued)

(51) Int. Cl.
*H04W 4/00*     (2018.01)
*H04L 1/18*     (2006.01)
(Continued)

(52) U.S. Cl.
CPC .......... *H04L 1/1819* (2013.01); *H04L 5/0055* (2013.01); *H04W 4/40* (2018.02);
(Continued)

(58) Field of Classification Search
None
See application file for complete search history.

(56) References Cited

U.S. PATENT DOCUMENTS

2019/0174530 A1    6/2019  Kim et al.
2020/0267597 A1*   8/2020  Huang ................. H04L 1/1812

FOREIGN PATENT DOCUMENTS

EP          3444990 A1    2/2019
EP          3897056 A1    10/2021
WO       2020251237 A1    12/2020

OTHER PUBLICATIONS

International Search Report and Written Opinion of the International Searching Authority in connection with International Application No. PCT/KR2020/009735 dated Oct. 27, 2020, 9 pages.

(Continued)

*Primary Examiner* — Zewdu A Beyen

(57) ABSTRACT

In an exemplary embodiment, a method performed by a first User equipment (UE) in a wireless system is provided. The method comprises transmitting, to a second UE, a sidelink data through a physical sidelink shared channel (PSSCH), identifying whether a hybrid automatic repeat request acknowledgement (HARQ-ACK) information in response to the PSSCH is received through a physical sidelink feedback channel (PSFCH) from the second UE, generating HARQ-ACK report information based on the identified result related to the HARQ-ACK information and transmitting, to a base station (BS), the HARQ-ACK report information through a physical uplink control channel (PUCCH) in a first slot.

20 Claims, 8 Drawing Sheets

(30) Foreign Application Priority Data

Oct. 15, 2019 (CN) .......................... 201910979390.4
Nov. 7, 2019 (CN) .......................... 201911084071.3
Feb. 13, 2020 (CN) .......................... 202010091299.1

(51) Int. Cl.

| | |
|---|---|
| H04L 5/00 | (2006.01) |
| H04W 72/04 | (2009.01) |
| H04W 72/14 | (2009.01) |
| H04W 4/40 | (2018.01) |
| H04W 92/18 | (2009.01) |

(52) U.S. Cl.

CPC ..... *H04W 72/042* (2013.01); *H04W 72/0446* (2013.01); *H04W 72/14* (2013.01); *H04W 92/18* (2013.01)

(56) References Cited

OTHER PUBLICATIONS

Huawei et al., "Sidelink physical layer procedures for NR V2X," R1-1906008, 3GPP TSG RAN WG1 Meeting #97, Reno, USA, May 13-17, 2019, 23 pages.
LG Electronics, "Discussion on physical layer procedures for NR sidelink," R1-1907018, 3GPP TSG RAN WG1 Meeting #97, Reno, USA, May 13-17, 2019, 11 pages.
Qualcomm Incorporated, "Considerations on Physical Layer aspects of NR V2X," R1-1907269, 3GPP TSG RAN WG1 Meeting #97, Reno, USA, May 13-17, 2019, 15 pages.
European Patent Office, "Supplementary European Search Report", dated Nov. 24, 2021, in connection with European Patent Application 20843094.2, 68 pages.
Samsung, "On Uu-based resource allocation and configuration", 3GPP TSG RAN WG1 #96, R1-1902289, Athens, Greece, Feb. 25-Mar. 1, 2019, 7 pages.
Huawei et al., "Sidelink physical layer structure for NR V2X" 3GPP TSG RAN WG1 Meeting #97, R1-1906007, Reno, USA, May 13-17, 2019, 18 pages.
European Patent Office, "Communication pursuant to Article 94(3) EPC," dated Jul. 25, 2022, in connection with European Patent Application No. 20843094.2, 5 pages.

\* cited by examiner

METHOD AND APPARATUS FOR SIDELINK TRANSMISSION IN A WIRELESS COMMUNICATION SYSTEM

CROSS REFERENCE TO RELATED APPLICATIONS

This application is based on and claims priority under 35. U.S.C. 119 to Chinese Patent Application No. 201910667674.X filed on Jul. 23, 2019, Chinese Patent Application No. 201910755298.X filed on Aug. 15, 2019, Chinese Patent Application No. 201910979390.4 filed on Oct. 15, 2019, Chinese Patent Application No. 201911084071.3 filed on Nov. 7, 2019, and Chinese Patent Application No. 202010091299.1 filed on Feb. 13, 2020, the disclosures of which are herein incorporated by reference in their entirety.

BACKGROUND

1. Field

The present application relates to the field of wireless communication technologies, particularly to a method and device for sidelink transmission.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

The present application proposes a method and device for sidelink transmission to address the above technical defects in view of the shortcomings of the existing method.

In a first aspect, a method for sidelink transmission, which is applied to a first user equipment (UE), is provided, comprises:

transmitting a sidelink transmission request to a base station;

receiving a sidelink grant transmitted by the base station, wherein scheduling information carried in the sidelink grant includes sidelink resources;

transmitting the sidelink transmission to a second UE according to the scheduling information carried in the sidelink grant; the sidelink transmission includes at least one of transmission of the sidelink data on a sidelink data channel, transmission of the sidelink control information (SCI) corresponding to the sidelink data on a sidelink control channel;

receiving first hybrid automatic repeat request acknowledgement (HARQ-ACK) feedback information transmitted by the second UE, wherein the first HARQ-ACK feedback information is used to determine whether the first UE needs to retransmit the sidelink transmission; and reporting second HARQ-ACK feedback information to the base station, and the second HARQ-ACK feedback information is used to indicate whether the sidelink transmission succeeds.

Optionally, the second HARQ-ACK feedback information comprises at least one of an acknowledgement (ACK), a non-acknowledgement (NACK), and a discontinuous transmission (DTX); wherein the DTX indicates that the first UE fails to receive the first HARQ-ACK feedback information.

Optionally, not reporting the second HARQ-ACK feedback information to the base station for implicitly indicating at least one of ACK, NACK, and DTX.

Optionally, determining whether the second HARQ-ACK feedback information needs to be reported to the base station, and/or determining whether implicitly indicating at least one of ACK, NACK and DTX by not reporting the second HARQ-ACK feedback information to the base station is needed, according to the configured or the pre-configured or predefined criteria.

Optionally, a sidelink retransmission request signaling is reported to the base station, if the first UE determines that the sidelink transmission needs to be retransmitted and the sidelink resource indicated in the sidelink grant has been used.

Optionally, the sidelink retransmission request signaling carries at least the second HARQ-ACK feedback information indicating whether the sidelink transmission succeeds.

Optionally, information carried in any one of the second HARQ-ACK feedback information and the sidelink retransmission request signaling comprises at least one of the following:

a parameter indicating a service priority, a buffer status report (BSR), a scheduling request (SR), a parameter related to modulation and coding, a parameter related to power control, a sidelink channel state information (CSI), and information related to sidelink resource selection.

Optionally, the use of any one of the second HARQ-ACK feedback information, sidelink retransmission request signaling, includes at least one of the following:

a retransmission resource for requesting the sidelink transmission from the base station; and a transmission resource for requesting at least one other sidelink transmission from the base station.

Optionally, the scheduling information comprises N sidelink resources, and the manner of performing sidelink transmission according to the scheduling information carried in the sidelink grant comprises at least one of the following:

when N=1, the sidelink resource indicated in the sidelink grant is used for an initial transmission or one retransmission of a given sidelink transport block (TB) of the first UE; and when N>1, a specific one sidelink resource of the N sidelink resources indicated in the sidelink grant is used for an initial transmission or one retransmission of a given sidelink TB of the first UE, and the remaining N−1 sidelink resources other than the specific one sidelink resource are used for another one or more retransmissions of the given sidelink TB of the first UE, and/or for transmission of another sidelink TBs of the first UE other than the given sidelink TB;

wherein, N is a positive integer.

Optionally, when N>1, after the first UE successfully transmits the sidelink TB, and/or after determining that the sidelink TB does not need to be retransmitted, releasing unused sidelink resource, and/or determining the use of the unused resource, if there still exists unused sidelink resource in the N sidelink resources indicated in the sidelink grant;

wherein, N is a positive integer.

Optionally, the releasing the unused sidelink resource comprises:

transmitting a sidelink resource release signaling to the base station, to notify the base station that the first UE releases the unused sidelink resource.

Optionally, the sidelink resource release signaling carries at least the second HARQ-ACK feedback information indicating whether the sidelink transmission succeeds.

Optionally, determining the use of unused resource, comprises:

determining that the unused resource is used for transmission of another sidelink TBs of the first UE.

Optionally, reporting at least one of the second HARQ-ACK feedback information, the sidelink retransmission request signaling, and the sidelink resource release signaling, when it is determined that the first UE needs to transmit the sidelink retransmission request signaling to the base station, and/or needs to transmit the sidelink resource releasing signaling to the base station, according to the configured or pre-configured or predefined information.

Optionally, the UE reports at least one of the second HARQ-ACK feedback information, the sidelink retransmission request signaling, and the sidelink resource release signaling, comprising at least one of the following:

determining, by the first UE, that retransmission is needed and that the sidelink retransmission request signaling needs to be transmitted to the base station; and transmitting the second HARQ-ACK feedback information to the base station by the first UE, wherein the second HARQ-ACK feedback information includes the NACK or the DTX, and the second HARQ-ACK feedback information is used as the sidelink retransmission request signaling;

determining, by the first UE, that the sidelink resources need to be released and that the sidelink resource release signaling needs to be transmitted to the base station; and transmitting the second HARQ-ACK feedback information to the base station by the first UE, and content of the second HARQ-ACK feedback information includes the ACK, and the second HARQ-ACK feedback information is used as the sidelink resource release signaling;

determining, by the first UE, that the retransmission is needed and that the sidelink retransmission request signaling needs to be transmitted to the base station; and transmitting the sidelink retransmission request signaling to the base station by the first UE, wherein the sidelink retransmission request signaling and the second HARQ-ACK feedback information are different signaling independent of each other; and determining, by the first UE, that the sidelink resources need to be released and that the sidelink resource release signaling needs to be transmitted to the base station; and transmitting the sidelink resource release signaling to the base station by the first UE, wherein the sidelink resource release signaling and the second HARQ-ACK feedback information are different signaling independent of each other.

Optionally, a manner of the first UE determining resources for reporting the second HARQ-ACK feedback information, comprising at least one of the following:

determining resources for reporting the second HARQ-ACK feedback information according to a resource position directly indicated in a first specific signaling; and determining resources for reporting the second HARQ-ACK feedback information according to at least one of a resource position of a second specific signaling, a resource position of a specific channel, a resource mapping relationship between the second specific signaling and the second HARQ-ACK feedback information, a resource mapping relationship between the specific channel and the second HARQ-ACK feedback information, and the information for deriving resources of feedback information.

Optionally, any one of a first specific signaling, the second specific signaling, and the specific channel comprises at least one of the following: a sidelink grant, a given sidelink transmission, a sidelink channel used for the given sidelink transmission, a sidelink transmission scheduled by sidelink grant, a sidelink channel scheduled by sidelink grant, and a specific uplink signaling;

wherein the sidelink grant is a sidelink grant for scheduling the given sidelink transmission;

the sidelink transmission includes at least one of transmission of sidelink data on a sidelink data channel, transmission of sidelink control information (SCI) corresponding to the sidelink data on a sidelink control channel, and transmission of feedback message corresponding to the sidelink data on a sidelink feedback channel;

the sidelink channel includes at least one of a physical sidelink control channel (PSCCH), a physical sidelink shared channel (PSSCH), and a physical sidelink feedback channel (PSFCH); and the specific uplink signaling includes at least one of uplink control information (UCI) and physical uplink shared channel (PUSCH).

Optionally, the first UE acquires information for determining resources for reporting the second HARQ-ACK feedback information in at least one of the following signaling or channels:

downlink control information (DCI);

a downlink physical shared channel (PDSCH) carrying the sidelink grant;

a downlink signaling for indicating the scheduling information of the sidelink transmission; and a higher layer signaling, the higher layer signaling including a radio resource control (RRC) configuration signaling.

Optionally, determining a priority between the transmission of the second HARQ-ACK feedback information and other specific transmission when the time domain resources used by the transmission of the second HARQ-ACK feedback information completely or partially overlap with the time domain resources used by the other specific transmission;

determining, according to the priority, a first transmission state corresponding to the transmission of the second HARQ-ACK feedback information, wherein, the first transmission state includes at least one of the delaying transmission of the second HARQ-ACK feedback information, dropping transmission of the second HARQ-ACK feedback information, transmitting the second HARQ-ACK feedback information and other specific transmission separately, transmitting the second HARQ-ACK feedback information and other specific transmission in a multiplexed manner, piggybacking the second HARQ-ACK feedback information on other specific transmission, and piggybacking the other specific transmission on the second HARQ-ACK feedback information;

determining, according to the priority, a second transmission state corresponding to other specific transmission, wherein, the second transmission state includes at least one of delaying the other specific transmission, dropping other specific transmission, transmitting the second HARQ-ACK feedback information and other specific transmission separately, piggybacking the second HARQ-ACK feedback information on other specific transmission, and piggybacking the other specific transmission on the second HARQ-ACK feedback information; and other specific transmission includes at least one of other uplink transmission, other downlink reception, other sidelink transmission, and other sidelink reception.

Optionally, determining the priority according to at least one of the priority between the uplink transmission/the downlink reception/the sidelink transmission/the sidelink reception, and the second HARQ-ACK feedback information, the priority of the channel used for transmission, the priority of the signaling type, and the priority parameters of the service corresponding to the transmission.

Optionally, the sidelink grant indicates to enable or disable HARQ-ACK feedback; the indicating enabling or disabling HARQ-ACK feedback comprises explicitly or implicitly indicating enabling or disabling HARQ-ACK feedback;

the explicitly indicating includes using a specific field in the sidelink grant to explicitly indicate to enable or disable HARQ-ACK feedback;

the implicitly indicating comprising at least one of the following:

implicitly indicating by using the number N of the sidelink resources scheduled in the sidelink grant;

implicitly indicating by using a time domain position of the sidelink resource scheduled in the sidelink grant;

implicitly indicating by using a frequency domain position of the sidelink resource scheduled in the sidelink grant;

implicitly indicating by using a code domain position of the sidelink resource scheduled in the sidelink grant;

implicitly indicating by using a time domain gap between sidelink resources scheduled in the sidelink grant;

implicitly indicating by using information of the sidelink resource scheduled in the sidelink grant;

implicitly indicating by using the type of sidelink resource scheduled in the sidelink grant; and implicitly indicating by using the presence of a sidelink feedback resource in the sidelink resource scheduled in the sidelink grant.

In a second aspect, a first UE is provided, comprising:

a first processing module, configured to transmit a sidelink transmission request to a base station;

a second processing module, configured to receive a sidelink grant transmitted by the base station, wherein scheduling information carried in the sidelink grant includes sidelink resources;

a third processing module, configured to transmit the sidelink transmission to a second UE according to the scheduling information carried in the sidelink grant; the sidelink transmission includes at least one of transmission of the sidelink data on a sidelink data channel, transmission of the sidelink control information (SCI) corresponding to the sidelink data on a sidelink control channel;

a fourth processing module, configured to receive first hybrid automatic repeat request acknowledgement (HARQ-ACK) feedback information transmitted by the second UE, wherein the first HARQ-ACK feedback information is used to determine whether the first UE needs to retransmit the sidelink transmission; and a fifth processing module, configured to report second HARQ-ACK feedback information to the base station, and the second HARQ-ACK feedback information is used to indicate whether the sidelink transmission succeeds.

The technical solution provided by embodiments of this application shall have at least the following beneficial effects: by transmitting a sidelink transmission request to a base station; receiving a sidelink grant transmitted by the base station, wherein scheduling information carried in the sidelink grant includes sidelink resources; transmitting the sidelink transmission to a second UE according to the scheduling information carried in the sidelink grant; receiving first HARQ-ACK feedback information transmitted by the second UE, wherein the first HARQ-ACK feedback information is used to determine whether the first UE needs to retransmit the sidelink transmission; reporting second HARQ-ACK feedback information to the base station, and the second HARQ-ACK feedback information is used to indicate whether the sidelink transmission succeeds, the sidelink resources for retransmission are quickly requested after the sidelink transmission fails, so that the timeliness of retransmission of the sidelink transmission is improved.

In an exemplary embodiment, a method performed by a first User equipment (UE) in a wireless communication system is provided. The method comprising: transmitting, to a second UE, a sidelink data through a physical sidelink shared channel (PSSCH); identifying whether a hybrid automatic repeat request acknowledgement (HARQ-ACK) information in response to the PSSCH is received through a physical sidelink feedback channel (PSFCH) from the second UE; generating HARQ-ACK report information based on the identified result related to the HARQ-ACK information; and transmitting, to a base station (BS), the HARQ-ACK report information through a physical uplink control channel (PUCCH) in a first slot, wherein the first slot is determined based on a second slot for the PSFCH and a first offset.

In an exemplary embodiment, wherein a value of the first offset is indicated by a higher layer signaling.

In an exemplary embodiment, wherein a value of the first offset is indicated by a sidelink grant included in downlink control information (DCI).

In an exemplary embodiment, wherein the HARQ-ACK report information is generated as a non-acknowledgement (NACK) based on a determination that the HARQ-ACK information is not received from the second UE.

In an exemplary embodiment, wherein the HARQ-ACK report information is generated as an acknowledgement (ACK) based on a determination that at least one HARQ-ACK information received from the second UE is ACK.

In an exemplary embodiment, wherein the HARQ-ACK report information is generated as a non-acknowledgement (NACK) based on a determination that at least one ACK is not received from the second UE in the HARQ-ACK information.

In an exemplary embodiment, wherein the UE transmits the HARQ-ACK report information to the BS, based on a determination that a configured condition is met.

In an exemplary embodiment, wherein the transmitting of the sidelink data through the PSSCH comprises: transmitting a first sidelink data in a third slot determined based on a fourth slot of receiving a sidelink grant and a second offset.

In an exemplary embodiment, wherein the third slot is scheduled by the sidelink grant included in downlink control information (DCI).

In an exemplary embodiment, a method performed by a base station (BS) in a wireless communication system is provided. The method comprising: transmitting, to a first user equipment (UE), a downlink control information (DCI); and receiving, from the first UE, hybrid automatic repeat request acknowledgement (HARQ-ACK) report information through a physical uplink control channel (PUCCH) in a first slot based on the DCI, wherein the HARQ-ACK report information based on an identified result related to HARQ-ACK information is received through a physical sidelink feedback channel (PSFCH) from a second UE, and wherein the first slot is determined based on a second slot for the PSFCH and a first offset.

In an exemplary embodiment, wherein a value of the first offset is indicated by a higher layer signaling.

In an exemplary embodiment, wherein a value of the first offset is indicated by a sidelink grant included in the DCI.

In an exemplary embodiment, a first user equipment (UE) is provided. The first UE comprising: a transceiver; and at least one processor coupled with the transceiver and configured to; control the transceiver to transmit, to a second UE, a sidelink data through a physical sidelink shared channel (PSSCH), identify whether a hybrid automatic repeat request acknowledgement (HARQ-ACK) information in response to the PSSCH is received through a physical sidelink feedback channel (PSFCH) from the second UE, generate HARQ-ACK report information based on the identified result related to the HARQ-ACK information, and control the transceiver to transmit, to a base station (BS), the HARQ-ACK report information through a physical uplink control channel (PUCCH) in a first slot, wherein the first slot is determined based on a second slot for the PSFCH and a first offset.

In an exemplary embodiment, wherein a value of the first offset is indicated by a higher layer signaling.

In an exemplary embodiment, wherein a value of the first offset is indicated by a sidelink grant included in downlink control information (DCI).

In an exemplary embodiment, wherein the HARQ-ACK report information is generated as a NACK based on a determination that the HARQ-ACK information is not received from the second UE.

In an exemplary embodiment, wherein the HARQ-ACK report information is generated as an acknowledgement (ACK) based on a determination that at least one HARQ-ACK information received from the second UE is ACK.

In an exemplary embodiment, wherein the HARQ-ACK report information is generated as a non-acknowledgement (NACK) based on a determination that at least one ACK is not received from the second UE in the HARQ-ACK information.

In an exemplary embodiment, wherein the processor is configured to control the transceiver to transmit a first sidelink data in a third slot determined based on a fourth slot of receiving a sidelink grant and a second offset.

In an exemplary embodiment, wherein the third slot is scheduled by the sidelink grant included in downlink control information (DCI).

The additional aspects and advantages of the present application will be set forth in part in the description below, and will be apparent from the description below or learned through the practice of present application.

Before undertaking the detailed description below, it may be advantageous to set forth definitions of certain words and phrases used throughout this patent document the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

In order to more clearly illustrate the technical solutions in the embodiments of the present application, the drawings used in the description of the embodiments of the present application will be briefly described below.

Throughout the drawings, like reference numerals will be understood to refer to like parts, components, and structures.

DETAILED DESCRIPTION

Figure 1:
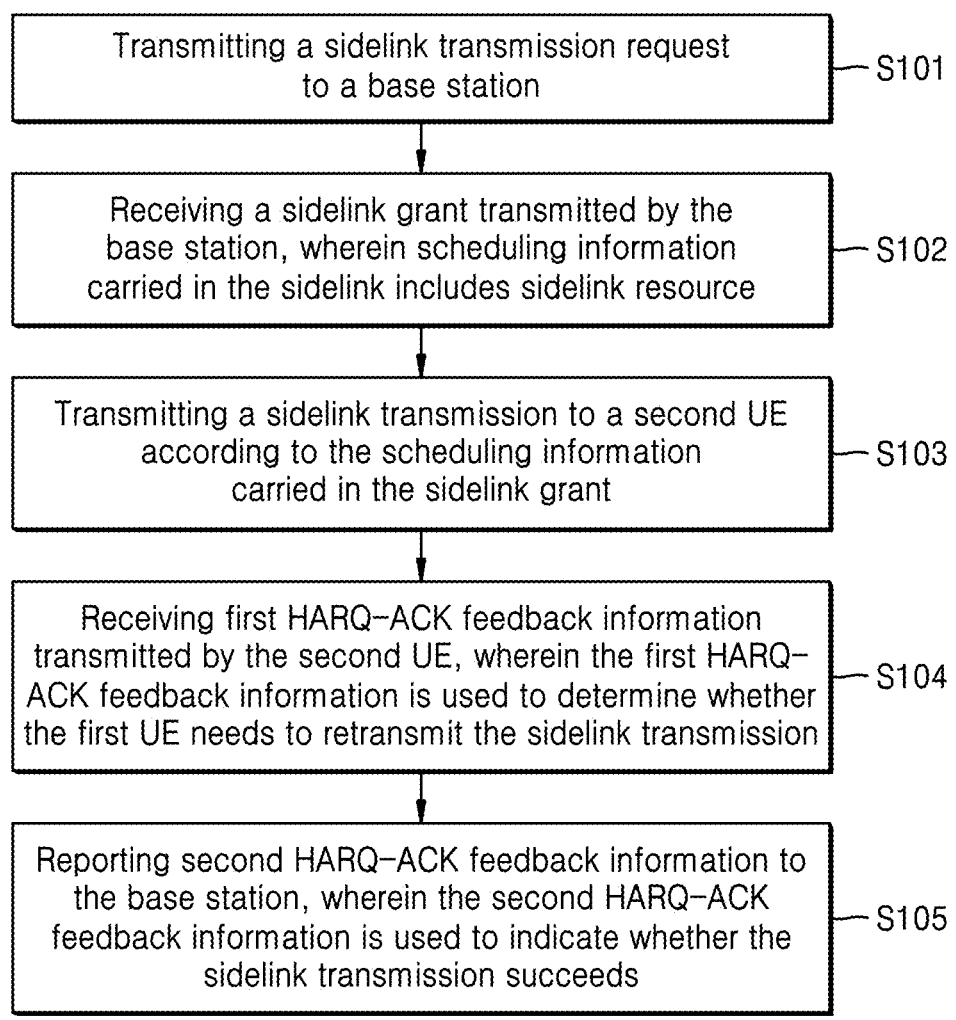
FIG. 1 illustrates a schematic flowchart of a method for sidelink transmission according to an embodiment of the present application.

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the objects, technical solutions and advantages of the present application more clear, the embodiments of the present application will be further described in detail below with reference to the accompanying drawings.

In this application, the sequence number of the message is only used to indicate different messages (for example, messages, such as a first message, a second message, are used to represent different messages), and does not represent the order in which the messages are executed; the sequence number of the node is only used to indicate different nodes (nodes, such as a first node, a second node, are used to represent different nodes) and does not represent the order in which nodes appear in the information interaction process.

In this application, the message name is only an example and other names are not excluded.

In order to better understand and explain the solutions of the embodiments of the present application, some techniques involved in the embodiments of the present application are briefly described below.

The Physical Sidelink Control Channel (PSCCH) in the embodiment of the present application may also be a Physical Downlink Control Channel (PDCCH), an Enhanced Physical Downlink Control Channel (EPDCCH), an MTC Physical Downlink Control Channel (MPDCCH), a Narrowband Physical Downlink Control Channel (NPDCCH), a New Radio Physical Downlink Control Channel (NR-PDCCH); the Physical Sidelink Shared Channel (PSSCH) may also be a Physical Downlink Shared Channel (PDSCH), an Enhanced Physical Downlink Shared Channel (EPDSCH), an MTC Physical Downlink Shared Channel (MPDSCH), an Narrowband Physical Downlink Shared Channel (NPDSCH), and a New Radio Physical Downlink Shared Channel (NR-PDSCH); a Physical Uplink Control Channel (PUCCH) may also be an another channel dedicated to carry a specific uplink control message or specific sidelink control information.

The slot in the embodiment of the present application may be a subframe or a slot in a physical sense, or a subframe or a slot in a logical sense. Specifically, a subframe or a slot in a logical sense is a subframe or a slot corresponding to a resource pool of the sidelink communication. For example, in a V2X system, a resource pool is defined by a repeated bit map that maps to a specific slot set, which may contain all slots, or all other slots except certain specific slots (the slots for transmitting the MB/SIB). The slots indicated as "1" in the bitmap can be used for V2X transmission, and belongs to the slots corresponding to the V2X resource pool; the slots indicated as "0" are not available for V2X transmission, and do not belong to the slots corresponding to the V2X resource pool.

The following describes the difference between subframes or slots in the physical or logical sense through a typical application scenario: when calculating a time domain gap between two specific channels/messages (for example, a PSSCH carrying sidelink data and a PSFCH carrying corresponding feedback information), and the gap is assumed to have N slots, the N slots correspond to an absolute time length of N*x milliseconds in the time domain, if a frame or a slot in physical sense is calculated, wherein x is the time length of a physical slot (subframe) under the numerology of this scenario, in the unit of milliseconds; otherwise, the gap of the N slots corresponds to the N slots indicated as "1" in the bitmap, and the absolute time length of the gap is changed depending on the specific configuration of the sidelink communication resource pool, that is, the gap does not have a fixed value, if a subframe or slot in a logical sense is calculated and the sidelink resource pool defined by the bitmap is taken as an example.

Further, the slot in the embodiment of the present application may be a complete slot, or may be several symbols corresponding to the sidelink communication in one slot. For example, when the sidelink communication is configured to be performed on $X1^{th}$~$X2^{th}$ symbols of each slot, the slot in the following embodiments is the $X1^{th}$~$X2^{th}$ symbols in the slot in this scenario; or, when the sidelink communication is configured to be performed on a mini-slot, the slot in the following embodiments is the mini-slot defined or configured in the sidelink system, rather than the slot in the NR system.

In the embodiment of the present application, the information that is configured by a base station, indicated by a signaling, configured by a higher layer, and pre-configured, includes a set of configuration information; or includes multiple sets of configuration information, one of which the UE selects to use according to the predefined condition; or includes a set of configuration information including a plurality of subsets, one of which the UE selects to use according to the predefined condition.

Some of the technical solutions provided in the embodiments of the present application are specifically described based on the V2X system, but the application scenarios should not be limited to the V2X system in the sidelink communication, but can also be applied to other sidelink transmission systems. For example, designs based on the V2X sub-channel in the following embodiments may also be used for D2D sub-channels or sub-channels of another sidelink transmission. The V2X resource pool in the following embodiments may also be replaced with a D2D resource pool in other sidelink transmission systems, such as the D2D.

In the embodiment of the present application, when the sidelink communication system is a V2X system, the terminal or the UE may be multiple types of terminals or UEs such as a vehicle, an infrastructure, a pedestrian, and the like.

The communication in the NR sidelink system includes both a blind-retransmission-based sidelink communication and an HARQ-based sidelink communication. In the blind-retransmission-based sidelink communication, the receiver UE does not provide HARQ-ACK feedback information, and the transmitter UE repeatedly transmits the sidelink transport block N times, wherein N is a predefined or configured value, therefore, the number of transmissions for each transport block is fixed and will not change depending on the feedback information provided by the receiver. However, in the HARQ-based sidelink communication, the receiver UE needs to transmits the HARQ-ACK feedback information, and the transmitter determines whether the sidelink transport block needs to be retransmitted based on whether the ACK feedback is received or whether the NACK feedback is received, after transmitter transmits the sidelink transport block.

In the Long-Term Evolution (LTE) technology, a sidelink communication comprises a direct communication of device to device (D2D) and a vehicle-to-outside communication (Vehicle to Vehicle/Infrastructure/Pedestrian/Network, hereinafter referred to as V2X). The V2X, which is designed based on the D2D technology, is superior to the D2D in terms of data rate, delay, reliability and link capacity and is the most representative sidelink communication technology in LTE technology.

In the LTE V2X system, the sidelink communication also defines different physical channels, comprising a Physical Sidelink Control Channel (PSCCH) and a Physical Sidelink Shared Channel (PSSCH). The PSSCH is used to carry data, and the PSCCH is used to carry Sidelink Control Information (SCI), in which information, such as the time-frequency domain resource position of the associated PSSCH transmission, the modulation and coding scheme, and the receiving target ID for the PSSCH, is indicated. The sub-channel is also defined as a minimum unit of resource allocation in the sidelink communication, and one sub-channel comprises a control channel resource or a data channel resource, or both.

In terms of resource allocation, the LTE V2X system comprises two modes: a resource allocation mode based on base station scheduling (Mode 3) and a resource allocation mode autonomously selected by the UE (Mode 4). Both modes are performed based on sub-channels defined in the sidelink system, that is, several control and/or data sub-channels are scheduled by the base station or autonomously selected by the UE for sidelink transmission.

The Fifth-Generation New Radio (5G NR), as an evolution technology of LTE, correspondingly also comprises the further evolution of sidelink communication. The concept of PSCCH and PSSCH is similarly introduced into the NR V2X, and the resource allocation mode based on the base station scheduling (Mode 1) and the resource allocation mode autonomously selected by the UE (Mode 2) are also supported in the NR V2X.

Further, unlike the LTE sidelink communication system that does not support the HARQ-ACK feedback, the NR V2X further introduces an HARQ-ACK feedback mechanism, which is applicable to unicast and groupcast services. After the transmitter UE transmits data and the corresponding SCI, the receiver UE transmits the corresponding ACK/NACK feedback information to the transmitter UE, so that the transmitter UE determines whether the data retransmission needs to be performed. In the NR V2X, the channel for carrying ACK/NACK feedback information is a Physical Sidelink Feedback Channel (PSFCH).

In the Mode 1 of the NR V2X, the resources used for the sidelink transmission are scheduled by the base station (gNB) to the transmitter UE. Therefore, for sidelink transmission of Mode 1 based on HARQ-ACK feedback mechanism, one possible scenario is that the resources for the initial transmission and the retransmission of the sidelink transmission are all scheduled by the base station. In this scenario, since whether the sidelink transmission needs to be retransmitted is determined based on the HARQ-ACK feedback information of the sidelink transmission, and not pre-determined by the base station, a mechanism for triggering the base station to schedule the retransmission resource needs to be designed.

In the existing technique, the UE (in-coverage UE) may transmit information indicating a requirement for retransmission to a base station, and trigger the base station to schedule the sidelink resource for retransmission. The content of the indication information may be a Scheduling Request (SR)/Buffer Status Report (BSR) or ACK/NACK feedback information.

The SR/BSR mechanism in the existing technique is difficult to support the rapid request for sidelink resources for retransmission after the first sidelink transmission fails, which will result in a significant increase in the delay of the sidelink transmission. Therefore, for consideration of the timeliness of the retransmission request message, in the NR V2X, the method in which the UE reports ACK/NACK feedback information to the base station for requesting retransmission of resource is preferred to use.

A method and device for sidelink transmission are provided in the embodiment of present application, comprising: transmitting a sidelink transmission request to a base station; receiving a sidelink grant transmitted by the base station, wherein scheduling information carried in the sidelink grant includes sidelink resources; transmitting the sidelink transmission to a second UE according to the scheduling information carried in the sidelink grant; receiving first hybrid automatic repeat request acknowledgement (HARQ-ACK) feedback information transmitted by the second UE, wherein the first HARQ-ACK feedback information is used to determine whether the first UE needs to retransmit the sidelink transmission; reporting second HARQ-ACK feedback information to the base station, and the second HARQ-ACK feedback information is used to indicate whether the sidelink transmission succeeds. The method provided by the present application achieves a quick request for the sidelink resources for retransmission after the sidelink transmission fails, so that the timeliness of retransmission of the sidelink transmission is improved.

In order to make the objects, technical solutions and advantages of the present application more clear, the embodiments of the present application will be further described in detail below with reference to the accompanying drawings.

Embodiment 1

A method for sidelink transmission, applied to the first user equipment (UE), is provided in the embodiment of this application. The schematic flowchart of this method is shown in FIG. 1, and the method includes:

Step S101: transmitting a sidelink transmission request to a base station.

Step S102: receiving a sidelink grant transmitted by the base station, wherein scheduling information carried in the sidelink grant includes sidelink resources.

Step S103: transmitting the sidelink transmission to a second UE according to the scheduling information carried in the sidelink grant.

Optionally, the sidelink transmission includes at least one of transmission of the sidelink data on the sidelink data channel, transmission of the sidelink control information (SCI) corresponding to the sidelink data on the sidelink control channel.

Step S104: receiving first hybrid automatic repeat request acknowledgement (HARQ-ACK) feedback information transmitted by the second UE, wherein the first HARQ-ACK feedback information is used to determine whether the first UE needs to retransmit the sidelink transmission.

Step S105, reporting second HARQ-ACK feedback information to the base station, and the second HARQ-ACK feedback information is used to indicate whether the sidelink transmission succeeds.

In the embodiment of the present application, by transmitting a sidelink transmission request to a base station; receiving a sidelink grant transmitted by the base station, wherein scheduling information carried in the sidelink grant includes sidelink resources; transmitting the sidelink transmission to a second UE according to the scheduling information carried in the sidelink grant; receiving first HARQ-ACK feedback information transmitted by the second UE, wherein the first HARQ-ACK feedback information is used to determine whether the first UE needs to retransmit the sidelink transmission; reporting second HARQ-ACK feedback information to the base station, and the second HARQ-ACK feedback information is used to indicate whether the sidelink transmission succeeds, the sidelink resources for retransmission are quickly requested after the sidelink transmission fails, so that the timeliness of retransmission of the sidelink transmission is improved.

Optionally, the second HARQ-ACK feedback information comprises at least one of an acknowledgement (ACK), a non-acknowledgement (NACK), and a discontinuous transmission (DTX); wherein the DTX indicates that the first UE fails to receive the first HARQ-ACK feedback information.

Optionally, not reporting the second HARQ-ACK feedback information to the base station for implicitly indicating at least one of ACK, NACK, and DTX.

Optionally, determining whether the second HARQ-ACK feedback information needs to be reported to the base station, and/or determining whether implicitly indicating at least one of ACK, NACK and DTX by not reporting the second HARQ-ACK feedback information to the base station is needed, according to the configured or the pre-configured or predefined criteria.

Optionally, a sidelink retransmission request signaling is reported to the base station, if the first UE determines that the sidelink transmission needs to be retransmitted and the sidelink resource indicated in the sidelink grant has been used.

Optionally, the sidelink retransmission request signaling carries at least the second HARQ-ACK feedback information indicating whether the sidelink transmission succeeds.

Optionally, information carried in any one of the second HARQ-ACK feedback information and the sidelink retransmission request signaling comprises at least one of the following:

a parameter indicating a service priority, a buffer status report (BSR), a scheduling request (SR), a parameter related to modulation and coding, a parameter related to power control, a sidelink channel state information (CSI), and information related to sidelink resource selection.

Optionally, the use of any one of the second HARQ-ACK feedback information, sidelink retransmission request signaling, includes at least one of the following:

a retransmission resource for requesting the sidelink transmission from the base station;

a transmission resource for requesting at least one other sidelink transmission from the base station.

Optionally, the scheduling information comprises N sidelink resources, and the manner of performing sidelink transmission according to the scheduling information carried in the sidelink grant comprises at least one of the following:

when N=1, the sidelink resource indicated in the sidelink grant is used for an initial transmission or one retransmission of a given sidelink transport block (TB) of the first UE;

when N>1, a specific one sidelink resource of the N sidelink resources indicated in the sidelink grant is used for an initial transmission or one retransmission of a given sidelink TB of the first UE, and the remaining N−1 sidelink resources other than the specific one sidelink resource are used for another one or more retransmissions of the given sidelink TB of the first UE, and/or for transmission of another sidelink TB of the first UE other than the given sidelink TB;

wherein, N is a positive integer.

Optionally, when N>1, after the first UE successfully transmits the sidelink TB, and/or after determining that the sidelink TB does not need to be retransmitted, releasing unused sidelink resource, and/or determining the use of the unused resources, if there still exists unused sidelink resource in the N sidelink resources indicated in the sidelink grant;

wherein, N is a positive integer.

Optionally, the releasing the unused sidelink resource comprises:

transmitting a sidelink resource release signaling to the base station, to notify the base station that the first UE releases the unused sidelink resource.

Optionally, the sidelink resource release signaling carries at least the second HARQ-ACK feedback information indicating whether the sidelink transmission succeeds.

Optionally, determining the use of unused resources, comprises:

determining that the unused resources is used for transmission of another sidelink TB of the first UE.

Optionally, reporting at least one of the second HARQ-ACK feedback information, the sidelink retransmission request signaling, and the sidelink resource release signaling, when the first UE determines that the first UE needs to transmit the sidelink retransmission request signaling to the base station, and/or needs to transmit the sidelink resource releasing signaling to the base station, according to the configured or pre-configured or predefined information.

Optionally, the first UE reports at least one of the second HARQ-ACK feedback information, the sidelink retransmission request signaling, and the sidelink resource release signaling, comprising at least one of the following:

determining, by the first UE, that retransmission is needed and that the sidelink retransmission request signaling needs to be transmitted to the base station; and transmitting the second HARQ-ACK feedback information to the base station by the first UE, wherein the second HARQ-ACK feedback information includes the NACK or the DTX, and the second HARQ-ACK feedback information is used as the sidelink retransmission request signaling;

determining, by the first UE, that the sidelink resources need to be released and that the sidelink resource release signaling needs to be transmitted to the base station; and transmitting the second HARQ-ACK feedback information to the base station by the first UE, and content of the second HARQ-ACK feedback information includes the ACK, and the second HARQ-ACK feedback information is used as the sidelink resource release signaling;

determining, by the first UE, that the retransmission is needed and that the sidelink retransmission request signaling needs to be transmitted to the base station; and transmitting the sidelink retransmission request signaling to the base station by the first UE, wherein the sidelink retransmission request signaling and the second HARQ-ACK feedback information are different signaling independent of each other;

determining, by the first UE, that the sidelink resources need to be released and that the sidelink resource release signaling needs to be transmitted to the base station; and transmitting the sidelink resource release signaling to the base station by the first UE, wherein the sidelink resource release signaling and the second HARQ-ACK feedback information are different signaling independent of each other.

Optionally, a manner of the first UE determining resources for reporting the second HARQ-ACK feedback information, comprising at least one of the following:

determining resources for reporting the second HARQ-ACK feedback information according to a resource position directly indicated in a first specific signaling;

determining resources for reporting the second HARQ-ACK feedback information according to at least one of: a resource position of a second specific signaling, a resource position of a specific channel, a resource mapping relationship between the second specific signaling and the second HARQ-ACK feedback information, a resource mapping relationship between the specific channel and the second HARQ-ACK feedback information, and the information used for deriving the resource of feedback information.

Optionally, any one of a first specific signaling, a second specific signaling, and a specific channel comprises at least one of the following: a sidelink grant, a given sidelink transmission, a sidelink channel used for the given sidelink transmission, a sidelink transmission scheduled by sidelink grant, a sidelink channel scheduled by sidelink grant, and a specific uplink signaling;

wherein the sidelink grant is a sidelink grant for scheduling the given sidelink transmission;

the sidelink transmission comprises at least one of: transmission of sidelink data on the sidelink data channel, transmission of sidelink control information (SCI) corresponding to the sidelink data on the sidelink control channel, and transmission of feedback message corresponding to the sidelink data on the sidelink feedback channel;

the sidelink channel comprises at least one of a physical sidelink control channel (PSCCH), a physical sidelink shared channel (PSSCH), and a physical sidelink feedback channel (PSFCH); the specific uplink signaling comprises at least one of uplink control information (UCI) and physical uplink shared channel (PUSCH).

Optionally, the first UE acquires information for determining resources for reporting the second HARQ-ACK feedback information in at least one of the following signaling or channels:

downlink control information (DCI);

a downlink physical shared channel (PDSCH) carrying the sidelink grant;

a downlink signaling for indicating the scheduling information of the sidelink transmission;

a higher layer signaling, the higher layer signaling including a radio resource control (RRC) configuration signaling.

Optionally, determining a priority between the transmission of the second HARQ-ACK feedback information and other specific transmission when the time domain resources used by the transmission of the second HARQ-ACK feedback information completely or partially overlap with the time domain resources used by the other specific transmission;

determining, according to the priority, a first transmission state corresponding to the transmission of the second HARQ-ACK feedback information, wherein, the first transmission state includes at least one of the following: delaying transmission of the second HARQ-ACK feedback information, dropping transmission of the second HARQ-ACK feedback information, transmitting the second HARQ-ACK feedback information and other specific transmission separately, transmitting the second HARQ-ACK feedback information and other specific transmission in a multiplexed manner, piggybacking the second HARQ-ACK feedback information on other specific transmission, and piggybacking the other specific transmission on the second HARQ-ACK feedback information;

determining, according to the priority, a second transmission state corresponding to other specific transmission, wherein, the second transmission state includes at least one of the following: delaying the other specific transmission, dropping other specific transmission, transmitting the second HARQ-ACK feedback information and other specific transmission separately, piggybacking the second HARQ-ACK feedback information on other specific transmission, and piggybacking the other specific transmission on the second HARQ-ACK feedback information; and other specific transmission includes at least one of other uplink transmission, other downlink reception, other sidelink transmission, and other sidelink reception.

Optionally, determining the priority according to at least one of the priority between the uplink transmission/the downlink reception/the sidelink transmission/the sidelink reception, and the second HARQ-ACK feedback information, the priority of the channel used for transmission, the priority of the signaling type, and the priority parameters of the service corresponding to the transmission.

Optionally, the sidelink grant indicates to enable or disable HARQ-ACK feedback; the indicating enabling or disabling the HARQ-ACK feedback comprises explicitly or implicitly indicating enabling or disabling the HARQ-ACK feedback;

the explicitly indicating comprises using a specific field in the sidelink grant to explicitly indicate to enable or disable the HARQ-ACK feedback;

the implicitly indicating comprising at least one of the following:

implicitly indicating by using the number N of the sidelink resources scheduled in the sidelink grant;

implicitly indicating by using a time domain position of the sidelink resource scheduled in the sidelink grant;

implicitly indicating by using a frequency domain position of the sidelink resource scheduled in the sidelink grant;

implicitly indicating by using a code domain position of the sidelink resource scheduled in the sidelink grant;

implicitly indicating by using a time domain gap between sidelink resources scheduled in the sidelink grant;

implicitly indicating by using information of the sidelink resource scheduled in the sidelink grant;

implicitly indicating by using the type of sidelink resource scheduled in the sidelink grant;

implicitly indicating by using the presence of a sidelink feedback resource in the sidelink resource scheduled in the sidelink grant.

A comprehensive and detailed introduction of the method for sidelink transmission in the above embodiment of the present application is given by the following embodiments:

In the NR sidelink system, the core processes of an HARQ-ACK-feedback-based (the first HARQ-ACK) sidelink communication and a scheduling-based sidelink transmission comprise:

Transmitting, by a transmitter UE (a first UE) of the sidelink communication, a sidelink transmission request to a base station, specifically, to request sidelink resources for sidelink transmission;

receiving, by the transmitter UE, a sidelink grant (SL grant) transmitted by the base station, wherein scheduling information indicated in the sidelink grant includes at least sidelink resources for sidelink transmission;

transmitting, by the transmitter UE, the sidelink transmission according to the scheduling information indicated in the sidelink grant;

correspondingly, receiving, by a Receiver UE (a second UE), the sidelink transmission, and transmitting HARQ-ACK feedback information corresponding to the sidelink transmission to the transmitter UE;

receiving, by the receiver UE, the sidelink HARQ-ACK feedback information, and determining whether the retransmission is needed according to the content of the sidelink HARQ-ACK feedback information; specifically, the transmitter UE determines that the retransmission is not needed (i.e., the sidelink transmission ends), if the content indicated by the HARQ-ACK feedback is an ACK, or the sidelink transmission reaches the maximum number of retransmissions; otherwise, the transmitter UE determines that the retransmission is needed;

further determining, by the transmitter UE, whether to transmits a sidelink retransmission request to the base station, if the transmitter UE determines that the retransmission is needed; specifically, transmitting the sidelink retransmission request to the base station, if the transmitter UE determines that the retransmission is needed; or transmitting the sidelink retransmission request to the base station, if the transmitter UE determines that the retransmission is needed and there is no sidelink resource available for retransmission, specifically, to request sidelink resources for retransmission in the sidelink transmission;

repeating the above processes by the UE until no further need is determined for the sidelink transmission to be retransmitted any longer, since the subsequent processes are similar to the above processes, if the transmitter transmits a sidelink retransmission request to the base station (but the sidelink transmission request in the above processes is replaced with a sidelink retransmission request).

In the existing technique, the SL grant includes a dynamic grant and a configured grant, wherein the dynamic grant is indicated by the DCI, for example, the dynamic grant is indicated by a specific DCI format, or indicated by a DCI format scrambled by a specific radio network temporary identify (RNTI); the configured grant further includes a configured grant of Type-1 and a configured grant of Type-2, the c grant of Type-1 is configured by the RRC signaling, and the grant of Type-2 is configured by the RRC signaling and activated/released by the DCI. Optionally, in the above processes, the transmitter initials a sidelink transmission request to the base station, and receives an SL grant transmitted by the base station, wherein the SL grant includes a dynamic grant and/or a configured grant; the subsequent processes are similar to the above processes, if the transmitter initials a sidelink retransmission request to the base station, (but the sidelink transmission request in the above processes is replaced with a sidelink retransmission request), but the grant received by the transmitter UE after initialing the sidelink retransmission request to the base station is a dynamic grant. That is, the base station schedules the first transmission resource for the sidelink transmission for the transmitter UE by the dynamic grant and/or the configured grant, and schedules the retransmission resource for the sidelink transmission for the transmitter UE by the dynamic grant. The implementation of the above method depends on how the base station schedules, but from the perspective of the sidelink UE, there may be different understandings of the scheduling of the base station. For example, in case of the UE applying the above-described method, if the UE acquires the configured grant transmitted by the base station after a sidelink TB fails to be transmitted and the sidelink retransmission request is initialed, the UE may assume that the resource scheduled in the configured grant cannot be used for the retransmission of the failed TB, but is used for the initial transmission of another sidelink TB; otherwise, in case that the UE does not apply the above method, if the UE acquires the configured grant transmitted by the base station after a sidelink TB fails to be transmitted and the sidelink retransmission request is transmitted, the UE may assume that the resource scheduled in the configured grant can be used for retransmission of the failed TB.

Optionally, the sidelink transmission at least includes a transmission of the at least one given sidelink TB on the sidelink channel, and may further include a transmission of the sidelink control information (SCI) corresponding to the given sidelink TB on the sidelink channel. Correspondingly, the transmitting of the sidelink transmission by the transmitter UE according to the scheduling information indicated in the SL grant at least includes the transmitting of the at least one given sidelink TB by the transmitter UE according to the scheduling information indicated in the SL grant, and may further include transmitting of an SCI associated with the at least one given sidelink TB by the transmitter UE according to scheduling information indicated in the SL grant. Correspondingly, receiving of the sidelink transmission by the receiver UE at least includes receiving of the at least one given sidelink TB by the receiver UE, and further include receiving the SCI associated with the at least one given sidelink TB by the receiver UE; specifically, the receiver UE receives the SCI and/or receives the SL grant transmitted by the base station on the predetermined or configured sidelink resource or downlink resource, and receives the at least one given sidelink TB according to the scheduling information indicated in the received SCI and/or SL grant (the grant signaling thereof may be same or different as the SL grant received by the above transmitter).

Optionally, the information indicated in the SL grant at least includes sidelink resources for the sidelink transmission, specifically, at least include a sidelink resource for transmission of the at least one given sidelink TB on the sidelink channel, may also include a sidelink resource for transmission of the SCI associated with the at least one given sidelink TB on the sidelink channel. Optionally, a sidelink resource for the transmission of the sidelink HARQ-ACK feedback information corresponding to the at least one given sidelink TB on the sidelink channel may also be included. In one specific embodiment, the SL grant directly indicates a PSSCH resource for transmission of one sidelink TB on the PSSCH, directly or implicitly indicates a PSCCH resource for transmission of the SCI associated with the sidelink TB on the PSCCH, and also directly or implicitly indicates a PSFCH resource for transmission of the sidelink HARQ-ACK feedback information corresponding to the sidelink TB on the PSFCH. Correspondingly, the transmitter UE transmits a sidelink TB and its associated SCI according to the information indicated in the SL grant, and directly or implicitly indicates, in the SCI, a PSFCH resource for transmission of the sidelink HARQ-ACK feedback information corresponding to the sidelink TB on the PSFCH. Optionally, the indication information in the SCI is the same as the information indicated in the SL grant. For example, the value of domain of the PSFCH resource, contained in the SCI, used to indicate the transmission of sidelink HARQ-ACK feedback information, corresponding to the sidelink TB, on the PSFCH. The value is the same as the value of the domain of the PSFCH resource, contained in the SL grant, used to indicate the transmission of the sidelink HARQ-ACK feedback information, corresponding to the sidelink TB, on the PSFCH. Correspondingly, the receiver UE receives the SCI on the predetermined or configured sidelink resource, receives the one sidelink TB on the PSSCH according to the scheduling information of the PSSCH indicated in the received SCI and the scheduling information of the PSFCH indicated in the received SCI, and transmits the sidelink HARQ-ACK feedback information corresponding to the one sidelink TB on the PSFCH; specifically, the ACK information is fed back after successfully receiving the sidelink TB, otherwise the NACK information is fed back after failing to receive the sidelink TB. The receiver UE does not know that there is a sidelink transmission needed to be fed back by the UE if the receiver UE fails to receive the SCI on the predetermined or configured sidelink resources, and accordingly the receiver UE does not feedback any HARQ-ACK information.

Optionally, the information indicated in the SL grant includes at least N sidelink resources for sidelink transmission, and N is a positive integer greater than or equal to one. When N=1, the sidelink resource indicated in the SL grant is used for the initial transmission or one retransmission of the given sidelink TB of the transmitter UE; when N>1, one specific sidelink resource of the N sidelink resources indicated in the SL grant (for example, the earliest sidelink resource in the time domain) is used for the initial transmission or one retransmission of the given sidelink TB of the transmitter UE, and the remaining resource can be used for other retransmission of the given sidelink TB of the transmitter UE, and/or transmission of other sidelink TB of the transmitter UE.

Optionally, each of the sidelink resources is used for one transmission of a given sidelink TB (which may be one initial transmission or one retransmission), and thus includes at least resource on the data channel; moreover, may also be used for transmission of a control signaling and feedback signaling associated with/corresponding to the sidelink TB, and thus also includes a resource on the control channel and a resource on the feedback channel. According to the specific scheduling information, one transmission of a given sidelink TB may use one or more sidelink resources on a specific channel, for example, the transmission of feedback information corresponding to the groupcast sidelink TB may use more than one PSFCH resources, for example, the transmission of the control information associated with the sidelink TB may use more than one PSCCH resources. Therefore, optionally, each of the sidelink resources includes a set of resources on a specific sidelink channel, specifically, includes any one combination of the following: N0 PSSCH resources, N1 PSCCH resources, and N2 PSFCH resources, wherein N0, N1 and N2 are positive integers greater than or equal to 1.

Optionally, when N>1, if there are still unused resources in the N sidelink resources indicated in the SL grant after the transmitter UE successfully transmits the sidelink TB, the transmitter UE may release the remaining unused resources, and/or determines the use of the unused resources by itself.

Optionally, the UE releases all the unused sidelink resource; or the UE determines the use of all the unused sidelink resource; or the UE determines the use of a portion of the unused sidelink resources and releases the remaining unused resources.

The advantages of the above solutions of N=1 and N>1 are respectively as below: when the SL grant indicates only one resource (N=1), the design of signaling of the SL grant is simpler, and the number of bits is saved; moreover, it may be determined that the indicated resource must be used by the transmitter UE for the sidelink transmission of the specific TB, which enables the base station to have clearer control over the correspondence between the usage of air interface resource and the service data, does not have the problem of wasting the remaining unused resources, and also avoids the additional signaling overhead and delay introduced by the UE triggering the resource release process. In contrast, when the SL grant indicates multiple resources (N>1), the UE has multiple sidelink resources that can be directly used for sidelink transmission/retransmission, instead of requesting the base station to schedule for each sidelink retransmission; once the UE has actual retransmission requirement, it may save the delay of arriving of the scheduled sidelink retransmission resources and the signaling overhead during the processes of the UE transmitting the retransmission request to the base station, listening to the SL grant transmitted by the base station, and waiting for the SL grant; if the time domain gap between multiple resources scheduled by the base station is short, the solution is a compromise between resource occupancy and the delay, and this solution is more suitable for the delay-sensitive sidelink service (such as, automatic driving, remote driving).

Optionally, when N=1, the transmitter UE indicates one PSSCH resource in the SCI, wherein the PSSCH resource is the N=1 PSSCH resource indicated in the SL grant, and the PSSCH associated with the SCI is transmitted on the PSSCH resource.

Optionally, when N>1, the transmitter UE indicates the N1 PSSCH resources in the SCI, when indicating the sidelink resource information in the SCI associated with the initial transmission or retransmission of the sidelink TB, the N1 PSSCH resources is a subset of N>1 PSSCH resources indicated in the SL grant, and:

a) N1=1, the PSSCH associated with the SCI is transmitted on the PSSCH resource;

b) 1<N1<=N, the PSSCH associated with the SCI is transmitted on the first or o specific PSSCH resource in the N1 PSSCH resources, and the remaining N1-1 PSSCH resources are reserved by the transmitter UE, the use of which is determined by the UE itself. Optionally, they can be used for subsequent possible sidelink transmission.

The main purpose of the reservation is that: other UE will exclude the reserved sidelink resource by the transmitter UE when selecting the sidelink resource, if it is configured that the sidelink transmission of sidelink resource is selected by the UE itself in the resource pool (i.e., mode 2), thereby reducing the probability of collision of sidelink transmissions on the reserved resource.

Optionally, when N>1, the transmitter UE may release the remaining unused resource, if there is unused resource in the N sidelink resources indicated in the SL grant after the transmitter UE successfully transmits the above sidelink TB. Optionally, the transmitter UE transmits the sidelink resource release signaling to the base station, to notify the base station that the transmitter UE releases the remaining unused sidelink resource. The advantage of this mechanism is that the UE does not decide the transmission of Mode 1 without the scheduling of the base station, thereby enhancing the control capability of the base station for the sidelink transmission, and contributing to avoid the waste of resource that scheduled by the base station for the UE when there is no need to transmit the sidelink signaling. Or, the transmitter UE determines to release the sidelink resource by itself, and does not report to the base station by using the signaling of the Uu interface (i.e., the uplink signaling). Compared with the former method, the advantage of this mechanism is that the overhead of uplink signaling is reduced.

If the transmitter UE determines to release the remaining unused sidelink resource, and if the released resource or a subset of the released resources are reserved by the transmitter UE in the manner of being indicated in the SCI, optionally, the transmitter UE may also transmit sidelink resource release signaling in the sidelink to notify other sidelink UE that the transmitter UE releases the remaining unused resource. Optionally, the sidelink resource release signaling transmitted to the base station and the sidelink resource release signaling transmitted in the sidelink may use the same or different signaling formats.

Optionally, when N>1, the transmitter UE determines the use of unused resource by itself if there is unused resource in the N sidelink resources indicated in the SL grant after the transmitter UE successfully transmits the above sidelink TB. Optionally, the remaining unused resource may be used for transmission of other sidelink TB, including initial transmission and/or retransmission of other sidelink TB. The advantages of the mechanism may be improved the flexibility of sidelink scheduling and sidelink transmission, and reduced the signaling overhead and the delay of resource scheduling. The following are some typical application scenarios of the method (the following reference numbers are only used as the names/identifications of different scenarios, and do not imply a corresponding order between scenarios):

a) The UE supports both a resource allocation mode based on base station scheduling (Mode 1) and a resource allocation mode autonomously selected by the UE (Mode 2), and/or sidelink resource scheduled by the base station can be used for both the Mode 1 and the Mode 2 (for example, the sidelink resource scheduled by the base station is in the sidelink resource pool configured with Mode 1, and also in the sidelink resource pool configured with Mode 2; or the Mode 1 and the Mode 2 are both configured in the resource pool in which the sidelink resource scheduled by base station is located); if there is remaining unused sidelink resource scheduled by the base station in the Mode 1 transmission, the UE may transmit the sidelink data, originally transmitted by Mode 2, on the remaining sidelink resource by itself to avoid the wasting of resource.

b) The UE has multiple HARQ processes, and correspondingly, the UE transmits the initial transmission and/or retransmission of multiple TBs on multiple HARQ processes respectively; the UE can transmit the initial transmission and/or retransmission of the TB of other HARQ process on the remaining unused resource by itself, if there is remaining unused sidelink resource scheduled by the base station for the HARQ process after one HARQ process is successfully transmitted, thereby reducing the delay and overhead of requesting the sidelink resource from the base station.

c) The data transmitted by the higher layer of the UE to the physical layer includes multiple TBs in the physical layer. After successfully transmitting one of the TBs, the UE may use the remaining unused resource for the transmission of other TB by itself, instead of requesting one sidelink resource from the base station for each TB, thereby reducing the delay and overhead of requesting the sidelink resource from the base station.

Optionally, the UE assumes that all resources indicated in one SL grant are used for at least one of the following:
the initial transmission of one sidelink transmission block (TB);
one or more retransmissions of one sidelink TB;
the initial transmission of more than one sidelink TBs;
one or more retransmissions of more than one sidelink TBs.

Optionally, the UE determines that all resources indicated in one SL grant are used for at least one of the above, according to the type of the SL grant being a dynamic grant and/or a configured grant of Type-1 and/or a configured grant of Type-2, and/or according to the transmission of the sidelink TB being a blind retransmission or an HARQ-based transmission.

Optionally, the UE determines that all resources indicated in the dynamic grant are used for: the initial transmission of one sidelink TB, one or more retransmissions of one sidelink TB, the initial transmission of more than one sidelink TBs, and one or more retransmissions of more than one sidelink TBs.

Optionally, if the sidelink TB uses the HARQ-based transmission, the UE determines that all resources indicated in the configured grant of Type-1 and/or Type-2 are used for the initial transmission of one sidelink TB, the initial transmission of more than one sidelink TBs, or the initial transmission and one or more retransmissions of one sidelink TB. Optionally, if the sidelink TB uses blind retransmission, the UE determines that all resources indicated in the configured grant of Type-1 and/or Type-2 are used for the initial transmission and one or more retransmissions of one sidelink TB, and/or the initial transmission and one or more retransmissions of more than one sidelink TBs.

Optionally, the SL grant also indicates whether to enable or disable HARQ-ACK feedback. Specifically, the SL grant also indicates whether the sidelink transmission scheduled by the SL grant enables or disables HARQ-ACK feedback. In this method, which is as an indication method for dynamically enabling/disabling HARQ-ACK feedback, the semi-statically configured HARQ-ACK configuration will be overwritten. If the UE acquires the dynamically indicated HARQ-ACK configuration after acquiring the semi-statically configured HARQ-ACK configuration, the UE will determine the HARQ-ACK configuration according to the dynamic indication information. For example, when the HARQ-ACK feedback is indicated to be disabled in the resource pool configuration, or when the UE derives that the given sidelink transmission disables HARQ-ACK feedback according to a predefined criterion, the UE enables HARQ-ACK feedback for the sidelink transmission scheduled in the SL grant, if the SL grant acquired by the UE indicates to enable HARQ-ACK feedback; and vice versa.

Optionally, the indication of enabling/disabling HARQ-ACK feedback is explicitly indicating or implicitly indicating. For explicitly indicating, a typical method is to use a specific field in the SL grant (e.g., a 1-bit HARQ-ACK indicator field) to indicate enabling or disabling HARQ-ACK feedback. For implicitly indicating, a typical manner is to use at least one of the followings to implicitly indicate:

a) the number N of sidelink resources scheduled in the SL grant. For example, when N=1 or N belongs to a predetermined set of values, the transmission scheduled by the SL grant is a HARQ-ACK-based transmission, that is, when the UE acquires that N=1 or N belongs to an predetermined set of values, the UE determines enabling the HARQ-ACK feedback; when N>1 or N does not belong to a given set of values, the transmission scheduled by the SL grant is a transmission based on blind retransmission, that is, when the UE acquires N>1 or N does not belong to a predetermined set of values, the UE determines disabling the HARQ-ACK feedback. A typical scenario of the method is: the sidelink transmission supports both the HARQ-ACK feedback-based transmission and the blind retransmission, and the number of blind retransmissions is N1, then if the number of sidelink resources scheduled by the SL grant is 1, the SL grant schedules one HARQ-ACK feedback-based transmission; otherwise, if the number of sidelink resources scheduled by the SL grant is N1, the SL grant schedules N1 blind retransmissions.

b) the time domain and/or frequency domain and/or code domain position of the sidelink resources scheduled in the SL grant. Optionally, the position is implicitly indicated by the time domain gap between the sidelink resources scheduled in the SL grant. For example, N sidelink resources are scheduled in the SL grant, and the period of the N sidelink resources in the time domain is k slots. If k is greater than a given threshold or k is greater than or equal to a given threshold, the transmission scheduled by the SL grant is the HARQ-ACK-based transmission, that is, if the UE acquires that k is greater than a given threshold or k is greater than or equal to a given threshold, the UE determines enabling HARQ-ACK feedback; if k is less than or equal to a given threshold or k is less than a give threshold, the transmission scheduled by the SL grant is a blind-retransmission-based transmission, that is, if the UE acquires that k is less than or equal to a given threshold or k is less than a give threshold, the UE determines disabling the HARQ-ACK feedback. A specific embodiment is that: the resources scheduled in the SL grant include at least N PSSCH resources, the period of the N PSSCH resources in the time domain is k slots, and the UE determines whether the sidelink transmission scheduled by the SL grant enables the HARQ-ACK feedback by using the value of k. A typical scenario of the method is that: the value of the threshold k reflects the delay of the HARQ feedback, and the delay is the minimum delay or typical delay from the time when transmitter UE starts or completes the transmission of the sidelink data and/or the control message, to the time when the transmitter UE receives the HARQ-ACK feedback information from the receiver and decodes and processes the information. If the period of the sidelink resources scheduled by the SL grant is greater than the delay of the HARQ feedback, the UE has the capability to acquire the HARQ-ACK feedback message before the next retransmission of the sidelink data and determine whether to actually retransmit the sidelink data according to the feedback message; otherwise, if the period of the sidelink resource scheduled by the SL grant is smaller than the delay of the HARQ feedback, the UE can only perform the blind-retransmission-based sidelink transmission.

c) the information or type of sidelink resources scheduled in the SL grant. Optionally, the information or type is implicitly indicated by the presence of the sidelink feedback resource in the sidelink resource scheduled in the SL grant. For example, if the SL grant acquired by the UE explicitly or implicitly indicates the resources used for sidelink feedback, the UE determines that the sidelink transmission scheduled by the SL grant enables HARQ-ACK feedback; otherwise, if the SL grant acquired by the UE does not explicitly or implicitly indicate the resources used for sidelink feedback, and/or the SL grant acquired by the UE explicitly or implicitly indicates that there is no resource for sidelink feedback, the UE determines that the sidelink transmission scheduled by the SL grant disables HARQ-ACK feedback. Wherein, for the SL grant implicitly indicating the resources used for the sidelink feedback, a typical embodiment is that: the PSCCH and/or PSSCH resources for the sidelink transmission are indicated in the SL grant, and the UE can derive and determine the PSFCH resources corresponding to the PSCCH and/or PSSCH resources according to predetermined and/or configured information. In a resource pool configuration, not all PSCCH and/or PSSCH resources have corresponding PSFCH resources. Therefore, the UE determines that the resources used for sidelink feedback are implicitly indicated in the SL grant based on that the SL grant indicates that the PSCCH and/or the PSSCH resources have corresponding PSFCH resources; otherwise, the UE determines that the SL grant implicitly indicates that there is no resource for sidelink feedback or that the SL grant does not implicitly indicate the resources for sidelink feedback, based on that the SL grant indicates that the PSCCH and/or PSSCH resources have no corresponding resources.

The above method describes how to implicitly or explicitly indicate enabling/disabling HARQ-ACK feedback in SL grant. Similarly, the above method can also be used to implicitly or explicitly indicate enabling/disabling HARQ-ACK feedback in the sidelink control information (SCI), comprising at least one of the following: using a specific field (e.g., 1 bit) to explicitly indicate enabling/disabling HARQ-ACK feedback in the SCI; using the number of sidelink resources N scheduled or reserved by SCI in the SCI to implicitly indicate enabling/disabling HARQ-ACK feedback; using the time domain and/or frequency domain and/or code domain position of the sidelink resources scheduled or reserved by the SCI in the SCI to implicitly indicate enabling/disabling HARQ-ACK feedback. The specific determination method of the implicitly indicating is similar to that of method of indicating in the SL grant above-described. The method for implicitly or explicitly indicating enabling/disabling HARQ-ACK feedback in the sidelink control information (SCI) may be used in the Mode 1 transmission of the base station scheduling sidelink resource, or may be used in the Mode 2 transmission in which the UE determines the sidelink resource by itself.

In the above method, the explicitly indicating has main advantage of no restrictions on the specific situation of resource scheduling, but the explicit indication will cause additional 1-bit signaling overhead; the main advantage of implicitly indicating a) is that the enabling/disabling indication can be integrated into the number of scheduled resources, and there is no need to indicate enabling/disabling HARQ-ACK feedback by a separate field, so as to simplify the number of bits of SL grant, however, the disadvantage thereof is that implicit indication may also increase the number of bits indicating the number of resources, and indirectly limit the number of resources that can be indicated in the SL grant when scheduling resources for the HARQ-based sidelink transmission; the main advantage of implicitly indicating b) and c) is that no additional signaling indication is needed, and there is no restriction on the number of resources, however, the disadvantage thereof is that implicit indication depends on the specific resource structure of the sidelink resource pool, and is not applicable in all scenarios.

The above a) b) c) are only used as the identification number of the different indication methods, and do not imply any order in logic or time between different schemes.

Optionally, the scheduling information of the sidelink transmission indicated in the SL grant includes an index of a resource pool in which the resource for sidelink transmission is located and/or an index of a Bandwidth Part (BWP) in which the resource for sidelink transmission is located. The advantage of indicating the index of resource pool is that, in the existing technique, if the scheduled resource is a resource within a certain BWP, the DCI needs to indicate the frequency domain resource according to the BWP bandwidth; in this method, if the scheduled resource can be narrowed down to those within a certain resource pool by the index of the resource pool, the DCI only needs to indicate the frequency domain resource according to the frequency domain bandwidth of the resource pool, so that the number of bits used to indicate the frequency domain resource can be reduced, and the overhead is reduced. The advantage of indicating the BWP index is that the sidelink resource indicated by the SL grant and the SL grant can be on different BWPs, so that the base station can schedule the sidelink transmission across the BWPs, which enhances system flexibility and also enables the BWP of the Uu air interface of UE to the base station and the BWP of the sidelink air interface between UEs are independent of each other, so that the handover of one of the BWPs does not affect the normal communication of the other.

The transmitter UE receives the sidelink HARQ-ACK feedback information, and may report the received HARQ-ACK feedback information to the base station.

After the transmitter UE transmits the sidelink data, and acquires HARQ-ACK feedback information from the receiver UE (for convenience of description, the HARQ-ACK feedback information from the receiver UE obtained by the transmitter UE on the sidelink is called HARQ-ACK-1, and the HARQ-ACK-1 is the first HARQ-ACK), the transmitter UE may report the HARQ-ACK feedback information of the sidelink transmission to the base station (for the convenience of description, the HARQ-ACK feedback information to indicate whether the sidelink transmission succeeds transmitted by the transmitter UE in the uplink is called HARQ-ACK-2, and the HARQ-ACK-2 is the second HARQ-ACK. "1" and "2" are only used to identify the names of different HARQ-ACK information, and do not imply any logical or time order between two types of HARQ-ACK messages). In addition, if the transmitter UE expects to receive the HARQ-ACK-1 from the receiver UE on the corresponding sidelink feedback resource position after transmitting the sidelink data, but the transmitter UE actually fails to receive the HARQ-ACK-1 in fact, the transmitter UE may still report the HARQ-ACK feedback information of the sidelink transmission to the base station, and the content of the reported HARQ-ACK-2 is the NACK or the DTX. Wherein, the DTX is a state used exclusively to indicate that the transmitter UE fails to receive HARQ-ACK-1 from the receiver UE.

Optionally, the transmitter UE explicitly reports the HARQ-ACK-2 to the base station, and the content of the reported HARQ-ACK-2 includes at least one of the following: ACK, NACK, and DTX. Wherein, the DTX means that the transmitter UE fails to receive the HARQ-ACK-1 from the receiver UE.

Optionally, the transmitter UE assumes that the not reporting HARQ-ACK feedback information (HARQ-ACK-2) is interpreted by the base station as the UE implicitly indicating at least one of the following: ACK, NACK, and DTX. When the transmitter UE needs to indicate at least one of the above information to the base station, the transmitter UE performs an implicit indication in a manner of not reporting HARQ-ACK-2.

As a combination of the above-described two manners, optionally, the transmitter UE explicitly reports part of states of the HARQ-ACK feedback information, and implicitly indicates the remaining states of the HARQ-ACK feedback information in a non-reporting manner.

Compared with the conventional HARQ-ACK information only carrying the ACK or NACK information, the DTX and the NACK respectively indicate two different reasons for the transmission failure, which helps the base station to better select specific scheduling parameter according to reasons for the transmission failure when the base station schedules the retransmission of the transmitter UE. For example, the reason that the base station considers DTX may be that the receiver UE is in a sleep state, and schedules the next retransmission of the transmitter UE in a period of time when the receiver UE wakes up from the sleep state, according to the information of the receiver UE; or the reason that the base station considers the DTX may be that the energy of the PSCCH and/or other sidelink channel/signal of the transmitter UE is insufficient to cover the receiver UE, such that the power of the PSCCH and/or other sidelink channel/signal in the retransmission scheduling information is improved.

Optionally, the transmitter UE does not explicitly report ACK information, and it is assumed that no report of HARQ-ACK-2 will be interpreted by the base station that the UE implicitly indicates the ACK. The transmitter UE explicitly reports the NACK and/or the DTX information. Specifically, the HARQ-ACK-2 reported by the transmitter UE indicates the states of NACK and DTX by using one bit.

Optionally, the transmitter UE explicitly reports the ACK and NACK information, and it is assumed that no HARQ-ACK-2 being reporting will be interpreted by the base station as the UE implicitly indicates the DTX. Specifically, the HARQ-ACK-2 reported by the transmitter UE indicates the states of ACK and NACK by using one bit.

Optionally, the transmitter UE feeds back the HARQ-ACK information (HARQ-ACK-2) of the sidelink transmission to the base station, wherein the content of the HARQ-ACK-2 reported by the feedback signaling further includes information for requesting the retransmission resource of the sidelink transmission from the base station and/or information for requesting transmission resource of another sidelink transmission from the base station. Specifically, the information includes at least one of the following: a parameter indicating a service priority (e.g., a priority, a quality of service (QoS), a ProSe Per-Packet Priority (PPPP)), a BSR, an SR, a parameter related to modulation and coding (e.g., an MCS, a TBS, and a target bitrate), a parameter related to power control (e.g., a path loss of the downlink and/or sidelink, an RSRP of the sidelink transmission, and an alpha and p0 in existing power control mechanism), a sidelink CSI (e.g., a CSI, a CQI, an RI, a PMI of the sidelink), and information related to sidelink resource selection (e.g., a congestion level, a channel sensing result).

Optionally, the sidelink retransmission request signaling reported by the transmitter UE to the base station further includes information for requesting the retransmission resource of the sidelink transmission from the base station, and/or information for requesting transmission resource of another sidelink transmission from the base station. Specifically, the information includes at least one of the following: a parameter indicating a service priority (e.g., a priority, a quality of service (QoS), a ProSe Per-Packet Priority (PPPP)), a BSR, a SR, a parameter related to modulation and coding (e.g., a MCS, a TBS, and a target bitrate), a parameter related to power control (e.g., a path loss of the downlink and/or sidelink, an RSRP of the sidelink transmission, and an alpha and p0 in existing power control mechanism), a sidelink CSI (e.g., a CSI, a CQI, an RI, a PMI of the sidelink), and information related to sidelink resource selection (e.g., a congestion level, a channel sensing result).

The advantage of additionally reporting the above content contributes to the base station to more appropriately schedule the retransmission resource of the sidelink transmission. For example, in the sidelink communication system, the UE is more aware of the channel state of the sidelink transmission than the base station, and may assist the base station to determine the specific parameter for scheduling resource by reporting information such as the MCS, the TBS, and the power control parameter. For example, the UE reports resource pool related information, which helps the base station to determine the state of the sidelink transmission channel and thus indicates more suitable scheduling information according to the channel state.

Optionally, after transmitting the sidelink data and obtaining the HARQ-ACK-1 from the receiver UE, the transmitter UE may report the HARQ-ACK-2 indicating whether the sidelink transmission succeeds to the base station; after it is determined that the retransmission is needed, the sidelink retransmission request signaling may be reported to the base station; after the sidelink TB is successfully transmitted, the sidelink resource release signaling may be reported to the base station. Optionally, the reporting of the HARQ-ACK-2 and/or the sidelink retransmission request signaling and/or the sidelink resource release signaling, by the UE, includes at least one of the following:

determining, by the transmitter UE, that retransmission is needed and that the sidelink retransmission request signaling needs to be transmitted to the base station; and transmitting the HARQ-ACK-2 to the base station by the transmitter UE, wherein the content of the HARQ-ACK-2 includes the NACK or the DTX, and the HARQ-ACK-2 is used as the sidelink retransmission request signaling;

determining, by the transmitter UE, that the sidelink resource needs to be released and that the sidelink resource release signaling needs to be transmitted to the base station; and transmitting the HARQ-ACK-2 to the base station by the transmitter UE, and the content of the HARQ-ACK-2 includes the ACK, and the HARQ-ACK-2 is used as the sidelink resource release signaling;

determining, by the transmitter UE, that the retransmission is needed and that the sidelink retransmission request signaling needs to be transmitted to the base station; and transmitting, by the transmitter UE, the sidelink retransmission request signaling to the base station; optionally, the sidelink retransmission request signaling carries at least the HARQ-ACK information indicating whether the sidelink transmission succeeds; optionally, the sidelink retransmission request signaling and the HARQ-ACK-2 are different signaling independent of each other;

determining, by the transmitter UE, that the sidelink resource needs to be released and that the sidelink resource release signaling needs to be transmitted to the base station; and transmitting the sidelink resource release signaling to the base station by the transmitter UE; optionally, the sidelink resource release signaling carries at least the HARQ-ACK information indicating whether the sidelink transmission succeeds; optionally, the sidelink resource release signaling and the HARQ-ACK-2 are different signaling independent of each other.

After transmitting the sidelink data each time, the transmitter UE transmits the HARQ-ACK information indicating whether the sidelink transmission succeeds to the base station.

Optionally, when the content of the HARQ-ACK-2 reported by the UE is the ACK, the reported HARQ-ACK-2 may be used as a sidelink resource release signaling, used for requesting to release the remaining unused resource in the sidelink resources indicated by the sidelink grant. Or, the sidelink resource release signaling is another specific signaling, and the UE respectively reports the HARQ-ACK-2 and the sidelink resource release signaling, which are respectively used for reporting HARQ-ACK feedback information of the sidelink transmission and requesting to release the remaining unused resource in the sidelink resources indicated by the SL grant. The advantage of using ACK as a sidelink resource release signaling is that the signaling overhead can be reduced. In contrast, the scheduling flexibility can be improved by using specific sidelink resource release signaling. For example, it is more appropriate to use the specific sidelink resource release signaling in the scenario in which the UE reports the sidelink HARQ-ACK feedback, and also expects to determine the use of the remaining resource by itself after reporting the ACK, no matter whether the retransmission is needed or whether the resource releasing is needed after transmitting the sidelink data each time.

Optionally, when the content of the HARQ-ACK-2 reported by the UE is the NACK and/or the DTX, the reported HARQ-ACK-2 may be used as a sidelink retransmission request. Or, the sidelink retransmission request signaling is another specific signaling, and the UE respectively reports the HARQ-ACK-2 and the sidelink retransmission request signaling, which are respectively used for reporting the HARQ-ACK feedback information of the sidelink transmission and requesting for the sidelink retransmission resource. Optionally, the sidelink retransmission request signaling further indicates information for requesting the retransmission resource of the sidelink transmission from the base station, and/or information for requesting the transmission resource of another sidelink transmission from the base station, such as the QoS, the TBS/MCS, the path loss of the downlink/sidelink. Similarly, the advantage of using NACK as the sidelink retransmission request signaling is that the signaling overhead can be reduced. In contrast, the scheduling flexibility can be improved by using specific sidelink retransmission request signaling, and more information, helping the base station to schedule retransmission resource, is reported to the base station by the specific sidelink retransmission request signaling if the ACK/NACK of the HARQ-ACK-2 uses a uniform format (for example, using 1 bit to indicate the ACK/NACK).

Optionally, the sidelink retransmission request signaling is indicated by reporting the NACK/DTX, and/or the sidelink resource release signaling is indicated by reporting the ACK. After transmitting the sidelink data and obtaining the HARQ-ACK-1 from the receiver UE, the transmitter UE reports the HARQ-ACK-2 to the base station, if it is determined that the retransmission is needed and the sidelink retransmission request signaling needs to be transmitted to the base station, wherein the content of the HARQ-ACK-2 is the NACK or the DTX; and/or, transmitting the HARQ-ACK-2 to the base station if it is determined that the remaining sidelink resource needs to be released, wherein the content of the HARQ-ACK-2 is ACK; otherwise, the UE does not report the HARQ-ACK-2.

Optionally, the sidelink retransmission request signaling, the sidelink resource release signaling, and the HARQ-ACK-2 are different signaling independent of each other. The transmitter UE reports the HARQ-ACK information indicating whether the sidelink transmission succeeds to the base station after transmitting the sidelink data each time. Furthermore, when the retransmission is needed, the transmitter UE requests resource of sidelink transmission from the base station by transmitting one independent sidelink retransmission request signaling; when the remaining sidelink resource needs to be released, the transmitter UE notifies the base station that the transmitter UE releases the remaining sidelink resource by transmitting one independent sidelink resource release signaling.

Optionally, the transmitter UE does not explicitly report the sidelink retransmission request signaling, but implicitly request resource of sidelink transmission from the base station according to the sidelink resource scheduling information and the content of the reported HARQ-ACK information for indicating whether the sidelink transmission succeeds. The transmitter UE reports the HARQ-ACK information indicating whether the sidelink transmission succeeds to the base station after transmitting the sidelink data each time; the HARQ-ACK information further implicitly requests resource for sidelink transmission from the base station, if the indicated information is the NACK/DTX, and the transmitter UE has no sidelink resource available to sidelink retransmission according to the scheduling information previously provided by the base station. Optionally, the sidelink resource release signaling and the HARQ-ACK-2 are different signaling independent of each other. When the remaining sidelink resource needs to be released, the transmitter UE notifies the base station that the transmitter UE releases the remaining sidelink resource by transmitting one independent sidelink resource release signaling; or the transmitter UE determines how to use the remaining sidelink resource by itself, instead of explicitly reporting the sidelink resource release signaling and releasing the remaining sidelink resource.

The base station may determine the correspondence between the HARQ-ACK information reported by the UE and the sidelink transmission, since the base station should know that under which condition the transmitter UE reports the HARQ-ACK information indicating whether the sidelink transmission succeeds to the base station, and knows how the transmitter UE selects the resource for transmitting the HARQ-ACK information. Therefore, if the transmitter UE reports the HARQ-ACK information indicating whether the sidelink transmission succeeds to the base station after transmitting the sidelink data each time, the base station is capable to determine whether the transmitter UE has the sidelink resource available for sidelink transmission/retransmission scheduled by the base station, and capable to determine whether to schedule resource for sidelink transmission for the transmitter UE.

For the method of reporting the HARQ-ACK-2 only when the sidelink resource request or the sidelink resource release is indicated, it has the advantages of reducing the uplink signaling overhead of the UE, reducing the negative impact of the problem that the UE is unable to receive the sidelink transmission when reporting the HARQ-ACK-2, due to the half-duplex, on the sidelink system, and reducing the negative impact of the problem that the UE may not be able to transmit the sidelink data when reporting the HARQ-ACK-2 under the limitation of total transmission power on the sidelink system. In contrast, the method of reporting the HARQ-ACK-2 after each sidelink transmission has the advantage that the base station can better control the state of the sidelink transmission since the UE must report after transmitting the sidelink data each time, and the report is predictable since UE must report after the completion of the sidelink transmission and receiving the HARQ-ACK information that is fed back by another UE on the sidelink, so that the interference due to the miss detection of the uplink signaling can be reduced. For example, in the latter method, it is assumed that the reporting of sidelink HARQ-ACK is miss detection or it is assumed that the SL grant corresponding to the transmission is not successfully received by the UE, if the HARQ-ACK information transmitted by the UE is miss detection and the base station does not detect the transmission of the UE at the position where the uplink signaling is expected to be received; otherwise, in the former method, the base station assumes that the UE does not need to perform retransmission/resource releasing, if the sidelink retransmission request transmitted by the UE is miss detection and the base station does not know this missed detection.

For the above case where the HARQ-ACK information transmitted by the UE is miss detection and the UE implicitly indicates the DTX to the base station by not reporting the HARQ-ACK-2, the base station may interpret the not reporting of HARQ-ACK-2 as: the DTX, or miss detection of the reporting of the HARQ-ACK-2, or the SL grant corresponding to the transmission being not successfully received by the UE. To solve the problem, optionally, after receiving the SL grant information, the transmitter UE transmits, to the base station, HARQ-ACK information for the reception of SL grant (for convenience of description, it is called HARQ-ACK-3, and there is no logical or time order between the HARQ-ACK-1/2 with the HARQ-ACK-3). By determining whether the HARQ-ACK-3 is obtained, the base station can distinguish the DTX/miss detection of HARQ-ACK-2 from the SL grant being not successfully received by the UE.

Optionally, the transmitter UE determines at least one of the following: the content of the HARQ-ACK-2 reported to the base station, whether to report the at least one given states of the HARQ-ACK-2 to the base station explicitly or implicitly, how to report the HARQ-ACK-2 to the base station (for example, reporting after each sidelink transmission or reporting when the HARQ-ACK is required to be used as the sidelink retransmission request signaling/sidelink resource release signaling), whether to report the sidelink resource retransmission signaling and/or sidelink resource release signaling to the base station, how to report the sidelink resource retransmission signaling and/or sidelink resource release signaling to the base station (e.g., by using HARQ-ACK information or using independent signaling to report). The determining includes: determining, by the transmitter UE, according to information, which is predefined or pre-configured, or configured by the base station; or determining, by the transmitter UE, according to the scheduling information dynamically indicated by the base station.

Optionally, the transmitter UE determines at least one items of the above-described contents according to whether the base station indicates an uplink resource corresponding to each sidelink resource in the SL grant.

Optionally, if the uplink resource corresponding to each sidelink resource is indicated in the SL grant acquired by the transmitter UE, the transmitter UE reports the sidelink resource release signaling to the base station when the sidelink resource needs to be released; otherwise, the transmitter UE does not report the sidelink resource release signaling to the base station. Since the transmitter UE may request to release the remaining sidelink resource after any sidelink transmission due to successful transmission, in this case, the base station needs to allocate the corresponding uplink resource for reporting sidelink resource release signaling for each sidelink transmission.

Optionally, if the uplink resource corresponding to each sidelink resource is indicated in the SL grant acquired by the transmitter UE, the transmitter UE reports the HARQ-ACK-2 after each sidelink transmission; otherwise, if the uplink resource corresponding to the latest one sidelink resource in the time domain is indicated in the SL grant acquired by the transmitter UE, the transmitter UE reports the HARQ-ACK-2 after the latest one sidelink transmission in the time domain.

Optionally, the transmitter UE determines at least one of the above information corresponding to the HARQ-ACK-3 in similar manners.

The transmitter UE reports, to the base station, the HARQ-ACK information (HARQ-ACK-2) for indicating whether the given sidelink transmission succeeds, and the feedback signaling is carried by the uplink channel.

Optionally, the uplink channel is a PUCCH channel or a specific channel dedicated for sidelink UE reporting HARQ-ACK-2. Optionally, the feedback signaling is PUCCH signaling. The PUCCH signaling reuses PUCCH signaling in the existing technique, or uses a specific PUCCH signaling dedicated to the sidelink UE to report HARQ-ACK-2. Optionally, the feedback signaling includes the ACK/NACK signaling, which reuses the ACK/NACK format in the existing technique, or uses a specific ACK/NACK format dedicated to the sidelink UE to report HARQ-ACK-2.

Optionally, the uplink channel is a PUSCH channel. Optionally, the feedback signaling is a higher layer signaling, including an RRC signaling and/or a MAC signaling, for example, a MAC CE or a MAC header/a MAC subheader.

Optionally, the transmitter UE reports, to the base station, the HARQ-ACK information (HARQ-ACK-2) for indicating whether the given sidelink transmission succeeds, by using at least one of the following manners: by using the independent signaling to report HARQ-ACK-2; by multiplexing HARQ-ACK-2 with other uplink signaling/channels; and by piggybacking HARQ-ACK-2 on other uplink signaling/channels.

Optionally, the transmitter UE determines, according to at least one of the following manners, the resources used for reporting the HARQ-ACK-2:

determining resources for reporting HARQ-ACK-2 according to a resource position directly indicated in a signaling;

deriving and determining resources for reporting HARQ-ACK-2 according to: a resource position of a specific signaling/channel, a resource mapping relationship between the specific signaling/channel and the HARQ-ACK-2 wherein the specific signaling/channel is configured or indicated by the base station or predefined/preconfigured, and other information used for deriving the resource of feedback information wherein the other information is configured or indicated by the base station or predefined/preconfigured.

Optionally, the specific signaling/channel comprises at least one of: a SL grant, a given sidelink transmission, a sidelink channel used for a given sidelink transmission, a sidelink transmission or a sidelink channel scheduled by the SL grant, and a specific uplink signaling.

Optionally, the SL grant is a SL grant for scheduling the given sidelink transmission.

Optionally, the sidelink transmission comprises at least one of the following types: the transmission of the sidelink data on the sidelink data channel, the transmission of the sidelink control information (SCI) corresponding to the sidelink data on the sidelink control channel, and the transmission of the feedback message corresponding to the sidelink data on the sidelink feedback channel. Optionally, the sidelink channel comprises at least one of the following: PSCCH, PSSCH and PSFCH.

Optionally, the specific uplink signaling is a UCI, optionally, the specific uplink signaling is the UCI carrying the HARQ-ACK feedback information of the downlink transmission; and/or the specific uplink signaling is a PUSCH.

Optionally, the transmitter UE determines the resources used by the HARQ-ACK-2 according to the resource position of a specific signaling/channel and the resource mapping relationship, which is configured by the base station or predefined/preconfigured, between the specific signaling/channel and the HARQ-ACK-2. Specifically, the transmitter UE calculates and obtains the time domain resource starting position t0+delta t and/or the frequency domain resource starting position f0+delta f used by the HARQ-ACK-2, according to a time domain resource position (or starting/ending position) t0 and/or a frequency domain resource position (or starting/ending position) f0 of the specific signaling/channel, and according to a time domain offset delta t and/or a frequency domain offset delta f which is configured by the base station or predefined or pre-configured, and determines the size of time domain and/or frequency domain resource of the HARQ-ACK-2 according to other configuration information, which is configured or indicated by the base station or predefined/preconfigured, used for deriving the resource of feedback information. Similarly, the transmitter UE may also calculate and acquire the resource positions of HARQ-ACK-2 according to t0 and/or f0 and using a predefined formula and/or parameters, which are configured or indicated by the base station or predefined or pre-configured, within the formula.

Wherein, the unit of the time domain offset delta t may be a slot or a physical time length, such as milliseconds. If the unit of the time domain offset delta t is a slot, it may further be a physical slot, or an uplink slot, or a downlink slot, or a sidelink slot, or a combination of more than one of the above.

For a combination of more than one of the above, a specific example is that the time domain offset delta t includes K0 sidelink slots and K1 uplink slots. Further, there is a predetermined order between the different types. For example, the UE obtains, by calculating, the time domain resource starting position t0+delta t used by the HARQ-ACK-2, which specifically includes: the UE counts K0 sidelink slots after t0 according to the time domain resource position (or starting/ending position) t0 of the specific signaling/channel, and then counts the K1 uplink slots after K0 sidelink slots after t0.

In another specific example, the uplink slots in the above example may also be replaced with physical slots, and the rest remains the same. The detail description will not be repeated herein.

The above two specific examples have the following advantages: if t0 is the time domain resource position of the last PSSCH scheduled by the sidelink grant, the UE may expect that the UE can obtain the HARQ-ACK feedback of the UE of the sidelink receiver of the PSSCH in K0 sidelink slots according to the PSFCH configuration (e.g., the time domain period of the PSFCH resources); the remaining K1 uplink slots or physical slots as the processing delay can ensure that the UE can complete the HARQ-ACK-2 encoding and preparation for other possible transmissions.

If the unit of the time domain offset delta t is a slot, further, the UE determining of the resource of the HARQ-ACK-2 further includes at least one of the following:

the time domain offset delta t is calculated by using the physical length of the sidelink slot, if the physical length of the uplink slot and/or the downlink slot is different from the physical length of the sidelink slot;

the time domain offset delta t is calculated by using the physical length of the sidelink slot, regardless of whether the physical length of the uplink slot and/or the downlink slot is the same as the physical length of the sidelink slot;

the time domain offset delta t is calculated by using the physical length of the uplink slot, regardless of whether the physical length of the uplink slot and/or the downlink slot is the same as the physical length of the sidelink slot;

the time domain offset delta t is calculated by using the physical length of the downlink slot, regardless of whether the physical length of the uplink slot and/or the downlink slot is the same as the physical length of the sidelink slot.

Further, the preconditions for using at least one of the above items further include that the unit of the time domain offset delta t is a specific type of slot.

For example, only when the unit of the time domain offset delta t is a sidelink slot, the time domain offset delta t is calculated by using the physical length of the sidelink slot, if the physical length of the uplink slot is different from the physical length of the sidelink slot. For example, only when the unit of the time domain offset delta t is an uplink slot, the time domain offset delta t is calculated by using the physical length of the uplink slot, regardless of whether the physical length of the uplink slot and/or the downlink slot is the same as the physical length of the sidelink slot.

Further, the determining of the resource of the HARQ-ACK-2 by the UE further includes: if the slot which the determined time domain resource starting position t0+delta t in is not the uplink slot, the time domain resource starting position of the HARQ-ACK-2 is the earliest uplink slot after t0+delta t.

In a specific example, the transmitter UE obtains, by calculating, the time domain resource starting position t0+delta t used by the HARQ-ACK-2, according to the time domain resource position (or starting/ending position) t0 of each or the last sidelink resource scheduled by the sidelink grant and according to the time domain offset delta t indicated in the sidelink grant by the base station or indicated in the higher layer signaling. Wherein, the unit of delta t is a physical slot or an uplink slot. Wherein, if the slot of the determined time domain resource starting position t0+delta t is not an uplink slot, the time domain resource starting position of the HARQ-ACK-2 is the earliest one uplink slot after slot t0+delta t. Wherein, the sidelink resource may specifically be a PSFCH resource, which is explicitly scheduled in the sidelink grant or determined by deriving according to the PSCCH/PSSCH resource scheduled in the sidelink grant.

Further, the manner of determining the time domain offset delta t above described may also be similarly used in the step of determining the sidelink transmission scheduled by the sidelink grant. Optionally, the transmitter UE determines the time domain position of the earliest sidelink resource scheduled by the sidelink grant as t0+delta t', according to the resource position of the sidelink grant and time domain offset delta t' between the sidelink grant and the earliest sidelink resource scheduled by the sidelink grant. The above description of delta t can also be similarly applied to delta t'.

Wherein, the sidelink grant includes at least one of a dynamic grant, a type-one configured grant, and a type-two configured grant. The sidelink resources include at least one of a PSCCH, a PSSCH, and a PSFCH.

In a specific example, the time domain offset delta t' between the sidelink grant and the earliest sidelink resource scheduled by the sidelink grant is a sidelink slot. Regardless of whether the physical length of the uplink slot and/or the downlink slot is the same as the physical length of the sidelink slot, the UE calculates the time domain offset delta t' using the physical length of the sidelink slot; or, if the physical length of the uplink slot and/or the downlink slot is different from the physical length of the sidelink slot, the UE calculates the time domain offset delta t' using the physical length of the sidelink slot.

In another specific example, the time domain offset delta t' between the sidelink grant and the earliest sidelink resource scheduled by the sidelink grant is a physical slot. If the physical length of the uplink slot and/or the downlink slot is different from the physical length of the sidelink slot, the UE determines, according to a predefined criterion, the time domain offset delta t' by using the physical length of the uplink or sidelink or downlink slot. In addition, if the slot in which the time domain position t0+delta t' of the calculated earliest sidelink resource is not a sidelink slot, the time domain position of the earliest sidelink resource is the earliest sidelink slot after t0+delta t'.

Optionally, the UE multiplexes the HARQ-ACK-2 with other uplink channels/signaling, or the transmitter UE transmits the HARQ-ACK-2 by piggybacking it on other uplink channels/signaling. This scenario is mainly applicable to the transmitter UE to determine the resources used by the HARQ-ACK-2 according to the resource position of the specific uplink signaling/channel.

Optionally, if there are multiple resource positions for a specific signaling/channel, the information is derived by the first one, or the last one, or at least one specific resource position of the multiple resource positions.

Optionally, the transmitter UE derives and determines the resources used by the feedback information according to the PSSCH scheduled by the SL grant, and/or the information indicated by the base station in the SL grant or predefined (for example, the time domain and/or the frequency domain offsets). Specifically, the SL grant schedules N>1 PSSCHs, and the transmitter UE derives and determines one resource for reporting HARQ-ACK-2 according to the latest one PSSCH in the time domain. In another exemplary embodiment, similarly, the SL grant schedules N>1 PSSCHs, but the transmitter UE derives and determines one resource for reporting HARQ-ACK-2 according to each PSSCH, that is, a total N resources for reporting HARQ-ACK-2 are derived and determined.

Optionally, signaling for directly indicating the resource position of the HARQ-ACK-2, and/or signaling for indicating the resource mapping relationship and/or other signaling for deriving the resource of feedback information, comprise at least one of the following:

downlink control information (DCI); wherein the DCI at least comprises a SL grant, specifically, a SL grant for scheduling resources for the initial transmission and/or retransmission of a given sidelink transmission; and may also comprise other specific downlink control information (DCI), for example, the DCI for scheduling the specific uplink signaling (e.g., PUSCH or UCI carrying HARQ-ACK feedback information of downlink transmission);

other downlink signaling, used as the SL grant or indicating the scheduling information of the sidelink transmission; and higher layer signaling, which including at least RRC configuration signaling.

According to the existing technique, the specific method for the UE to determine the time domain resources for reporting HARQ-ACK-2 according to the resource position directly indicated in the signaling includes: the UE determines the time domain position after the time length of gap after a time domain reference point is the time domain resources used for reporting the HARQ-ACK-2, according to the predefined time domain reference point (for example, the slot or symbol when the received indication signaling ends) and the time domain gap directly indicated in the signaling. According to the description in the above example, the method, in which the UE determines the resources used for the HARQ-ACK-2 according to the resource position of the specific signaling/channel and the resource mapping relationship between the specific signaling/channel and HARQ-ACK-2, further includes that the UE determines the time domain position after the time length of gap after passing through the time domain reference point is the time domain resources for reporting the HARQ-ACK-2 according to the predefined time domain reference point and the predefined or pre-configured or the base-station-configured time domain gap (such as the time domain offset delta t in the above example). With respect to how to define the time gap, if the time gap in the existing technique is simply reused, in particular the time gap in the method of the existing technique of indicating the PUCCH resource used for the HARQ-ACK feedback of the downlink data in the DCI as a downlink grant is simply reused, may have the following problems:

1. In the existing technique based on the communication between the UE and the base station, after receiving the downlink data, the UE may report the feedback information in the PUCCH according to the reception result itself; and in the Mode 1 of the sidelink system based on the communication between UEs, the UE needs to obtain the HARQ-ACK feedback (HARQ-ACK-1) provided by the receiver UE of the sidelink data after transmitting the sidelink data, and then report the HARQ-ACK-2 according to the obtained HARQ-ACK-1. Therefore, the time gap in the existing technique may be too short for the process of reporting HARQ-ACK-2 in Mode 1.

2. Compared with the definitions of downlink slot, uplink slot, and physical slot in the existing technique, the concept of sidelink slot is additionally introduced in the sidelink system. A sidelink slot is a slot that is configured to be included in a sidelink resource pool. Therefore, it is required to be further defined that the time gap in the above example is calculated based on which types of slots.

Therefore, the time gap between the time reference point and the HARQ-ACK-2 in the above example, includes the time domain gap directly indicated in the signaling and the predefined or pre-configured or the base-station-configured time domain gap. Preferably, the time gap should be greater than that in the existing technique. Specifically, the time gap is greater than the time gap indicated in the existing technique when the DCI used as the downlink grant indicates the PUSCH resources carrying the HARQ-ACK corresponding to the PDSCH; and/or the time gap is greater than that between PDSCH resource of a Semi-Persistent Scheduling (SPS) downlink transmission and a PUCCH resource carrying the corresponding HARQ-ACK in the existing technique.

Moreover, optionally, the time gap is calculated based on a specific type of slot, which comprises at least one of a physical slot, an uplink slot, and a sidelink slot. In a specific example, the time gap between the time reference point (e.g., the slot when the sidelink grant starts/ends, or the slot when the PSSCH starts/ends) and the HARQ-ACK-2 in the above example is N slots, which may be: N physical slots; N uplink slots; N sidelink slots; N physical slots and/or sidelink slots and/or uplink slots.

Optionally, when the specific type of slot includes more than one type of slot, N may be further refined into a sum of several time domain gaps, for example, N=N1+N2 or N=N1+N2+N3 (or a sum of more Nx), where N1/N2/N3 each correspond to one type of slot. Moreover, different types of slots may be calculated according to a predefined logical sequence, for example, calculating N1 physical slots first, then calculating N2 sidelink slots, and then calculating N3 uplink slots and/or physical slots.

In a specific example, the time domain resources for reporting HARQ-ACK-2 are the N3 uplink slots after N2 sidelink slots after N1 physical slots (or uplink slots) after a specific time domain reference point; or the N1 physical slots (or uplink slots) after N2 sidelink slots after a specific time domain reference point. The latter can be considered as a simplification of the former. For the former, the advantages of this design are as below:

The N1 physical slots (or uplink slots) correspond to a decoding delay required for the receiver UE that receives the sidelink data after the transmitter UE transmits the sidelink data, and a processing delay of generating HARQ-ACK corresponding to the sidelink data. The processing delay is usually determined based on the UE performance and is an absolute length.

The N2 sidelink slots correspond to a delay required for the receiver UE that receives the sidelink data to acquire PSFCH resources and transmit HARQ-ACK feedback (HARQ-ACK-1) in the sidelink system. The delay may be calculated based on physical slot or sidelink slot. If the delay is calculated based on the sidelink slot, N2 is also calculated based on the sidelink slot, which helps to reduce system complexity (because the system does not need to first convert N2 sidelink slots into M physical slots according to the configuration of the sidelink resource pool, and then schedule M physical slots) and ensure that the receiver UE can always transmit the PSFCH carrying the HARQ-ACK feedback in N2 sidelink slots; otherwise if the delay is calculated based on physical slots, then N2 can also be calculated based on physical slot to reduce system complexity.

The N3 uplink slots correspond to a PUCCH scheduling delay, and the PUCCH scheduling delay is also used to calculate the uplink slot in the existing technique, thereby facilitating maximum reuse of the existing technique.

Optionally, the value of N1 or N3 or N1+N3 is the same as the value of the time domain gap when the PUCCH resource is scheduled in the DCI in the existing technique.

Since the time domain resources of the sidelink transmission in the existing technique usually use the slot as the scheduling unit, the above method is specifically described by taking the slot as an example. The slot in the above method can also be similarly replaced with a symbol or replaced with other time domain units, considering that the time domain resource of the sidelink transmission can also use other time units as the scheduling unit. For example, in the above example of N=N1+N2+N3, N1 may be replaced with millisecond, so that the UE's processing delays corresponding to N1 are the same for different slot lengths caused by different numerologies; similarly, other Nx can also be replaced with millisecond, for example, the calculation of the time gap in millisecond in different systems helps to reduce system complexity, when different numerologies of uplink system and the sidelink system leads to different slot lengths.

Specific examples of the UE determining resource for transmitting the HARQ-ACK-2 are described below.

Optionally, the UE determines the time-frequency resource of the HARQ-ACK-2 according to the time-frequency resource used for feeding back the HARQ-ACK-2 directly indicated in the downlink DCI (for example, the SL grant).

Optionally, the UE determines the time-frequency resource of the HARQ-ACK-2 according to a part of the information (for example, the time-frequency resource position of the HARQ-ACK-2) about the time-frequency resource for feeding back the HARQ-ACK-2 directly indicated in the downlink DCI and another part of information (for example, the time-frequency resource size of the HARQ-ACK-2, the signaling format, the MCS/TBS and other parameters) indicated in the higher layer signaling.

Optionally, the UE determines the time-frequency resource of the HARQ-ACK-2 according to the information obtained by deriving the resource position of the specific signaling/channel; wherein the specific signaling/channel is a sidelink transmission scheduled by the SL grant, and some parameters used for the UE deriving the resource of the HARQ-ACK-2 are configured by higher layer signaling. For example, the UE uses the time domain gap and frequency domain offset between the HARQ-ACK-2 and the sidelink transmission configured by the RRC.

Optionally, the UE multiplexes the HARQ-ACK-2 with other PUCCH/PUSCH transmissions, or piggybacks the HARQ-ACK-2 on other PUCCH/PUSCH transmissions; correspondingly, the UE determines the resource positions of other PUCCH/PUSCHs according to the PUCCH resources of the HARQ-ACK feedback information of the downlink transmission indicated in the downlink DCI, or the PUSCH resources scheduled in the downlink DCI, thereby determining the resource position for multiplexing or piggybacking the HARQ-ACK-2. Optionally, after the UE generates the HARQ-ACK-2, it is multiplexed or piggybacked on the next PUCCH/PUSCH transmission with the earliest time domain resource.

Optionally, the UE determines the time-frequency resource of the HARQ-ACK-2 according to the information directly indicated in the downlink DCI, or determines resource used by HARQ-ACK-2 by deriving according to the resource position of the specific signaling/channel, and a resource mapping relationship between the specific signaling/channel, which is configured or indicated by the base station/predefined/pre-configured, with the HARQ-ACK-2, and other information used for deriving the resource of feedback information, which is configured or indicated by the base station or predefined/preconfigured. Subsequently, the UE determines whether there is transmission of specific uplink signaling (e.g., PUCCH/PUSCH) within a given range before and/or after the time domain and/or frequency domain of the resource used by the HARQ-ACK-2, or whether there is a specific uplink signaling transmission before the latest feedback of the HARQ-ACK-2. If there is, the UE determines to multiplex or piggyback the HARQ-ACK-2 on the specific uplink signaling, which is equivalent to determining that the time-frequency resource of the HARQ-ACK-2 is the resource of the specific uplink signaling; otherwise, the UE reports the HARQ-ACK-2 using the resource of the HARQ-ACK-2 determined by deriving.

Optionally, the transmitter UE determines the resource used for reporting the HARQ-ACK-3 in a similar manner. Optionally, the transmitter UE determines resource for reporting the HARQ-ACK-3 using the same or different configuration or parameter as the HARQ-ACK-2.

Optionally, the transmitter UE determines to independently report the HARQ-ACK-2 or piggybacks/multiplexes the HARQ-ACK-2 on other uplink signaling/channel, and/or determine to specifically use which method/combination in the above multiple methods or combinations to acquire resource of the HARQ-ACK-2, according to at least one of the following: the HARQ-ACK-2 being a physical layer signaling or a higher layer signaling, enabling/disabling at least one method configured by the base station, predetermined priority between different methods or combinations, the size of the information payload of the HARQ-ACK-2 and the service priority of the sidelink transmission corresponding to the HARQ-ACK-2.

Optionally, if the resource for reporting the HARQ-ACK-2 is directly indicated in the signaling, the directly indicated resource is preferentially used; otherwise, if the HARQ-ACK-2 can be multiplexed or piggybacked on the specific uplink signaling, it may be transmitted in a multiplexing or piggyback manner; otherwise, resource determined by deriving is used. Wherein, whether the HARQ-ACK-2 can be multiplexed or piggybacked on a specific uplink signaling is determined by the following methods: one method is that: determining whether there is transmission of the specific uplink signaling within a given range before and/or after time domain and/or frequency domain of the determined resource by deriving; and the other method is that: determining a time window or latest time available for reporting the HARQ-ACK-2 according to predetermined criteria and/or resource position of the SL grant and/or resource position of sidelink transmission/sidelink channel scheduled by the sidelink grant, and determining whether there is transmission of the specific uplink signaling within the time window or before the latest time. Optionally, a method for the UE obtaining a resource of the HARQ-ACK-2 is determined by a priority, and the priority may be as below: a direct indication of signaling>piggybacking/multiplexing on the uplink signaling>resource determined by deriving. The method has the advantages that the priority of direct indication of signaling may maximum the control capability and scheduling flexibility of the base station, the piggybacking/multiplexing can save the signaling overhead of reporting HARQ-ACK-2, and if neither the scheduling of base station nor piggybacking/multiplexing, the UE can always use the resource determined by deriving, either.

Optionally, when the size of the information payload of the HARQ-ACK-2 is greater than a specific threshold, the UE determines that the HARQ-ACK-2 is not transmitted by multiplexing and/or piggybacking it on a specific uplink signaling/channel. Optionally, the threshold is (pre)configured or determined by deriving according to transmission parameters; wherein the transmission parameters include a transmission parameter of a specific uplink signaling/channel for piggybacking/multiplexing the HARQ-ACK-2, such as, a TBS, an MCS, a frequency domain resource size, a time domain resource size; and also include a service priority of the sidelink transmission corresponding to the HARQ-ACK-2, such as, a QoS of the corresponding sidelink transmission. The main purpose of the method is to avoid the performance of other uplink signaling/channel being seriously affected when the size of the HARQ-ACK-2 information is large and the HARQ-ACK-2 information is multiplexed/piggybacked on other uplink signaling/channel.

Optionally, when the service priority of the sidelink transmission corresponding to the HARQ-ACK-2 is above or below a given threshold, the UE determines that the HARQ-ACK-2 may not be transmitted by multiplexing and/or piggybacking it on a specific uplink signaling/channel. Optionally, the threshold is (pre)configured or determined according to transmission parameters by deriving; wherein the transmission parameters include a transmission parameter of a specific uplink signaling/channel for piggybacking/multiplexing HARQ-ACK-2, such as, a TBS, an MCS, a frequency domain resource size, a time domain resource size; and also include a transmission parameter of HARQ-ACK-2, such as the size of the information payload of the HARQ-ACK-2. Similarly, the main purpose of the method is to avoid the reliability of HARQ-ACK-2, provided by multiplexing/piggybacking it on other uplink signaling/channel, not high enough when the service priority corresponding to the HARQ-ACK-2 is high.

Optionally, the UE preferentially multiplexes and/or piggybacks the HARQ-ACK-2 on other uplink signaling/channel, when the base station enables to multiplex and/or piggyback HARQ-ACK-2 on other uplink signaling/channel; otherwise, the UE transmits the HARQ-ACK-2 independently using the resource determined by deriving.

Optionally, the UE preferentially multiplexes and/or piggybacks the HARQ-ACK-2 on other uplink signaling/channel, and secondly uses the resource determined by deriving, when the HARQ-ACK-2 is the physical layer signaling; otherwise, the UE uses the resource position for reporting the HARQ-ACK-2 directly indicated in the signaling, when the HARQ-ACK-2 is the higher layer signaling, specifically, the UE uses the resource position, dedicated for reporting the information of HARQ-ACK-2 indicated by the higher layer signaling, directly indicated in SL grant or other DCIs.

If the transmitter UE still reports to the base station the HARQ-ACK information indicating whether the sidelink transmission succeeds (HARQ-ACK-2) after the transmitter UE receives the HARQ-ACK feedback information (HARQ-ACK-1) of the receiver UE from the sidelink, the system also needs to handle the potential collision of the transmission of the HARQ-ACK-2 with other uplink transmissions and/or sidelink transmission.

Due to the limitation of UE's capability, it is a typical collision scenario that more than one signals/channels need to be transmitted at the same time. For example, the time domain resource used for the transmission of the HARQ-ACK-2 completely or partially overlaps with the time domain resource used for the other uplink transmission or sidelink transmission. At this time, the UE needs to handle how to transmit the HARQ-ACK-2 and other uplink transmission and/or sidelink transmission simultaneously. Similarly, due to the limitation of UE's half-duplex capability, transmission and reception of different signals/channels simultaneously is considered to be difficult to implement in the sidelink system at present. Therefore, when the time domain resource used for the transmission of the HARQ-ACK-2 completely or partially overlaps with all the time domain resource used for the other downlink reception or sidelink reception, the UE needs to deal with the problem that only one of transmission and reception can be performed due to the half-duplex limitation.

If the time domain resources and/or the frequency domain resources used by the transmission of the HARQ-ACK-2 overlaps with all or part of the time domain resources and/or the frequency domain resources used by other uplink/sidelink transmissions, the transmitter UE determines whether it is capable of simultaneously transmitting the HARQ-ACK-2 and other uplink/sidelink transmissions according to specific scheduling information of the transmission of HARQ-ACK-2 and the other uplink/sidelink transmissions, and further determines to transmit the HARQ-ACK-2 and/or other uplink/sidelink transmissions by using at least one of the following manners:

a) the UE respectively transmits the HARQ-ACK-2 and/or other uplink/sidelink transmission. The HARQ-ACK-2 and/or other uplink/sidelink transmission use independent transmission resource and share transmission power, and the UE determines the transmission power of the HARQ-ACK-2 and/or other uplink/sidelink transmission respectively according to the predetermined criteria and the configured and/or scheduled power control parameter.

b) the UE transmits other uplink transmission and piggybacks the HARQ-ACK-2 on the other uplink transmission. Specifically, the UE maps the HARQ-ACK-2 on the specific resource element (RE) in the other uplink transmission according to a predefined criterion, and determines the transmission power of HARQ-ACK-2 and/or other uplink transmission respectively or together according to predetermined criteria and configured and/or scheduled power control parameter. Optionally, the UE explicitly or implicitly indicates whether the HARQ-ACK-2 is piggybacked on the other uplink transmission, in the other uplink transmission.

c) The UE transmits the HARQ-ACK-2 and piggybacks other uplink transmission in the HARQ-ACK-2. The specific method is similar to that in b).

d) The UE multiplexes the HARQ-ACK-2 with other uplink transmission. Optionally, when other uplink transmission and HARQ-ACK-2 are transmitted in the same uplink channel, the UE transmits the HARQ-ACK-2 and other uplink transmission in a multiplexing manner.

e) The UE transmits one of the HARQ-ACK-2 and other uplink/sidelink transmission, and postpones the remaining transmission until the above one transmission is completed.

f) The UE transmits one of ARQ-ACK-2 and other uplink/sidelink transmission and drops the remaining transmission.

For e) and f), optionally, the UE determines which transmission of the HARQ-ACK-2 and other uplink transmission may be delayed or dropped, or which transmission should be normally transmitted according to the priority. The priority may be determined based on at least one of: a priority between an uplink transmission/sidelink transmission with HARQ-ACK-2, a priority of the channel used for transmission, a priority of signaling type (e.g., PUCCH signaling, data signaling), and a priority parameter (for example, a LCD, a QoS) of service corresponding to the transmission.

Similarly, if the time domain resource and/or frequency domain resource used by the transmission of the HARQ-ACK-2 completely or partially overlaps the time domain resource and/or frequency domain resource used by other downlink/sidelink reception, the transmitter UE determines to use at least one of the following methods according to the specific scheduling information of the transmission of HARQ-ACK-2 and other downlink/sidelink reception:

g) The UE transmits the HARQ-ACK-2 and postpones the reception of downlink/sidelink reception until the completion of the HARQ-ACK-2 transmission; or the UE receives the downlink/sidelink transmission and postpones the transmission of HARQ-ACK-2 until the completion of the downlink/sidelink reception.

h) The UE transmits the HARQ-ACK-2 and drops downlink/sidelink reception; or the UE receives downlink/sidelink transmission and drops the transmission of HARQ-ACK-2.

For g) and h), optionally, the UE determines which of the transmission of HARQ-ACK-2 and the reception of other downlink/sidelink transmission may be postponed or dropped, and which should be normally transmitted/received, according to the priority. The priority may be determined based on at least one of: a priority between an downlink transmission/a sidelink transmission with HARQ-ACK-2, a priority of the channel used for transmission, a priority of signaling type (e.g., PDCCH signaling, data signaling), and a priority parameter (for example, a LCID, a QoS) of service corresponding to the transmission.

The above a)~h) are only the identifiers of different schemes, and do not imply any priority or any time order between the different schemes.

Considering the potential collision between the transmission of the HARQ-ACK-2 and other sidelink transmission, the UE can also regard the transmission of HARQ-ACK-2 as a factor influencing the selection of sidelink transmission resource when selecting the sidelink transmission resource (Mode 2 sidelink transmission) by itself, thereby avoiding the collision between the transmission of the HARQ-ACK-2 and other sidelink transmission in the process of selecting the sidelink transmission resource. Optionally, in the resource selection process of the Mode 2, the UE excludes the sidelink resource that is completely or partially overlapped with the already scheduled uplink transmission in the time domain from the candidate resources. Wherein, the scheduled uplink transmission includes an uplink transmission scheduled in an existing mechanism, and further includes transmission of the HARQ-ACK-2.

Optionally, the UE handles the potential collision of the HARQ-ACK-3 with other uplink transmission, downlink reception, sidelink transmission, and sidelink reception in a similar manner.

The following describes how to perform HARQ-ACK-feedback-based sidelink transmission in a system in which a base station schedules sidelink communication (Mode 1) in conjunction with an embodiment.

Optionally, the transmitter UE of the sidelink transmission (referred to as a UE1 for convenience of description) transmits a sidelink signaling to the receiver UE (referred to as a UE2 for convenience of description), and transmits a sidelink transmission request to the base station. The sidelink transmission request may be a Scheduling Request (SR) or a Buffer Status Report (BSR), or other dedicated sidelink transmission request signaling. The sidelink request carries related information of the sidelink transmission, such as a priority of sidelink data, an MCS, a TB S, a size of required sidelink resource, a buffer status.

The base station schedules a sidelink resource for the UE1 based on the information in the sidelink request, and the scheduling information is indicated by an SL grant (referred to as SLG1 for convenience of description). The sidelink grant SLG1 can multiplex the grant signaling in the existing technique, including a dynamic grant and/or a configured grant, and the configured grant further includes a configured grant of Type-1 and/or a configured grant of Type-2.

The UE1 receives the sidelink grant SLG1 and acquires scheduling information carried in the SLG1. Specifically, the scheduling information indicated by the SLG1 includes a Physical Sidelink Shared Channel (PSSCH) resource. This PSSCH resource is used for one transmission of one sidelink TB of UE1 (referred to as SLTB1 for convenience of description). The scheduling information indicated by the SLG1 may also include a Physical Sidelink Control Channel (PSCCH) resource for the transmission of the SCI of the SLTB1, and/or a Physical Sidelink Feedback Channel (PSFCH) resource for transmission of feedback information of the SLTB1.

As a specific embodiment of the scheduling information carried in the SLG1, the SLG1 indicates scheduling information of one PSSCH resource, and scheduling information of PSCCH resource and/or PSFCH resource corresponding to the PSSCH resource. Optionally, the correspondence between the PSSCH, the PSCCH, the PSFCH resources and the SLTB1 (the correspondence refers to that which sidelink TB is transmitted on which PSSCH resource, and correspondingly, the SCI/feedback information of which sidelink TB is transmitted on which PSCCH/PSFCH resource) is known by the base station; or, the correspondence between the PSSCH, PSCCH, PSFCH resources and the sidelink TB is determined by the UE itself, and the base station does not need to know related information.

The scheduling information indicated in the SLG1 may also include whether the transmission of SLTB1 enables the HARQ-ACK feedback. If the information enabling/disabling the HARQ-ACK feedback is indicated in the SLG1, the UE1 determines whether the transmission of SLTB1 enables the HARQ-ACK feedback according to the information indicated by the SLG1. Otherwise, if there is no information enabling/disabling the HARQ-ACK feedback indicated in the SLG1, or if the system does not support dynamically enabling/disabling the HARQ-ACK feedback in the SL grant, the UE1 determines whether the transmission of SLTB1 enables the HARQ-ACK feedback according to higher layer configuration (e.g., according to the RRC configuration of the sidelink resource pool in which the sidelink TB is transmitted).

Optionally, if information enabling/disabling the HARQ-ACK feedback is indicated in SLG1, the UE1 needs to determine that the UE2 also acquires the same information, since for any specific sidelink transmission, the transmitter UE and the receiver UE are aligned for the information indicating whether to enable the HARQ-ACK feedback. Therefore, when the information enabling/disabling the HARQ-ACK feedback is indicated in SLG1, the UE1 indicates the information enabling/disabling the HARQ-ACK feedback to the UE2; or, when the information enabling/disabling the HARQ-ACK feedback is indicated in the SLG1 and the indication is different from the higher layer configuration (for example, when the RRC configuration of the sidelink resource pool in which the PSSCH scheduled by SLG1 is transmitted indicates to disable the HARQ-ACK feedback, but the HARQ-ACK feedback is indicated to be enabled in the SLG1), the UE1 indicates the information enabling/disabling HARQ-ACK feedback to the UE2; or, the UE1 assumes that the base station will indicate that the HARQ-ACK feedback is enabled/disabled to UE2, for example, indicating in another SL grant signaling transmitted by the base station to UE2, so UE1 does not need to indicate that HARQ-ACK feedback is enabled/disabled to UE2.

If the UE1 indicates the information of enabling/disabling HARQ-ACK feedback to the UE2, a feasible method is that the UE1 indicates the information enabling/disabling HARQ-ACK feedback in the SCI associated with the PSSCH scheduled by the SLG1 (or the SLTB1 carried by the PSSCH). Specifically, it may be explicitly indicated by a 1-bit field; or explicitly indicated by means of indicating a feedback resource. For example, a time gap between the PSSCH and the associated PSFCH is indicated in the SCI, the value of the time gap being a specific value (for example, 0) indicates that the HARQ-ACK feedback is disabled, and the value of the time gap being other value indicates that the HARQ-ACK feedback is enabled; or, implicitly indicated by at least one of the following manners: selecting a resource position related to enabling/disabling of the HARQ-ACK feedback, for example, when a part of the PSSCH resources has an associated PSFCH resource and a part of the PSSCH resources has no associated PSFCH resource, the PSSCH resource with/without associated PSFCH resource is respectively selected to enable/disable the HARQ-ACK feedback; different reference signals including a reference signal sequence and/or resource position of the reference signal map; different scrambling sequences; different RNTIs.

The UE1 determines scheduling information of the SCI and/or HARQ-ACK feedback information associated with (or corresponding to) the PSSCH carrying the SLTB1 and the resource of PSCCH carrying the SCI and/or the resource of PSFCH carrying the HARQ-ACK feedback message according to the scheduling information indicated by the SLG1 and predetermined criteria. Specifically, if the scheduling information of the above SCI and/or HARQ-ACK feedback information, and/or the scheduling information indicating the above PSCCH and PSFCH is indicated in the SLG1, the UE1 uses the scheduling information indicated in the SLG1; otherwise, the UE1 obtains the above information by deriving according to the scheduling information of PSSCH or the scheduling information of the SLTB1 indicated in the SLG1.

Optionally, the UE1 obtains the above information by deriving according to the scheduling information of PSSCH or the scheduling information of the SLTB1 indicated in the SLG1, wherein the time gap1 between the PSSCH and the associated PSCCH, and the time gap2 between the PSSCH and the associated PSFCH are configured by the RRC and/or predefined, the frequency domain resource of the PSCCH and/or PSFCH associated with the PSSCH is calculated according to the frequency domain resource of the PSSCH and predefined criteria.

The UE1 transmits the above PSSCH and/or PSCCH according to the scheduling information indicated by the SLG1. If the HARQ-ACK feedback is enabled, the HARQ-ACK feedback transmitted by the UE2 is also monitored at the PSFCH resource position. Furthermore, based on the result of monitoring of the HARQ-ACK feedback transmitted by the UE2, the UE1 determines whether to report the HARQ-ACK feedback from the UE2 to the base station, and whether it is necessary to request for the sidelink resource for the retransmission of the SLTB1 to the base station. Specifically, there are several typical embodiments:

1-1. The UE1 receives the ACK feedback from the UE2, the UE1 transmits the ACK feedback of the sidelink transmission corresponding to the SLG1 to the base station, and the transmission process of LTB1 ends successfully.

1-2. The UE1 receives the ACK feedback from the UE2, the UE1 does not transmit any feedback information of the sidelink transmission corresponding to the SLG1 to the base station, and the transmission process of SLTB1 ends successfully. In this embodiment, the UE1 assumes that the base station will interpret no feedback information of the sidelink transmission corresponding to SLG1 being received as an ACK, that is, the base station will consider the transmission of SLTB1 to be successful.

The difference between the embodiments 1-1 and the 1-2 is that the ACK signaling is explicitly reported in the embodiment 1-1, and the ACK is implicitly reported in the embodiment 2-2 by not transmitting the feedback signaling.

2-1. The UE1 receives the NACK feedback from the UE2, and the UE1 transmits the NACK feedback of the sidelink transmission corresponding to the SLG1 to the base station.

Optionally, the NACK feedback is used for at least one of: a) reporting the HARQ-ACK feedback information of SLTB1; b) requesting the base station to schedule a sidelink resource for SLTB1 retransmission.

If the NACK feedback is not used to request the base station to schedule a sidelink resource for SLTB1 retransmission, the UE1 needs to request the base station to schedule a sidelink resource for SLTB3 retransmission, and then transmits an independent sidelink retransmission request signaling.

If the NACK feedback is used to request the base station to schedule a sidelink resource for SLTB1 retransmission, or the UE1 transmits an independent sidelink retransmission request signaling, the UE1 monitors a possible new SL grant signaling in the downlink control channel. The base station receives the NACK feedback corresponding to the SLG1, and transmits a new SL grant SLG2 to the UE1, and the scheduling information indicated by the SLG2 includes at least a sidelink resource for SLTB1 retransmission.

In the above processes, optionally, a process of determining whether the maximum number of retransmissions has been reached is added. Specifically, in the above process, if the UE1 receives the NACK feedback, the NACK feedback of the sidelink transmission corresponding to the SLG1 is transmitted to the base station only when the SLTB1 does not reach the maximum number of retransmissions; or the UE1 transmits the NACK feedback of the sidelink transmission corresponding to the SLG1 to the base station, and the base station transmits the SLTB1 retransmission scheduled by the SLG2 to the UE1 only when the SLTB1 does not reach the maximum number of retransmissions.

The UE1 acquires the SLG2, determines scheduling information of PSSCH and/or PSCCH and/or PSFCH corresponding to SLTB1 retransmission according to a method similar to the initial transmission of SLTB1, retransmits the SLTB1 according to scheduling information indicated by the SLG2, and monitors the HARQ-ACK feedback transmitted by the UE2 at the corresponding PSFCH resource position.

Similarly, the UE1 determines whether to report the HARQ-ACK feedback from the UE2 to the base station according to the result of monitoring the HARQ-ACK feedback transmitted by the UE2, and whether it is necessary to request the sidelink resource for retransmitting the SLTB1 from the base station; this process is repeated, until the transmission process of SLTB1 ends successfully or the SLTB1 reaches the maximum number of retransmissions.

2-2. The UE1 receives the NACK feedback from the UE2, and the UE1 does not transmit any feedback information of the sidelink transmission corresponding to the SLG1 to the base station. In this embodiment, the UE1 assumes that the base station will interpret no feedback information of the sidelink transmission corresponding to the SLG1 being received as a NACK, that is, the base station will consider that the transmission of SLTB1 has failed.

The subsequent processes are similar to those in embodiment 2-1. The difference between the embodiments 2-1 and 2-2 is that the NACK signaling is explicitly reported in the embodiment 2-1, and the NACK is implicitly reported in the embodiment 2-2 by not transmitting the feedback signaling.

2-3. The UE1 fails to receive any ACK/NACK feedback from the UE2, and the UE1 considers that the transmission of SLTB1 fails, that is, the UE1 interprets no ACK/NACK feedback being received as implicitly indicating a NACK. The UE1 has two possible methods for reporting the NACK to a base station: explicitly transmitting a NACK signaling to the base station, which is similar to embodiment 2-1; implicitly reporting a NACK by not transmitting the feedback signaling to the base station, which is similar to embodiment 2-2.

3-1. The UE1 fails to receive any ACK/NACK feedback from the UE2, and the UE1 considers that the feedback information corresponding to the transmission of SLTB1 is a DTX. Specifically, the DTX indicates that the UE2 fails to receive the PSSCH and/or PSCCH corresponding to SLTB1 because the UE2 is in a sleep state or for other reason. The UE1 transmits the DTX feedback of the sidelink transmission corresponding to the SLG1 to the base station.

Optionally, the DTX feedback is used for at least one of: a) reporting the HARQ-ACK feedback information of SLTB1; b) requesting the base station to schedule a sidelink resource for SLTB1 retransmission.

The subsequent processes are similar to those in embodiment 2-1. The difference between Embodiments 2-1 and 3-1 is that the DTX and NACK respectively indicate two different reasons of transmission failure, which helps to select the specific scheduling parameter according to the reason of transmission failure when the base station schedules the SLTB1 retransmission. For example, when the SLTB1 retransmission is scheduled in a period in which UE2 wakes up from the sleep state, or it is considered that the reason of DTX may be that the PSCCH energy of SLTB1 is insufficient to cover the UE2, thus the power of the PSCCH and/or PSSCH is improved in the retransmission scheduling information of SLTB1.

3-2. The UE1 fails to receive any ACK/NACK feedback from the UE2, and the UE1 considers that the feedback information corresponding to the transmission of SLTB1 is a DTX. The UE1 does not transmit any feedback information of the sidelink transmission corresponding to the SLG1 to the base station. In this embodiment, the UE1 assumes that the base station will interpret no feedback information of the sidelink transmission corresponding to the SLG1 being received as the DTX.

The subsequent processes are similar to those in embodiment 3-1. The difference between the embodiments 3-1 and 3-2 is that the DTX signaling is explicitly reported in the embodiment 3-1, and the DTX is implicitly reported in the embodiment 3-2 by not transmitting the feedback signaling.

If the UE1 determines to report, to the base station, the HARQ-ACK feedback from the UE2, or determines that a sidelink retransmission request needs to be transmitted to the base station (specifically, to request a sidelink resource for retransmitting the SLTB1), the time domain and/or frequency domain resources for transmitting the HARQ-ACK feedback report or the sidelink retransmission request is determined according to at least one of the following:

information indicated in the SLG1; specifically, time domain and/or frequency domain resources used for transmission of feedback information of sidelink transmission corresponding to the SLG1 is indicated in the SLG1, and the indication may be explicit or implicit;

information indicated by the higher layer signaling; specifically, the parameter used for determining the time-frequency resource for transmitting the HARQ-ACK feedback report or the sidelink retransmission request is configured in the RRC signaling; and information obtained by deriving according to the resource position of specific signaling/channel and/or other scheduling information; specifically, the specific channel comprises at least one of: a SLG1, a PSCCH scheduled by the SLG1, a PSSCH scheduled by the SLG1, a PSFCH scheduled by the SLG1, a PUCCH carrying the HARQ-ACK feedback information of downlink transmission; the specific signaling comprises at least one of signaling transmitted on the above channels.

Wherein, for the information explicitly indicated in the SLG1, a specific embodiment is that the SLG1 explicitly indicates the time domain and/or the frequency domain resources for transmitting the HARQ-ACK feedback report or the sidelink retransmission request. Another specific embodiment is that the SLG1 explicitly indicates the downlink allocation index (DAI) information, and the UE1 determines a time domain and/or frequency domain resources for transmitting the HARQ-ACK feedback report or the sidelink retransmission request according to the DAI information.

Wherein, for the information implicitly indicated in the SLG1, a specific method is that the UE1 determines the time domain and/or frequency domain resources used for transmitting the feedback information of the sidelink transmission corresponding to the SLG1, by deriving according to the time domain and/or the frequency domain resources of the SLG1. Another specific method is that the UE1 determines the time domain and/or frequency domain resources used for transmitting the feedback information of the sidelink transmission corresponding to the SLG1, according to the PSFCH scheduling information explicitly or implicitly indicated in the SLG1.

Wherein, for the information indicated in the higher layer signaling, a specific embodiment is that the RRC configuration of the UE1 includes a time domain gap between a time domain resource for transmitting the HARQ-ACK feedback report or the sidelink retransmission request and a PSSCH/PSCCH/PSFCH of the SLG1 or the SLTB1 (for example, may be K0 in the following specific embodiment), and/or includes a frequency offset between a frequency domain resource for transmitting the HARQ-ACK feedback report or the sidelink retransmission request and a PSSCH/PSCCH/PSFCH of the SLG1 or the SLTB1.

Wherein, for the information obtained by deriving according to the resource position of the specific signaling and/or other scheduling information, a specific embodiment is that the UE1 acquires information by deriving according to the information indicated by the HARQ-ACK feedback transmitted by the UE2, and/or the PSFCH resource position used by the feedback.

For a combination of several pieces of information described-above, a typical example is that the UE1 calculates and obtains that the UE1 should report the feedback information of the sidelink transmission in slot K1+K0, according to that the time domain resource position of the SLG1 or the PSFCH is the slot K1, and according to that the gap between the SL grant/PSFCH and the resource position where the UE reports the feedback information of sidelink transmission is K0 slots, wherein K0 is a predefined or RRC-configured positive integer. Similarly, the UE1 may also calculate and obtain the frequency domain resource used for reporting the feedback information of the sidelink transmission by the UE1 according to the frequency domain resource position of the SLG1 or the PSFCH, and the predefined or RRC-configured frequency offset.

Figure 2:
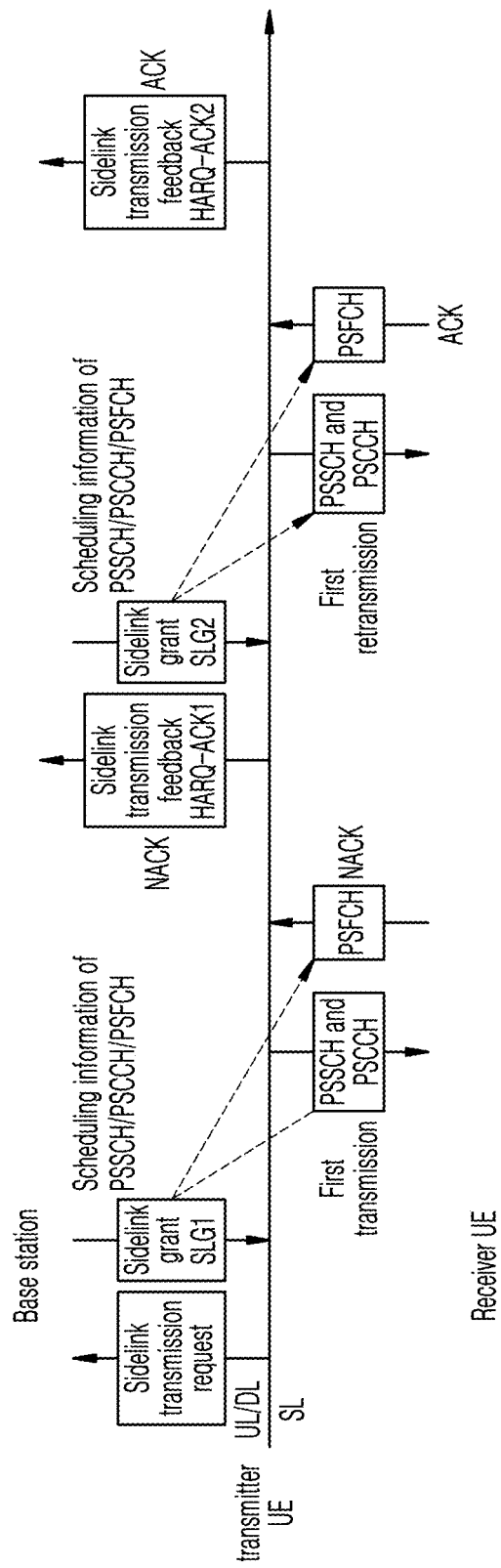
FIG. 2 illustrates a schematic diagram of a sidelink transmission according to an embodiment of the present application.

FIG. 2 shows a specific embodiment of the above exemplary embodiment. As shown in FIG. 2, the transmitter UE (UE1) transmits a sidelink transmission request to the base station, and the sidelink transmission request may be a BSR or an SR. The base station schedules the PSSCH resource and the PSCCH resource for the initial transmission of the sidelink transport block and the PSFCH resource of the corresponding feedback information for the UE1 in the SL grant SLG1. The UE1 transmits the PSCCH and the PSSCH according to the scheduling information indicated by the SLG1, and receives the NACK information of the receiver UE (UE2). The UE1 reports the feedback information HARQ-ACK1 of the sidelink transmission corresponding to the SLG1 to the base station, and the content of the HARQ-ACK1 is a NACK. The NACK information triggers the base station to schedule the sidelink retransmission, and the base station schedules the PSSCH resource and the PSCCH resource for the retransmission of the sidelink TB and the PSFCH resource of the corresponding feedback information for the UE1 in the SL grant SLG2. The UE1 transmits the PSCCH and the PSSCH according to the scheduling information indicated by the SLG2, and receives the ACK information transmitted by the UE2. The UE1 reports the feedback information HARQ-ACK2 of the sidelink transmission corresponding to the SLG2 to the base station, and the content of the HARQ-ACK2 is an ACK. The ACK information indicates that the sidelink transmission succeeds and the sidelink transmission process ends.

Optionally, the transmitter UE of the sidelink transmission (referred to as a UE3 for convenience of description) transmits a sidelink transmission request to the base station in order to transmit a sidelink signaling to the receiver UE (referred to as a UE4 for convenience of description). The sidelink transmission request may be a Scheduling Request (SR) or a Buffer Status Report (BSR), or other dedicated sidelink transmission request signaling. The sidelink request carries related information of the sidelink transmission, such as a priority of sidelink data, an MCS, a TBS, a size of required sidelink resource and a buffer status.

The base station schedules a sidelink resource for the UE3 based on the information in the sidelink request, and the scheduling information is indicated by an SL grant (referred to as an SLG3 for convenience of description). The SL grant SLG3 can multiplex the grant signaling in the existing technique, including a dynamic grant and/or a configured grant, wherein the configured grant further includes a configured grant of Type-1 and/or a configured grant of Type-2.

The UE3 receives the SL grant SLG3 and acquires scheduling information carried in the SLG3. Specifically, the scheduling information indicated by the SLG3 includes N Physical Sidelink Shared Channel (PSSCH) resources, and N is a positive integer greater than 1. The N PSSCH resources are at least used for less than N transmissions of one sidelink TB of UE3 (referred to as an SLTB3 for convenience of description), and may also be used for transmission of other TB of UE3. The scheduling information indicated by the SLG3 may also include a Physical Sidelink Control Channel (PSCCH) resource for transmission of the sidelink control information (SCI) of the sidelink SLTB3 and/or other TB of the UE3, and/or a Physical Sidelink Feedback Channel (PSFCH) resource for transmission of feedback information of the SLTB3 and/or other TB of the UE3.

As a specific embodiment of the scheduling information carried in the SLG3, the SLG3 indicates scheduling information of the N PSSCH resources, and scheduling information of the N1 PSCCH resources and/or the N2 PSFCH resources corresponding to the N PSSCH resources. Wherein, the values of N1 and N2 are determined according to predetermined criteria, and may be equal to or different from N. Optionally, the correspondence between the PSSCH/PSCCH/PSFCH resources and other TB of the SLTB3 and/or the UE3 (the correspondence refers to which the sidelink TB is transmitted on which PSSCH resource, and correspondingly, the SCI/feedback information of which sidelink TB is transmitted on which PSCCH/PSFCH resources) is known by the base station; or, the correspondence between the PSSCH/PSCCH/PSFCH resources and the sidelink TB is determined by the UE3 itself, and the base station does not need to know related information.

Optionally, the scheduling information indicated in the SLG3 may also include whether the transmission of SLTB3 and/or other sidelink TB of UE3 enables HARQ-ACK feedback. Furthermore, if information enabling/disabling HARQ-ACK feedback is indicated in the SLG1, the UE3 needs to determine that the UE4 also acquires the same information. Since the specific method is similar to the previous exemplary embodiment, it will not be described in detail herein.

The UE3 determines scheduling information of SCI and/or HARQ-ACK feedback information associated with (or corresponding to) the PSSCH carrying the SLTB3 according to the scheduling information indicated by the SLG3 and predetermined criteria, and the resource of PSCCH carrying the SCI and/or the resource of PSFCH carrying the HARQ-ACK feedback message. Specifically, if scheduling information of the above SCI and/or HARQ-ACK feedback information, and/or scheduling information of above PSCCH and PSFCH is indicated in SLG3, the UE3 uses the scheduling information indicated in the SLG1; otherwise, the UE3 obtains the above information by deriving based on the scheduling information of the PSSCH or the scheduling information of the SLTB1 indicated in the SLG3.

Optionally, the UE3 determines, according to the predefined criteria and the scheduling information indicated by the SLG3, at least one of the N PSSCH resources for the specific transmission of the SLTB3. Wherein, the specific transmission includes the initial transmission of SLTB3 and a given number of retransmissions of SLTB3 (e.g., a first retransmission, a second retransmission, etc.). Similarly, it is determined that one PSCCH resource and/or one PSFCH resource of the N1 PSCCH resources and/or the N2 PSFCH resources is used for the transmission of the SCI and/or feedback information corresponding to the specific transmission of SLTB3.

The UE3 transmits the above PSSCH and/or PSCCH according to the scheduling information indicated by the SLG3. If the HARQ-ACK feedback is enabled, the HARQ-ACK feedback transmitted by the UE4 is also monitored at the PSFCH resource position. In addition, according to the result of monitoring the HARQ-ACK feedback transmitted by the UE4 and/or the scheduling information indicated by the SLG3, the UE3 determines whether to report the HARQ-ACK feedback transmitted by the UE4 to the base station, and whether it is necessary to request the sidelink resource for retransmitting the SLTB3 from the base station. Specifically, there are several typical embodiments:

4. The UE3 receives the ACK feedback or the NACK feedback from the UE4, or does not receive any feedback information from the UE4; then the UE3 transmits the feedback information of the sidelink transmission corresponding to the SLG3 to the base station. In the above case, the contents of feedback information correspond to the ACK/NACK/DTX successively. Optionally, according to the received states of the HARQ-ACK feedback of the UE4 (the ACK/NACK being not received), there are several possibilities:

4-1. The UE3 receives the ACK feedback from the UE4, the UE3 transmits the ACK feedback of the sidelink transmission corresponding to the SLG3 to the base station, and the transmission process of SLTB3 ends successfully.

4-2. The UE3 receives the ACK feedback from the UE4, the UE3 does not transmit any feedback information of the sidelink transmission corresponding to the SLG3 to the base station, and the transmission process of SLTB3 ends successfully. In this embodiment, the UE3 assumes that the base station will interpret no feedback information of the sidelink transmission corresponding to the SLG3 being received as an ACK, that is, the base station will consider the transmission of SLTB3 to be successful.

For the 4-1 and 4-2, after the transmission of SLTB3 ends, if there are still remaining sidelink resource scheduled in the SLG3 that is not used for transmission of SLTB3, the UE3 may release the remaining resource, and/or the UE determines the use of remaining resource by itself, for example, the remaining resource is used for the transmission of other sidelink TB.

Optionally, the ACK feedback of the sidelink transmission explicitly or implicitly reported in the 4-1 and 4-2 may be used to request the release of subsequent sidelink resource. In a specific embodiment, the UE3 reports the ACK feedback in slot M0, and the ACK feedback is used to request to release all sidelink resources scheduled to UE3 in SLG3 after slot M0+M1; wherein M1 is predefined, or a non-negative integer configured by a higher layer.

Or, the UE3 requests the base station to release the subsequent sidelink resource by reporting one independent sidelink resource release signaling.

The difference between the embodiments 4-1 and 4-2 is that the ACK signaling is explicitly reported in the embodiment 4-1, and the ACK is implicitly reported in the embodiment 4-2 by not transmitting the feedback signaling.

4-3. The UE3 receives the NACK feedback from the UE4, and the UE3 transmits the NACK feedback of the sidelink transmission corresponding to the SLG3 to the base station.

Optionally, the NACK feedback is used for at least one of: a) reporting the HARQ-ACK feedback information of SLTB3; b) requesting the base station to schedule sidelink resources for the retransmission of SLTB3.

Optionally, if there are still remaining sidelink resources scheduled in the SLG3 that is not used for the sidelink transmission of the UE3, the NACK feedback is used to report the HARQ-ACK feedback information of the SLTB3; otherwise, if all the sidelink resources scheduled in the SLG3 have been used for the sidelink transmission of UE3, the NACK feedback is used to report at least the HARQ-ACK feedback information of SLTB3, and may also be used to request the base station to schedule the sidelink resource for the retransmission of SLTB3.

Or, optionally, the NACK feedback is always used to report the HARQ-ACK feedback information of the SLTB3, and the UE3 transmits an independent sidelink retransmission request signaling when the UE3 needs to request the base station to schedule a sidelink resource for the retransmission of SLTB3.

If the NACK feedback is used to request the base station to schedule a sidelink resource for the retransmission of SLTB3, or the UE3 transmits an independent sidelink retransmission request signaling, the UE3 monitors possible new SL grant signaling in the downlink control channel. The base station receives the NACK feedback corresponding to the SLG3, and transmits a new SL grant SLG4 to the UE3. The scheduling information indicated by the SLG4 includes at least the sidelink resource for the retransmission of SLTB3.

Optionally, the scheduling information indicated by the SLG4 includes N' PSSCH resources, and N' is a positive integer greater than or equal to 1. The N' PSSCH resources are at least used for less than N transmissions of SLTB3, and may also be used for transmission of other TB of UE3. The scheduling information indicated by the SLG4 may also include PSCCH resource for transmission the SCI of STB3 and/or of other TB of UE3, and/or PSFCH resource for transmission of feedback information of SLTB3 and/or other TB of UE3.

As a specific embodiment of the scheduling information carried by the SLG4, the SLG4 indicates scheduling information of the N' PSSCH resources, and scheduling information of the N3 PSCCH resources and/or the N4 PSFCH resources corresponding to the N' PSSCH resources. Wherein, the values of N3 and N4 are determined according to predetermined criteria and may be equal to or different from N'. Optionally, the correspondence between the PSSCH/PSCCH/PSFCH resources and the SLTB3 and/or other TB of the UE3 is known by the base station; or, the correspondence between the PSSCH/PSCCH/PSFCH resources and the sidelink TB is determined by the UE3 itself and the base station does not need to know the related information.

In the above processes, a process of determining whether the maximum number of retransmissions has been reached is added. Specifically, in the above process, if receiving the NACK feedback, the UE3 transmits the NACK feedback of the sidelink transmission corresponding to the SLG3 to the base station only when the SLTB3 does not reach the maximum number of retransmissions; or the UE3 always reports after receiving the NACK feedback, that is, the UE3 always transmits the NACK feedback of the sidelink transmission corresponding to the SLG3 to the base station, but the base station transmits the retransmission of SLTB3 scheduled by the SLG4 to the UE3 only when the SLTB3 does not reach the maximum number of retransmissions.

Optionally, when determining whether the number of retransmissions of a given TB (i.e., the SLTB3 in the above process) reaches a maximum value, the number of retransmissions of a given TB further includes at least one of the following: the number of actual retransmissions or transmissions of a given TB, the number of scheduling signaling acquired by the UE3 corresponding to transmission or retransmission of a given TB; and the number of retransmissions of a given TB requested by the UE3. The differences between the above items are explained below by a specific embodiment: it is assumed that the UE3 acquires two sidelink resources scheduled by the base station in the SLG3, which are used for the initial transmission and the first retransmission of SLTB3, respectively, and then requests retransmission resource of SLTB3, and acquires two sidelink resources scheduled by the base station in the SLG4, which are used for the second retransmission and the third retransmission of SLTB3, respectively. In this embodiment, the given TB is the SLTB3, the number of actual retransmissions of the SLTB3 is 3, and the number of actual transmissions of the SLTB3 is 4, and the number of the scheduling signaling corresponding to the transmission or retransmission of the given TB acquired by the UE3 is 2, and the number of retransmissions of the given TB requested by the UE3 is 1.

The UE3 acquires the SLG4, determines the scheduling information of PSSCH and/or PSCCH and/or PSFCH corresponding to the retransmission of SLTB3 according to a method similar to the initial transmission of SLTB3, retransmits the SLTB3 according to scheduling information indicated by the SLG4, and monitors the HARQ-ACK feedback transmitted by the UE4 at the corresponding PSFCH resource position.

Similar to the previous steps, the UE3 reports the received HARQ-ACK feedback from the UE4 to the base station, and determine whether it is necessary to request the sidelink resource for retransmitting the SLTB3 from the base station; the process is repeated, until the transmission process of the SLTB3 ends successfully or the SLTB3 reaches the maximum number of retransmissions.

4-4. The UE3 receives the NACK feedback from the UE4, and the UE3 does not transmit any feedback information of the sidelink transmission corresponding to the SLG3 to the base station. In this embodiment, the UE3 assumes that the base station will interpret no feedback information of the sidelink transmission corresponding to the SLG3 being received as a NACK, that is, the base station will consider that the transmission of SLTB3 has failed.

The subsequent processes are similar to those in embodiment 4-3. The difference between the embodiments 4-3 and 4-4 is that the NACK signaling is explicitly reported in the embodiment 4-3, and the NACK is implicitly reported in the embodiment 4-4 by not transmitting the feedback signaling.

4-5. The UE3 fails to receive any ACK/NACK feedback from the UE4, the UE3 considers that the transmission of SLTB3 fails, that is, the UE3 interprets no ACK/NACK feedback being received as implicitly indicating a NACK. The UE3 has two possible methods for reporting the NACK to the base station: explicitly transmitting a NACK signaling to the base station, which is similar to embodiment 4-3; implicitly reporting the NACK by not transmitting feedback signaling to the base station, which is similar to embodiment 4-4.

4-6. The UE3 fails to receive any ACK/NACK feedback from the UE4, and the UE3 considers that the feedback information corresponding to the transmission of SLTB3 is a DTX. Specifically, the DTX indicates that the UE4 fails to receive the PSSCH and/or PSCCH corresponding to SLTB3 because the UE4 is in a sleep state or for other reasons. The UE3 transmits a DTX feedback of the sidelink transmission corresponding to the SLG3 to the base station.

Optionally, the DTX feedback is used for at least one of: a) reporting the HARQ-ACK feedback information of SLTB3; b) requesting the base station to schedule a sidelink resource for retransmission of SLTB3.

The subsequent processes are similar to those in embodiment 4-3. The difference between the embodiments 4-3 and 4-6 is that the DTX and the NACK respectively indicate two different reasons of transmission failure, which helps to select the specific scheduling parameter according to the reason of transmission failure when the base station schedules retransmission of SLTB3. For example, when the retransmission of SLTB3 is scheduled in a period in which the UE4 wakes up from the sleep state, or it is considered that the reason of the DTX may be that the PSCCH energy of SLTB3 is insufficient to cover the UE4, thus the power of PSCCH and/or PSSCH is improved in the retransmission scheduling information of the SLTB3.

4-7. The UE3 fails to receive any ACK/NACK feedback from the UE4, and the UE3 considers that the feedback information corresponding to the transmission of SLTB3 is a DTX. The UE3 does not transmit any feedback information of the sidelink transmission corresponding to the SLG3 to the base station. In this embodiment, the UE3 assumes that the base station will interpret no feedback information of the sidelink transmission corresponding to the SLG3 being received as the DTX.

The subsequent processes are similar to those in embodiment 4-6. The difference between the embodiments 4-6 and 4-7 is that the DTX signaling is explicitly reported in the embodiment 4-6, and the DTX is implicitly reported in the embodiment 4-7 by not transmitting the feedback signaling.

5. The UE3 receives the ACK feedback or NACK feedback from the UE4, or does not receive any feedback information from the UE4; then, the UE3 determines whether to transmit the feedback information of the sidelink transmission corresponding to the SLG3 to the base station according to the scheduling information indicated in the SLG3 and/or the state of the HARQ-ACK of the UE4. In the above case, the contents of the feedback information correspond to the ACK/NACK/DTX successively.

The difference between embodiment 4 and embodiment 5 is that, in embodiment 4, the UE3 will report ACK/NACK/DTX feedback information of the sidelink transmission to the base station after each transmission of PSSCH or after receiving the feedback signaling from the UE4 each time (it is noted that the scenario of not receiving of signaling is equivalent to receiving DTX signaling is included here); in embodiment 5, the UE3 adds a step of determining whether to report to the base station, for example, transmits the ACK signaling to the base station only after the UE4 feeds back the ACK, and/or transmits the ACK signaling to the base station only when it is necessary to request resource release from the base station, and/or transmits the NACK signaling to the base station only when it is necessary to request retransmission resource from the base station; accordingly, the ACK or NACK signaling can be considered as sidelink resource release signaling or sidelink retransmission request signaling.

Optionally, according to the received states of the HARQ-ACK feedback of the UE4 (ACK/NACK being not received), there are several possibilities:

5-1. The UE3 determines whether to transmit feedback information of the sidelink transmission corresponding to the SLG3 to the base station according to the received states of the HARQ-ACK from the UE4. Specifically, if the UE 4 feeds back the ACK, the UE3 always reports the ACK to the base station, that is, the UE3 transmits the ACK feedback of the sidelink transmission corresponding to the SLG3 to the base station; otherwise, if the UE4 feeds back the NACK or there is no feedback (DTX), it is processed as the method in embodiment 5-3.

Specifically, the UE3 transmits the ACK feedback of the sidelink transmission corresponding to the SLG3 to the base station, and the transmission process of the SLTB3 ends successfully (the ACK signaling is explicitly reported);

Or, the UE3 receives the ACK feedback from the UE4, the UE3 does not transmit any feedback information of the sidelink transmission corresponding to the SLG3 to the base station, and the transmission process of SLTB3 ends successfully. The UE3 assumes that the base station will interpret no feedback information of the sidelink transmission corresponding to the SLG3 being received as an ACK, that is, the base station will consider the transmission of SLTB3 to be successful (the ACK is implicitly reported by not transmitting feedback signaling).

Optionally, after the transmission of the SLTB3 ends, if the remaining sidelink resource scheduled by the SLG3 are not used for the transmission of the SLTB3, the UE3 may release the remaining resource, and/or the UE determines the use of the remaining resource by itself, for example, the remaining resource is used for the transmission of other sidelink transport block.

Optionally, the ACK feedback of the sidelink transmission explicitly or implicitly reported in 5-1 may be used to request to release subsequent sidelink resource. In a specific embodiment, the UE3 reports the ACK feedback in slot M0, and the ACK feedback is used to request to release all sidelink resources scheduled to the UE3 in the SLG3 after slot M0+M1; wherein the M1 is predefined or a non-negative integer configured by the higher layer.

Or, the UE3 requests the base station to release the subsequent sidelink resource by reporting an independent sidelink resource release signaling. In this scenario, the ACK feedback of the sidelink transmission explicitly or implicitly reported in 5-1 is only used to indicate the successful transmission of SLTB3. If the UE3 transmits the ACK feedback and independent sidelink resource release signaling, the UE assumes that subsequent sidelink resource will be released. Otherwise, if the UE3 only transmits the ACK feedback, and does not transmit the independent sidelink resource release signaling, the UE3 assumes that the subsequent sidelink resource is still scheduled to sidelink transmission of UE3, and the UE3 may determine the use of the subsequent sidelink resource by itself, for example, used for transmitting other sidelink TB of UE3.

5-2. The UE3 determines whether to transmit the feedback information of the sidelink transmission corresponding to the SLG3 to the base station according to the received states of the HARQ-ACK from the UE4 and the scheduling information indicated in the SLG3.

Specifically, if the UE4 feeds back the ACK, the UE3 reports the ACK to the base station only when all the sidelink resources scheduled by the SLG3 have been used for the sidelink transmission by the UE3, or when there is remaining resource that is not used for the sidelink transmission of UE3 among the sidelink resources scheduled by the SLG3 and the UE3 decides to release the remaining resource, that is, the UE3 transmits the ACK feedback of the sidelink transmission corresponding to the SLG3 to the base station; otherwise, the UE3 does not transmit the ACK feedback to the base station.

If the UE4 feeds back the NACK or there is no feedback (DTX), it is processed as the method in embodiment 5-3.

Therefore, in embodiment 5-2, the ACK feedback corresponding to the SL grant is used to request the release of the subsequent sidelink resource. In a specific embodiment, the UE3 reports the ACK feedback in slot M0, and the ACK feedback is used to request to release all sidelink resources scheduled to the UE3 in the SLG3 after slot M0+M1; wherein the M1 is predefined or a non-negative integer configured by the higher layer.

The difference between the embodiments 5-1 and 5-2 is that only the ACK signaling is explicitly reported is supported, and that reporting the ACK implicitly by not transmitting the feedback signaling is not supported in the embodiment 5-2. In addition, if the UE reports the ACK signaling for requesting the release of the subsequent sidelink resource, it is not necessary to report the independent sidelink resource release signaling.

5-3. The UE3 determines whether to transmit the feedback information of the sidelink transmission corresponding to the SLG3 to the base station according to the received state of the HARQ-ACK from the UE4 and the scheduling information indicated in the SLG3.

Optionally, if the UE4 feeds back the NACK, the UE3 reports the NACK to the base station only when the sidelink resources scheduled by the SLG3 have been used for the sidelink transmission by the UE3, that is, the UE3 transmits the NACK feedback of the sidelink transmission corresponding to the SLG3 to the base station; otherwise, when there is remaining resource that is not used for the sidelink transmission of UE3 among the sidelink resources scheduled by the SLG3 and the UE3 decides to release the remaining resource, the UE3 does not transmit the NACK feedback of the sidelink transmission corresponding to the SLG3 to the base station.

Optionally, a specific method in which the UE and/or the base station determines whether there is still remaining sidelink resource scheduled in the SLG3 that is not used for the sidelink transmission of the UE3, is as below: the UE3 assumes that if the NACK feedback is transmitted, it is transmitted in the slot S0; the UE3 and/or the base station determines whether the sidelink resource scheduled in the SLG3 has a resource after the slot S0, then the resource after the slot S0 is a remaining sidelink resource scheduled in the SLG3 that is not used for the sidelink transmission of the UE3.

Optionally, the NACK feedback is used to request the base station to schedule a sidelink resource for retransmission of SLTB3.

If the NACK feedback is transmitted to the base station, the UE3 monitors possible new SL grant signaling in the downlink control channel. The base station receives the NACK feedback corresponding to the SLG3, and transmits a new SL grant SLG4 to the UE3. The scheduling information indicated by the SLG4 includes at least the sidelink resource for the retransmission of the SLTB3. In the above processes, optionally, a process of determining whether the maximum number of retransmissions has been reached is added. The specific details are similar to those in embodiment 4-3.

The UE3 acquires the SLG4, determines the scheduling information of PSSCH and/or PSCCH and/or PSFCH corresponding to the retransmission of SLTB3 according to a method similar to the initial transmission of SLTB3, retransmits the SLTB3 according to scheduling information indicated by the SLG4, and monitors the HARQ-ACK feedback transmitted by the UE4 in the corresponding PSFCH resource position.

Similar to the start steps of embodiment 5-1/5-2/5-3, based on the state of the HARQ-ACK received from the UE4 and/or the scheduling information indicated in the SLG3, the UE3 determines whether to report the received HARQ-ACK feedback from the UE4 to the base station, and whether it is necessary to request the sidelink resource for retransmitting the SLTB3 from the base station; the process is repeated, until the transmission process of the SLTB3 ends successfully or the SLTB3 reaches the maximum number of retransmissions.

If the UE3 determines to report the HARQ-ACK feedback from the UE4 to the base station, or determines that a sidelink retransmission request needs to be transmitted to the base station (specifically, to request a sidelink resource for retransmitting the SLTB3), the time domain and/or frequency domain resources for transmitting the HARQ-ACK feedback report or the sidelink retransmission request are determined according to at least one of the following:

information indicated in the SLG3; specifically, time domain and/or frequency domain resources used for transmission of feedback information of sidelink transmission corresponding to the SLG3 is indicated in the SLG3, and the indication may be explicit or implicit;

information indicated by the higher layer signaling; specifically, the parameter used for determining the time-frequency resource for transmitting the HARQ-ACK feedback report or the sidelink retransmission request is configured in the RRC signaling; and information obtained by deriving according to the resource position of specific signaling/channel and/or other scheduling information; specifically, the specific channel comprises at least one of: the SLG3, the PSCCH scheduled by the SLG3, the PSSCH scheduled by the SLG3, the PSFCH scheduled by the SLG3, the PUCCH carrying the HARQ-ACK feedback information of downlink transmission; the specific signaling comprises at least one of signaling transmitted on the above channels.

Optionally, for the information explicitly indicated in the SLG3, a specific embodiment is that the SLG3 explicitly indicates the time domain and/or the frequency domain resources for transmitting the HARQ-ACK feedback report or the sidelink retransmission request. Another specific embodiment is that the downlink allocation index (DAI) information is explicitly indicated in the SLG3, and the UE3 determines the time domain and/or frequency domain resources for transmitting the HARQ-ACK feedback report or the sidelink retransmission request according to the DAI information.

For the information implicitly indicated in the SLG3, a specific embodiment is that the UE3 determines the time domain and/or frequency domain resources used for transmitting the feedback information of the sidelink transmission corresponding to the SLG3 by deriving according to the time domain and/or the frequency domain resources of the SLG3. Another specific embodiment is that the UE3 determines the time domain and/or frequency domain resources used for transmitting the feedback information of the sidelink transmission corresponding to the SLG3 according to the PSFCH scheduling information explicitly or implicitly indicated in the SLG3.

Optionally, for the information indicated in the higher layer signaling, a specific embodiment is that the RRC configuration of the UE3 includes a time domain gap between a time domain resource for transmitting the HARQ-ACK feedback report or the sidelink retransmission request and a PSSCH/PSCCH/PSFCH of the SLG3 or the SLTB3 (for example, may be K0 in the following specific embodiments), and/or includes a frequency offset between a frequency domain resource for transmitting the HARQ-ACK feedback report or the sidelink retransmission request and a PSSCH/PSCCH/PSFCH of the SLG3 or the SLTB3.

Optionally, for the information obtained by deriving according to the resource position and/or other scheduling information of the specific signaling, a specific embodiment is that the UE3 obtains this information by deriving according to the information indicated by the HARQ-ACK feedback transmitted by the UE4, and/or the PSFCH resource position used by the feedback.

For a combination of several pieces of information above-described, a typical example is that the UE3 should calculate and obtain that the UE3 should report the feedback information of the sidelink transmission in slot K1+K0, according to that the time domain resource position of the SLG3 or the PSFCH is slot K1 and that the gap between the SL grant/PSFCH and the resource position where the UE reports the feedback information of sidelink transmission is K0, wherein the K0 is a predefined or RRC-configured positive integer. Similarly, the UE3 may also calculate and obtain the frequency domain resource used for reporting the feedback information of the sidelink transmission by the UE3 according to the frequency domain resource position of the SLG3 or the PSFCH, and the predefined or RRC-configured frequency offset.

Optionally, for a scenario in which the UE3 may explicitly or implicitly report to the base station an HARQ-ACK for indicating whether the sidelink transmission succeeds after transmitting the PSSCH each time, the UE determines that each PSSCH has at least one corresponding resource for reporting the HARQ-ACK; otherwise, for a scenario in which the UE3 only explicitly or implicitly reports to the base station an HARQ-ACK for indicating whether the sidelink transmission succeeds after the latest PSSCH transmission when the SL grant scheduling has ended, the UE determines that the latest one PSSCH scheduled by the SL grant has at least one corresponding resource for reporting the HARQ-ACK.

Figure 3:
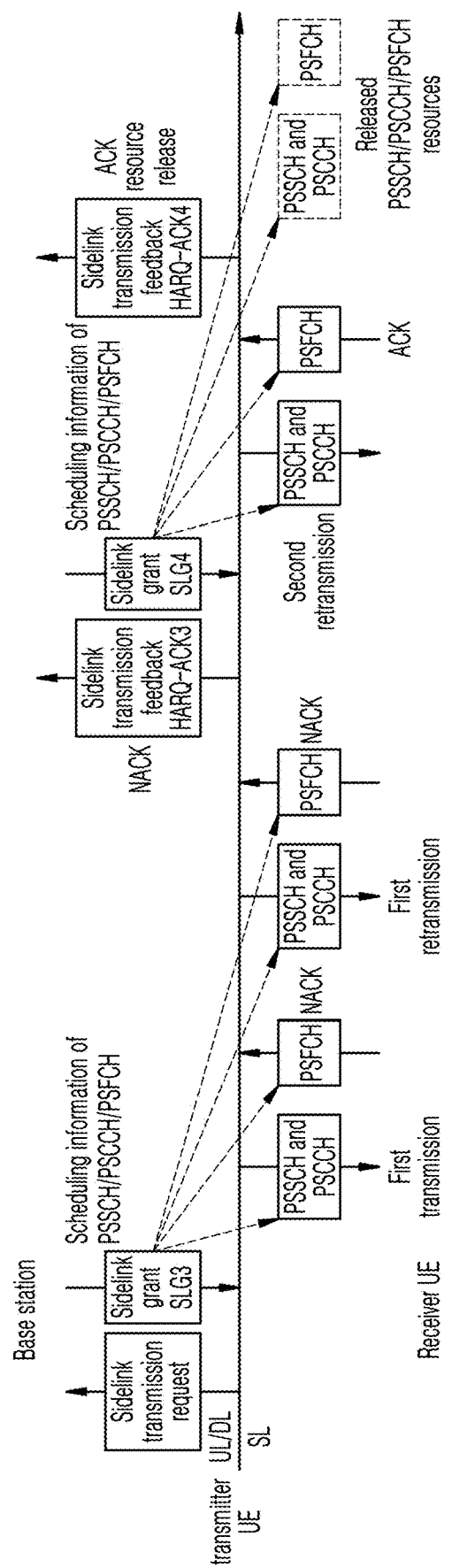
FIG. 3 illustrates a schematic diagram of another sidelink transmission according to an embodiment of the present application.

FIG. 3 shows a specific embodiment of the above exemplary embodiment. As shown in FIG. 3, a transmitter UE (referred to as a UE3 for convenience of description) transmits a sidelink transmission request to a base station, and the sidelink transmission request may be a BSR or an SR. The base station schedules, in an SL grant SLG3, two PSSCH resources, two PSCCH resources and two corresponding PSFCH resources for feedback information for the UE3. The UE3 determines that each PSSCH resource has a corresponding PUCCH resource for reporting HARQ-ACK information indicating whether the sidelink transmission succeeds, according to the pre-configured information.

The UE3 transmits the PSCCH and the PSSCH on the first PSCCH resource and the first PSSCH resource according to the scheduling information indicated by the SLG3, and the PSSCH carries the initial transmission of the given TB SLTB3, and receives the NACK information of the receiver UE (UE4) on the first PSFCH resource.

According to the predefined criteria, when receiving the NACK, the UE3 does not report the NACK if there is still a sidelink resource available for retransmission, and otherwise reports the NACK as a sidelink retransmission request signaling; therefore, the UE3 does not report a NACK on the PUCCH resource corresponding to the first PSSCH resource.

The UE3 continues to transmit the PSCCH and the PSSCH on the second PSCCH and the second PSSCH resources respectively, the PSSCH carries the first retransmission of the given TB SLTB3, and receives the NACK information of the UE 4 on the second PSFCH resource.

At this time, the UE3 has no sidelink resource available for retransmission of the SLTB3. Therefore, on the PUCCH resource corresponding to the second PSSCH resource, the UE3 reports the feedback information HARQ-ACK3 of the sidelink transmission corresponding to the SLG3 to the base station, wherein the content of the HARQ-ACK3 is a NACK. The NACK information triggers the base station to schedule the sidelink retransmission, and the base station schedules, in an SL grant SLG4, two PSSCH resources and two PSCCH resources for the retransmission of the sidelink TB, and two corresponding PSFCH resources for the feedback information for the UE3.

The UE3 transmits the PSCCH and the PSSCH on the first PSCCH resource and the first PSSCH resource scheduled for the second time according to the scheduling information indicated by the SLG4, and the PSSCH carries the second retransmission of the given TB SLTB3, and receives the ACK information of the UE4 on the first PSFCH resource scheduled for the second time.

According to a predefined criteria, when receiving the ACK, the UE3 reports the ACK as the sidelink resource release signaling; therefore, on the PUCCH resource corresponding to the first PSSCH resource scheduled for the second time, the UE3 will report the feedback information HARQ-ACK4 of the sidelink transmission corresponding to the SLG4 to the base station, and the content of the HARQ-ACK4 is ACK. The ACK information indicates that the sidelink transmission succeeds and the sidelink transmission process ends. In addition, the ACK information is also used as the sidelink resource release signaling for releasing the second PSCCH, second PSSCH, and second PSFCH resources indicated in the SLG4 that are not used by the UE3.

In the above specific embodiment, each PSSCH resource has a corresponding PUCCH resource for reporting the HARQ-ACK information indicating whether the sidelink transmission succeeds. The UE reports the NACK as a sidelink retransmission request and reports the NACK as a sidelink resource release, and the HARQ-ACK information is not reported when there are no such requirements. In another specific embodiment, among the multiple PSSCH resources schedule by each SL grant, only the last resource has a corresponding PUCCH resource for reporting HARQ-ACK information indicating whether the sidelink transmission succeeds (taking the above specific embodiment as an example, the second PSSCH resource scheduled for the first time and the second PSSCH resource scheduled for the second time have one corresponding PUCCH resource for reporting HARQ-ACK information respectively). In this embodiment, the sidelink retransmission may be requested by the NACK signaling in the HARQ-ACK, but the resource release may not be indicated by the ACK signaling in the HARQ-ACK.

The scheduling/configuration information acquired by the UE from the base station also includes an MCS table used for sidelink transmission. The table may be indicated in the higher layer configuration information, such as resource pool configuration information, UE-specific configuration information, or RRC information corresponding to the configured grant, or may be indicated in the physical layer signaling, for example, dynamically indicated in a DCI corresponding to the dynamic grant or configured grant. If more than one MCS table is obtained, the transmitter UE determines the MCS table actually used in at least one sidelink transmission according to at least one of the following:

whether the UE being configured/activated with specific characteristic; specifically, whether the characteristic is configured/activated may correspond to different MCS tables or MCS table sets;

the priority of the sidelink service; specifically, the priority is characterized by the quality of service (QoS);

the type of sidelink transmission; specifically, the type includes a unicast, a groupcast, and a broadcast;

the identity of the transmitter UE of the sidelink transmission; specifically, the identity includes a physical layer identity, and further includes a source ID;

the identity of the receiver UE of the sidelink transmission; specifically, the identity includes a physical layer identity, and further includes at least one of a destination ID, a destination group ID, and an ID of the UE in the destination group; wherein, the ID of the UE in the destination group is an identity for distinguishing different member UEs within one group.

After the transmitter UE determines the MCS table actually used in at least one sidelink transmission, it is further possible to indicate the actually used MCS table in the SCI associated with the at least one sidelink transmission. For example, more than one table are indexed and the index of the actually used MCS table is indicated in the SCI. Wherein the SCI can be a first order SCI and/or a second order SCI.

Correspondingly, the receiver UE determines the MCS table actually used in the received at least one sidelink transmission according to at least one of the above, and/or according to the indication information in the SCI.

In a specific example, if the UE is configured to enable the characteristic of 256QAM, the UE uses one MCS table corresponding to the characteristic of 256QAM. Otherwise, if the UE is configured not to enable the characteristic of 256QAM or the capability of the UE cannot support the characteristic of transmitting 256QAM, the UE uses other MCS tables corresponding to the characteristic of non-256QAM; if there is more than one other MCS tables corresponding to the characteristic of non-256QAM, the UE further selects the MCS table actually used in at least one sidelink transmission from the more than one MCS tables. For example, the UE selects an MCS table corresponding to the smallest TBS, which is larger than the payload size, from the plurality of MCS tables according to the size of the payload.

The above determination for the maximum number of retransmissions in the specification, further includes any one of the following.

If the UE determines that the NACK feedback is received, the UE transmits the NACK feedback of the sidelink transmission corresponding to the SLG1 to the base station only when the corresponding data (e.g., SLTB1, SLTB3) does not reach the maximum number of retransmissions; otherwise, the UE transmits ACK feedback to the base station, when the maximum number of retransmissions is reached;

If the UE determines that the NACK feedback is received, the UE transmits the NACK feedback of the sidelink transmission corresponding to the SLG1 to the base station only when the corresponding data (e.g., SLTB1, SLTB3) does not reach the maximum number of retransmissions; otherwise, the UE does not transmit feedback to the base station, when the maximum number of retransmissions is reached.

The advantages of the method of transmitting ACK feedback to the base station when the maximum number of retransmissions is reached, are lie that, after the UE transmits an ACK to the base station, the base station can assume that the UE does not need to retransmit the sidelink TB, so that the ACK feedback does not trigger the base station to schedule resources for the sidelink transmission of the UE, thereby reducing the waste of resource. Otherwise, if the UE simply reports the received sidelink feedback (for example, the HARQ-ACK feedback carried on the PSFCH) to the base station, there are following two possible scenarios. 1) the base station may know whether the TB corresponding to the NACK has reached the maximum number of retransmissions only by maintaining the specific situation of the sidelink transmission (at least the number of retransmissions of each TB of the sidelink transmission), and re-schedule the sidelink resources only for the TB that does not reach the maximum number of retransmissions. In this scenario, the complexity of base station has increased dramatically, further the flexible application of the sidelink UE to the sidelink resources scheduled by the base station is limited, since the UE autonomously deciding how to use the sidelink resources scheduled by the base station may damage the maintenance of the specific situation of the sidelink transmission by the base station. 2) The base station does not maintain the specific situation of the sidelink transmission, and schedules the sidelink resource used for the sidelink retransmission for all the UE that reports the NACK. In this scenario, the base station schedules the new resource for the UE even if the UE is actually unable to continue the retransmission, so that the resource may be wasted.

The reporting of the HARQ-ACK feedback (for example, HARQ-ACK-2) of the sidelink transmission to the base station by the UE, further includes: if the service type of the sidelink transmission is the groupcast, and the groupcast type is that the each receiver UE needs to feedback the ACK or NACK, instead of only feeding back the NACK and not feeding back the ACK, the transmitter UE of the groupcast service also maintains the HARQ-ACK state of each expected Receiver UE, and reports the HARQ-ACK feedback of the sidelink transmission to the base station according to the maintained HARQ-ACK state of each Receiver UE and/or the HARQ-ACK feedback received on the sidelink channel.

Specifically, the transmitter UE of the groupcast service further maintains the HARQ-ACK state of each Receiver UE, including at least one of the following:

For a transmission of a sidelink TB of a given groupcast service, if a receiver UE feeds back an ACK, the HARQ-ACK state of the receiver UE for the TB is an ACK;

For a transmission of a sidelink TB of a given groupcast service, if a Receiver UE feeds back a NACK, or the HARQ-ACK feedback from a Receiver UE is not received, and the UE fed back an ACK for at least one transmission of the TB before this transmission of the TB, the HARQ-ACK state of the receiver UE for the TB is an ACK;

For a transmission of a sidelink TB of a given groupcast service, if a receiver UE feeds back a NACK, or the HARQ-ACK feedback from a Receiver UE is not received, and the UE did not feedback an ACK for any transmission of the TB before this transmission of the TB, the HARQ-ACK state of the receiver UE for the TB is an NACK.

Specifically, the transmitter UE of the groupcast service reports the HARQ-ACK feedback of the sidelink transmission to the base station according to the maintained HARQ-ACK state of each receiver UE, including at least one of the following:

If the HARQ-ACK states of all the expected receiver UEs for the sidelink TB of a given groupcast service are the ACKs, the ACK is reported to the base station;

If the HARQ-ACK state of at least one expected receiver UE for the sidelink TB of a given groupcast service is the NACK, the NACK is reported to the base station.

Wherein, if the sidelink transmission is scheduled by the configured grant, and a resource scheduled by the configured grant can be used for transmission of multiple sidelink TBs, the sidelink TB of the given groupcast service can be the last sidelink TB corresponding to the transmission scheduled by one configured grant, or any one sidelink TB, or the last/any one sidelink TB of groupcast service. Similarly, the configured grant can also be replaced with a dynamic grant, or a specific type of configured grant, or other type of sidelink grant.

Wherein, the expected receiver UE is that should receive the groupcast service transmitted by the transmitter UE assumed by the transmitter UE. Further, the expected Receiver UE is a member of all the groups of the groupcast service transmitted by the transmitter in the target groups, or is a member of all the groups of the groupcast service in which the each Receiver UE needs to feedback the ACK or NACK in the target groups.

The concept of a sidelink slot, which is configured to be included in a sidelink resource pool, is used in this specification. The UE obtains the configuration of the sidelink slot and determines which slots are configured as sidelink slots, which further includes: determining which uplink slots are configured as sidelink slots, by the UE based on the configuration of the sidelink slots in the uplink slot; or, determining which slots are configured as sidelink slots by the UE based on the configuration of the sidelink slots in all physical slots. Further, the uplink slot is a cell-specific uplink slot; the cell is a serving cell in which the UE acquires configuration information or scheduling information of sidelink communication.

The differences between the two methods are described below by taking the sidelink slot being configured in a way of bit map as an example. If the UE obtains a bitmap [11001 10010] indicating the position of the sidelink slot, then the following steps are performed.

If the UE determines, based on the configuration of the sidelink slot, which uplink slots are configured as sidelink slots in the uplink slot, the UE determines that each uplink slot corresponds to 1 or 0 in the bitmap one by one according to the bitmap, and downlink slots do not correspond to bits in the bitmap. For example, if the first five slots are downlink slots and the last five slots are uplink slots per ten physical slots in an uplink and downlink configuration, the bitmap corresponds to a period of a total of ten uplink slots per twenty physical slots. Specifically, if the number of every twenty physical slots is set to 1 to 20, the slots 1 to 5 and 11 to 15 are downlink slots, and slots 6 to 10 and 16 to 20 are uplink slots, slots 6, 7, 10, 16, 19 are sidelink slots according to the bitmap.

Or, if the UE determines, based on the configuration of the sidelink slot, which slots are configured as sidelink slots in all physical slots, the UE determines that each physical slot corresponds to 1 or 0 in the bitmap one by one according to the bitmap. For example, if the first five slots are downlink slots and the last five slots per ten physical slots are uplink slots in an uplink and downlink configuration, the bitmap corresponds to ten physical slots. If the number of every ten physical slots is set to 1 to 10, slots 1, 2, 5, 6, and 9 are sidelink slots according to the bitmap.

Optionally, after the sidelink UE obtains the PUCCH resource corresponding to the sidelink transmission scheduled by the base station, if it is determined that the transmission on the resource is collided with other uplink, downlink, or sidelink transmissions, the collision needs to be resolved. Wherein, the PUCCH resource corresponding to the sidelink transmission includes a PUCCH resource for reporting whether the sidelink transmission is successful, the transmission on which includes a transmission of PUCCH or UCI carrying HARQ-ACK information of the sidelink transmission. Wherein, the PUCCH transmission on the resource is collided with other uplink, downlink, or sidelink transmissions, includes the case that the resource overlaps or partially overlaps with resource used by other uplink, downlink, or sidelink transmissions in the time domain; optionally, it also includes the case that the UE does not have the capability to transmit collided multiple transmissions simultaneously, and/or the UE does not have the capability to transmit and receive the collided multiple transmissions simultaneously.

Solutions to this collision include at least one of: multiplexing collided transmissions on the same resource or in one transmission; dropping at least one of the collided transmissions; transmitting and/or receiving an un-dropped transmission among the collided transmissions in the same way as when no collision occurred. Optionally, in this example and the following examples, dropping of at least one of the collided transmissions may also be replaced with postponing of at least one of the collided transmissions.

Solutions to this collision include at least one of: according to predetermined conditions, transmitting and/or receiving N un-dropped transmissions among the collided transmissions in the same way as when no collision occurred and dropping transmitting and/or receiving of other transmissions in the collided transmissions. Wherein, the value of N is fixed/(pre)configured/(pre)defined, and/or determined according to predetermined conditions. Wherein, the predetermined conditions include at least one of the following: priority of service scenario corresponding to transmission (such as Ultra-reliable and Low Latency Communications (URLLC) scenario, Enhanced Mobile Broadband (eMBB) scenario, sidelink scenario, sidelink public safety scenario, sidelink non-public safety scenario, sidelink commercial scenario), priority of information carried in the transmission (such as data priority indicated by QoS, priority of UCI/DCI information carried in the transmission), priority of the channel of transmission (such as the priorities of the downlink channel, the uplink channel, the sidelink channel, and further such as specific priorities of uplink/downlink/sidelink channels of PUCCH, PUSCH, PDCCH, PSSCH), UE capability of supporting multiple simultaneous transmissions, and the duplex capability of the UE (such as half-duplex/full-duplex).

Optionally, if a transmission corresponds to more than one priority, the priority of the transmission is determined according to the highest priority, or the lowest priority, or the average value of the priorities. For example, if a transmission is the transmission of an HARQ-ACK codebook of sidelink data, and the codebook carries HARQ-ACK information of multiple sidelink TBs, then the priority of the transmission is determined according to the minimum value (corresponding to the highest priority), or the maximum value (corresponding to the lowest priority), or the average value of quality-of-service(s) (QoSs) corresponding to the multiple sidelink TBs.

Optionally, the value of N is fixed as 1. The sidelink UE resolving collisions between transmissions on the PUCCH resource corresponding to the sidelink transmission scheduled by the base station and other uplink/downlink/sidelink transmissions, includes that the sidelink UE transmits and/or receives a transmission with the highest priority among the collided transmissions in the same manner as when no collisions occur, and drops other transmissions.

In a specific example, the priorities between different service scenarios are that: the priority of URLLC is higher than the priority of eMBB and the priority of eMBB is higher than the priority of sidelink transmission (that is, priority of URLLC>priority of eMBB>priority of sidelink transmission). If the sidelink UE determines that more than one transmission need to be transmitted and/or received on a specific resource (for example, a time slot/symbol), the sidelink UE performs the following steps:

The UE determines whether there is a transmission corresponding to URLLC in the more than one transmission, such as data or control signaling corresponding to URLLC, and the control signaling further includes HARQ-ACK information corresponding to URLLC and scheduling information corresponding to URLLC; if there are transmissions corresponding to URLLC, further determines to transmit/receive a transmission with the highest priority among the transmission corresponding to URLLC, and drops other transmissions on that specific resource;

Otherwise, if there is no transmission corresponding to URLLC, the UE continues to determine whether there is a transmission corresponding to eMBB in more than one transmission, such as data or control signaling corresponding to eMBB, and the control signaling further includes HARQ-ACK information corresponding to eMBB and scheduling information corresponding to eMBB; if there are transmissions corresponding to the eMBB, further determines to transmit/receive the transmission with the highest priority among the transmissions corresponding to eMBB, and drops other transmissions on the specific resource;

Otherwise, if there is no transmission corresponding to eMBB, the UE continues to determine the priorities of the more than one transmission, and further determines to transmit/receive one transmission with the highest priority among the more than one transmission, and drops the other transmissions on the specific resource; for example, if the more than one transmission are all sidelink transmissions, the UE determines to transmit/receive the transmission with the smallest QoS value based on the QoS parameters of the more than one transmission, and drops other transmissions on the specific resource.

In the above example, the priorities of all services in a given service scenario is lower than or higher than those of another service scenario. For example, the priority of any eMBB service is lower than that of any URLLC service, and the priorities of the eMBB and URLLC are both higher than that of any sidelink service. In another example, the priority of any URLLC service is higher than the priority of any eMBB/sidelink services, but there is no absolute relationship between the priority the eMBB and the priority of the sidelink service. For example, some sidelink services (for example, services in the sidelink public safety scenario) have higher priority than any of the eMBB service and the priority of any eMBB service is higher than other sidelink services (for example, services in the sidelink non-public safety scenario/sidelink commercial scenario) (that is, priority of URLLC>priority of some sidelink services>priority of any eMBB services>priority of other sidelink services); for example, the priorities of the sidelink service and the eMBB service are determined according to the specific service type, and the UE sorts the priorities of different services according to priority parameters corresponding to each service type.

In another specific example, the priorities between different service scenarios are that: URLLC>sidelink transmission of specific service priorities>eMBB>remaining sidelink transmissions. If the sidelink UE determines that more than one transmission need to be transmitted and/or received on a specific resource (for example, a time slot/symbol), the sidelink UE performs the following steps:

The UE determines whether there is a transmission corresponding to URLLC in the more than one transmission, such as data or control signaling corresponding to URLLC, and the control signaling further includes HARQ-ACK information corresponding to URLLC and scheduling information corresponding to URLLC; if there is a transmission corresponding to URLLC, further determining to transmit and/or receive one transmission with the highest priority among the transmissions corresponding to URLLC, and dropping other transmissions on that specific resource;

Otherwise, if there is no transmission corresponding to URLLC, the UE continues to determine whether there is a sidelink transmission of specific service priority among the more than one transmission; if there are sidelink transmissions of specific service priorities, further determines to transmit/receive one transmission with the highest priority among the sidelink transmissions of specific service priorities, and drops other transmissions on the specific resource; optionally, the sidelink transmission of the specific service priority is a sidelink transmission whose QoS is lower than a given threshold.

Otherwise, if there is no sidelink transmission of specific service priority, the UE continues to determine whether there is a transmission corresponding to eMBB in more than one transmission, such as data or control signaling corresponding to eMBB, and the control signaling further includes HARQ-ACK information corresponding to eMBB and scheduling information corresponding to eMBB; if there are transmissions corresponding to the eMBB, further determines to transmit/receive one transmission with the highest priority among the transmissions corresponding to eMBB, and drops other transmissions on the specific resource;

Otherwise, if there is no transmission corresponding to eMBB, the UE continues to determine the priorities of the more than one transmission, and further determines to transmit/receive one transmission with the highest priority among the more than one transmission, and drops the other transmissions on the specific resource; for example, if the more than one transmission are all sidelink transmissions, the UE determines to transmit/receive a transmission with the smallest QoS value according to the QoS parameters of the more than one transmission, and drops other transmissions on the specific resource.

The above examples are mainly used to illustrate the impact of different service scenarios and/or service types on the determination of priority. Similarly, the channel is an uplink/downlink/sidelink channels, and the channel type (such as a data channel/control channel) may also be used to determine the priorities of different transmissions. In a specific example, if the sidelink UE determines that more than one transmission need to be transmitted and/or received on a specific resource (for example, a certain time slot/symbol), the UE first determines to transmit or receive on the resource according to the priorities of uplink channel, the downlink channel, and the sidelink channel, and/or the priorities of different channel types (such as the priorities of channel type of PDSCH, PDCCH, PUCCH, PUSCH, PSSCH, PSCCH, PSFCH), and then determines to transmit or receive one transmission with the highest priority according to the priorities of different channel types and/or the priorities of different service scenarios and/or the priorities of different service types. In another specific example, the priority of each transmission is jointly determined according to the channel type used by the transmission, the service scenario corresponding to the transmission, and the service type corresponding to the transmission, and the UE determines to transmit or receive one transmission with the highest priority according to the priority corresponding to each of the more than one transmission. For example, the UE assumes that the priority of the PUCCH transmission corresponding to the sidelink transmission is lower than that of any transmission corresponding URLLC, and QoS meets the condition that the priority of the PUCCH transmission of the corresponding sidelink transmission is higher than the UCI transmission of the eMBB in the first specific condition (the UCI includes an UCI carrying specific content, for example, an UCI carrying HARQ-ACK feedback information of PDSCH; or the UCI includes any UCI), and the QoS does not meet the condition that the priority of the PUCCH transmission corresponding to the sidelink transmission is less than the UCI transmission of the eMBB in the first specific condition or the second specific condition. Wherein, the first specific condition and/or the second specific condition include at least one of the following: QoS is within a given threshold range and any QoS. Wherein, the UCI transmission of the eMBB is a specific type of UCI (for example, a specific type such as CSI, HARQ-ACK codebook), or the UCI transmission may be any type of UCI. The UE determines to transmit or receive transmission with the highest priority according to the priority condition.

Optionally, the value of N is configured or determined according to UE capability. If N is determined according to the UE capability, optionally, the sidelink UE determines to transmit N transmissions with the highest priority among the collided transmissions, wherein N is the maximum number of simultaneous transmissions that the UE capability can support. The method for the UE to select the N transmissions with the highest priority is similar to that when N=1, and the description is not repeated. Optionally, the sidelink UE determining to transmit the N transmissions with the highest priority among the collided transmissions, further includes that: the UE selects one transmission with the highest priority; and then, the UE may select the second transmission with the highest priority among other transmissions which may be transmitted simultaneously with the transmission with the highest priority, and so on until a total of N transmissions are selected, or the UE selects the remaining N−1 transmissions with the highest priority among other transmissions which may be transmitted simultaneously with the transmission with the highest priority.

Optionally, the sidelink UE determines to transmit N transmissions with the highest priority among the collided transmissions, further including determining the transmitting power of the N transmissions, which includes at least one of following methods.

The UE determines the N transmissions with the highest priority, and determines its transmitting power according to the method when no collision occurs; then, the UE determines whether the total transmitting power of the N transmissions exceeds the maximum transmitting power of the UE; if it exceeds, then the transmitting power of each transmission is reduced proportionally until the total transmitting power of N transmissions does not exceed the maximum transmitting power of the UE. The advantage of this method lies in that a fair power allocation among the transmitted N transmissions is implemented with relatively low complexity, thus ensuring a relatively fair probability of each transmission being successfully received.

The UE selects one transmission with the highest priority, and determines its transmitting power according to the method when no collision occurs; then, the UE uses the remaining transmitting power for other transmissions; specifically, the UE preferentially ensures the transmitting power of the transmission with the next highest priority to be same as that when no collision occurs, and then use the remaining transmitting power for the remaining transmissions, and so on; or, the UE determines whether the transmitting power of the N−1 transmissions except one transmission with the highest priority exceeds the remaining transmitting power, if it exceeds, the transmitting power of each transmission is reduced proportionally until the transmitting power of the other N−1 transmissions does not exceed the remaining transmitting power. The advantage of this method lies in that it may ensure that the transmitting power of one transmission with the highest priority is not affected by other transmissions, and it may also ensure that the transmitting power of the transmissions with the higher priority is less likely to be affected by other transmissions with the lower priority, thus ensuring the probability of services with a higher priority being successfully received.

Optionally, the method for resolving the collision further includes: if the collided transmissions include PUCCH and/or UCI transmissions, multiplexing the collided PUCCH transmission and/or UCI transmission on the same PUCCH and/or UCI according to predetermined conditions. Optionally, the method for resolving the collision further includes: if the collided transmissions also include PUSCH transmission in addition to the PUCCH and/or UCI transmissions, then multiplexing the collided PUCCH transmission and/or UCI transmission on the same PUCCH and/or UCI according to predetermined conditions, and/or piggybacking the PUCCH and/or UCI on the PUSCH.

Wherein, the predetermined conditions include at least one of the following: the information carried by the collided transmissions is a specific type (for example, any one of HARQ-ACK information and CSI information), the collided transmission carries the same type of information (for example, all are HARQ-ACK codebooks), collided transmissions correspond to a specific service type or service scenario (for example, any of the eMBB scenario, sidelink scenario), the total length of the multiplexed collided transmissions does not exceed a given threshold, and the number of the collided transmissions does not exceed a given threshold.

Optionally, if the sidelink UE determines that the sidelink transmission is collided with the uplink transmission, for example, the sidelink UE determines that the resources used by the sidelink transmission overlap or partially overlap with the resources used by the uplink transmission in the time domain, the method for the sidelink UE to resolve the collision includes dropping at least one collided transmission, and/or adjusting the transmitting power of at least one collided transmissions. The criteria for the sidelink UE to determine whether to resolve the collision and by which method to resolve the collision may include at least one of the following:

When the UE can support the simultaneous transmissions of collided sidelink transmission and uplink transmission, there is no need to resolve the collision and simultaneously transmit the collided sidelink transmission and uplink transmission; otherwise, the collision needs to be resolved;

When the UE capability of supporting simultaneous transmission of sidelink transmission and uplink transmission is mandatory, there is no need to resolve the collision and the UE transmits collided sidelink transmission and uplink transmission simultaneously;

When the UE capability of supporting simultaneous transmission of sidelink transmission and uplink transmission is optional, the collision needs to be resolved, or whether the collision needs to be resolved is determined according to whether the UE capability supports simultaneous transmission of sidelink transmission and uplink transmission;

When the collided sidelink transmission and uplink transmission are in different frequency bands (for example, in FR1 and FR2 respectively), there is no need to resolve the collision and the UE transmits the collided sidelink transmission and uplink transmission simultaneously;

When the collided sidelink transmission and uplink transmission are in different frequency bands (for example, in FR1 and FR2 respectively), and the UE capability can support simultaneous transmission of sidelink transmission and uplink transmission in different frequency bands, there is no need to resolve the collision and the UE transmits the collided sidelink transmission and uplink transmission simultaneously;

When the collided sidelink transmission and uplink transmission are in the same frequency band (for example, in FR1 and FR2 respectively), the collision needs to be resolved, or whether the collision needs to be resolved is determined according to whether the UE capability supports simultaneous transmission of sidelink transmission and uplink transmission in the same frequency band.

Wherein, the FR1 and the FR2 are two typical frequency bands (FRs) used to distinguish low frequency and high frequency in 5G technology. Wherein, FR1 is below 6 GHz; and FR2 is above 6 GHz, and usually is less than 52.6 GHz.

The frequency band in this example may also be replaced with a carrier, since whether the UE capability supports simultaneously transmitting sidelink transmission and uplink transmission may be related to the condition of the carrier on which the sidelink/uplink transmission is.

The advantage of this method lies in that it may determine whether the collision needs to be resolved according to the specific UE capability, and may also determine whether the UEs capability supports simultaneous transmission according to the specific conditions of the sidelink transmission and uplink transmission, such as the frequency band/carrier on which the sidelink/uplink transmission is, thereby avoiding adjusting or dropping collided transmissions when the UE capability is sufficient to support simultaneous transmissions, so as to maximize the UE's transmitting capability.

When the sidelink UE obtains the scheduling information or configuration information of the sidelink transmission from the base station, if the information is indicated by DCI, for example, obtaining a DCI-based dynamic grant or obtaining a grant based on both configuration of DCI and RRC signaling, the sidelink UE may need to monitor both the DCI in the Uu system based on uplink and downlink transmission and the DCI in the PC5 system based on sidelink transmission. Accordingly, it is necessary to consider how to control the overhead of the UE in DCI monitoring. In the existing 5G system, when the UE needs to monitor multiple different types of DCI in the Uu system, it performs DCI size alignment based on the number and type of DCI monitored by the UE. For example, in the existing 5G system, the UE performs the padding and truncation of the DCI format in the following steps:

Step 0: The UE determines the sizes of DCI formats 0_0 and 1_0 that are monitored in the common search space (CSS), and appends padding bits for DCI format 0_0 when the size of DCI format 0_0 is smaller than DCI format 1_0, so that the sizes of DCI formats 0_0 and 1_0 are equal; truncates some bits in the frequency domain resource allocation domain in DCI format 0_0 when the size of DCI format 0_0 is larger than DCI format 1_0, so that the sizes of DCI formats 0_0 and 1_0 are equal;

Step 1: The UE determines the sizes of the DCI formats 0_0 and 1_0 that are monitored in the UE-specific search space (US S), and when the UE is configured with supplementary uplink (SUL), if the PUSCH is configured to be transmitted in both the SUL cell and non-SUL cell, and the sizes of SUL and non-SUL DCI formats 0_0 are different, appends padding bits for the smaller DCI format 0_0, so that the sizes of DCI format 0_0 of SUL and non-SUL cells are equal; appends padding bits for the DCI format 0_0 when the size of DCI format 0_0 is smaller than DCI format 1_0, so that the sizes of DCI format 0_0 and 1_0 are equal; appends padding bits for the DCI format 1_0 when the size of DCI format 0_0 is greater than DCI format 1_0, so that the sizes of DCI formats 0_0 and 1_0 are equal;

Step 2: The UE determines the sizes of the DCI formats 0_1 and 1_1 that are monitored in the USS, and when the UE is configured with SUL, if the PUSCH is configured to be transmitted in both the SUL cell and non-SUL cell, and the sizes of DCI formats 0_1 of SUL and non-SUL cells are different, appends padding bits for the smaller DCI format 0_1, so that the sizes of DCI format 0_1 of SUL and non-SUL cells are equal; when the size of DCI format 0_1 is equal to the DCI format 0_0/1_0 monitored in another USS, appends one padding bit for the DCI format 0_1; appends one padding bit for the DCI format 1_1 when the size of DCI format 1_1 is equal to the DCI format 0_0/1_0 monitored in another USS;

Step 2A: padding and truncation of DCI formats 0_2 and 1_2 is performed by a method similar to that in step 2 (for example, replacing 0_1 in step 2 with 0_2, and replacing 1_1 in step 2 with 1_2);

Step 3: If the total size of DCI to be monitored does not exceed 4, and the total size of DCI using C-RNTI to be monitored does not exceed 3, the size alignment process is completed; otherwise, the subsequent steps are performed sequentially;

Step 4 includes steps 4A, 4B, 4C and 4D, which are specifically as below:

Step 4A: the appended padding bits in steps 2 and 2A are removed; the UE determines the sizes of the DCI formats 0_0 and 1_0 that are monitored in the USS, and makes the DCI formats 0_0 and 1_0 in the same cell equal by a method similar to that in step 0;

Step 4B: if the total number of sizes of different DCIs monitored in the cell after applying the above steps exceeds 4, or the total number of sizes of different DCI using C-RNTI to be monitored exceeds 3, then: if the size of the DCI format 0_2 before padding is smaller than DCI format 1_2, the padding bits are appended for DCI format 0_2, so that the sizes of DCI format 0_2 and DCI format 1_2 are equal; if the size of DCI format 1_2 before padding is smaller than DCI format 0_2, the padding bits are appended for DCI format 1_2, so that the sizes of DCI formats 0_2 and 1_2 are equal;

Step 4C: if the total number of sizes of different DCIs monitored in the cell after applying the above steps exceeds 4, or the total number of sizes of different DCIs using C-RNTI to be monitored exceeds 3, then: if the size of the DCI format 0_1 before padding is smaller than DCI format 1_1, the padding bits are appended for DCI format 0_1, so that the sizes of DCI formats 0_1 and 1_1 are equal; if the size of DCI format 1_1 before padding is smaller than DCI format 0_1, the padding bits are appended for DCI format 1_1, so that the sizes of DCI formats 0_1 and 1_1 are equal.

The UE does not expect processing a configuration that results in the following after applying the above steps:

The total number of size of different DCIs that the cell needs to monitor exceeds 4; or the total number of sizes of different DCIs using C-RNTI that the cell needs to monitor exceeds 3; or the size of the DCI format 0_0 in one USS is equal to the size of the DCI format 0_1 in another USS; or the size of DCI format 1_0 in one USS is equal to the size of DCI format 1_1 in another USS; or the size of DCI format 0_0 in one USS is equal to the size of DCI format 0_2 in another USS; or the size of the DCI format 1_0 in one USS is equal to the size of the DCI format 1_2 in another USS. The last two items have not been completely determined in the existing technique, and are optional results.

Optionally, after the DCI for scheduling sidelink transmission is introduced into the existing technique, the UE may also use a similar method to perform size alignment for the DCI format for scheduling sidelink transmission. It is assumed that the DCI format for scheduling the sidelink transmission is a DCI format 3 x, which further includes one or more DCI formats. For example, the DCI format 3_x includes a DCI format 3_0 for scheduling transmission in an NR-based sidelink system, and a DCI format 3_1 for scheduling transmission in an LTE-based sidelink system, (i.e., cross-RAT scheduling); optionally, it also includes other DCI formats 3_3 for scheduling transmissions in possible sidelink systems (e.g., NR-based D2D systems) of future versions. The sidelink UE performs the format alignment for DCI format 3_x, by at least one of the following methods:

determining the DCI format 3_a monitored in a CSS and/or USS, and/or determining the size of the DCI format 3_a through parameters related to the information field in the DCI;

determining the DCI format 3 b monitored in a CSS and/or USS, and/or determining the size of the DCI format 3 b through parameters related to the information field in the DCI;

generating a certain number of padding bits for DCI format 3_a until the payload size of DCI format 3_a is equal to the payload size of DCI format 3 b, if the number of information bits of DCI format 3_a monitored in a CSS and/or USS before appending padding bits is smaller than the payload size of DCI format 3 b monitored in a specific search space;

generating a certain number of padding bits for DCI format 3_a until the payload size of DCI format 3_a is equal to the payload size of DCI format x_y, if the number of information bits of DCI format 3 a monitored in a CSS and/or USS before appending padding bits is smaller than the payload size of DCI format x_y monitored in a specific search space;

reducing bitwidth of specific field in the DCI format 3_a by truncating specific bits, until the payload size of the DCI format 3_a is equal to the payload size of the DCI format 3 b, if the number of information bits of the DCI format 3 a monitored in a CSS and/or USS before truncation is larger than the payload size of the DCI format 3 b monitored in a specific search space; wherein the ways to truncate specific bits includes at least one of truncating the highest bit, the lowest bit, and the few most significant bit;

reducing bitwidth of specific field in the DCI format 3_a by truncating specific bits, until the payload size of the DCI format 3_a is equal to the payload size of the DCI format x_y, if the number of information bits of the DCI format 3_a monitored in a CSS and/or USS before truncation is larger than the payload size of the DCI format x_y monitored in a specific search space; wherein the ways to truncate specific bits includes at least one of truncating the highest bit, the lowest bit, and the few most significant bit; and appending one padding bit for the DCI format 3 a, if the number of information bits of the DCI format 3_a monitored in a CSS and/or USS is equal to the payload size of the DCI format x_y monitored in a specific search space.

Wherein, the specific search space includes at least one of the following: a CSS; a USS; a same search space; another search space; another USS; a CSS for scheduling the same serving cell; a USS for scheduling the same serving cell; one or any search space for scheduling the same serving cell.

Wherein, the DCI format x_y includes at least one of the following: DCI format 0_0, DCI format 1_0, DCI format 0_1, DCI format 1_1, DCI format 0_2, DCI format 1_2, and other DCI formats for scheduling sidelink transmission in NR system (e.g., DCI format 3_b), and other DCI formats for scheduling uplink or downlink transmissions in the NR system.

Further, the sidelink UE performing format alignment for DCI format 3_x includes adding one or more of the above methods within/before/after a specific step of DCI format alignment in the existing technique. In a specific example, the sidelink UE performing format alignment for DCI format 3_x includes adding the following method between steps 2A and 3 of the DCI format alignment in the existing technique (for example, as step 2B):

determining the DCI format 3_0 monitored in a CSS and/or USS, and/or determining the size of the DCI format 3_0 through parameters related to the information field in the DCI;

determining the DCI format 3_1 monitored in a CSS and/or USS, and/or determining the size of the DCI format 3_1 through parameters related to the information field in the DCI;

generating a certain number of padding bits for DCI format 3_a until the payload size of DCI format 3_0 is equal to the payload sizes of DCI formats 0_0 and 1_0, if the number of information bits of DCI format 3_0 monitored in a CSS and/or USS before appending padding bits is smaller than the payload sizes of DCI formats 0_0 and 1_0 monitored in another USS; and generating a certain number of padding bits for DCI format 3_1 until the payload size of DCI format 3_0 is equal to the payload sizes of DCI formats 0_0 and 1_0, if the number of information bits of DCI format 3_1 monitored in a CSS and/or USS before appending padding bits is smaller than the payload sizes of DCI formats 0_0 and 1_0 monitored in another USS.

Optionally, the sidelink UE performing format alignment for the DCI format 3_x, includes always performing format alignment for the DCI format 3_x regardless of any determination condition; further includes performing format alignment for the DCI format 3_x based on conditions, in other words, the format alignment for the DCI format 3_x is performed only when the determination conditions are met. Specifically, it includes at least one of the following:

performing a certain specific method or any method of the above at least one method, if the total number of sizes of different DCIs configured to monitor exceeds a given first threshold, and/or, the total number of sizes of different DCIs using a specific RNTI configured to monitor exceeds a given second threshold; and not performing a certain specific method or any method of the above at least one method, if the total number of sizes of different DCIs configured to monitor does not exceed a given first threshold, and/or, the total number of sizes of different DCIs using a specific RNTI configured to monitor does not exceed a given second threshold.

In the existing technique, the first threshold is 4 and the second threshold is 3. In this example, the first threshold and/or the second threshold may be fixed, or (pre)defined/(pre)configured, or determined based on UE capability. In this example, the specific RNTI may be one RNTI (such as C-RNTI) or multiple RNTIs (such as C-RNTI or a specific RNTI using sidelink transmission).

The specific implementation method of performing the format alignment for the DCI format 3_x based on the conditions includes adding the condition before a certain method of performing the format alignment for the DCI format 3_x, and further including adding a method of performing the above format alignment for DCI format 3_x into different steps in the existing technique. For example, in the existing technique, the determination of whether the total number of sizes of different DCIs monitored by the UE and/or the total number of sizes of different DCIs using C-RNTI is greater than a specific threshold value at step 3 is performed, and a similar determination is performed before some steps in step 4. Therefore, if a certain method for performing the format alignment for the DCI format 3_x is added before step 3 in the existing technique, it may be considered that the added method is performed regardless of any condition; otherwise, if a certain method for performing the above format alignment for DCI format 3_x is added after step 3 in the existing technique, and/or a similar determination is performed before the added method by using a method similar to step 4, and it may be considered that the added method is based on conditions.

For example, in the above example, the sidelink UE performing the format alignment for the DCI format 3_x is added into the example of the existing technique as the step 2B, and it is considered that the added method in the step 2B is performed regardless of any condition. For the format alignment for the DCI format 3_x that needs to be performed based on conditions, as a specific example, the sidelink UE performing the format alignment for the DCI format 3_x includes adding the following methods and conditions after step 4C of the DCI format alignment in the existing technique (for example, as step 4D):

after performing the above steps, that is, steps 0 to 4C, if the total number of sizes of different DCIs configured to monitor exceeds 4, and/or, the number of the sizes of different DCIs of RNTIs using C-RNTI or the RNTIs of sidelink transmission configured to monitor exceeds 3, then: if the number of information bits of DCI format 3_0 and/or DCI format 3_1 before appending padding bits is smaller than the payload size of DCI format 1_1 for scheduling the same cell, a certain number of padding bits is generated for DCI format 3_0 and/or DCI format 3_1, until the payload size of DCI format 3_0 and/or DCI format 3_1 is equal to the payload size of DCI format 1_1; and if the number of information bits of DCI format 3_0 and/or DCI format 3_1 before appending padding bits is greater than the payload size of DCI format 1_1 for scheduling the same cell, a certain number of padding bits are generated for DCI format 1_1, until the payload size of DCI format 3_0 and/or DCI format 3_1 is equal to the payload size of the DCI format 1_1.

Optionally, the sidelink UE performing the format alignment for the DCI format 3_x based on the conditions further includes: removing padding bits appended using at least one method in the process of performing the format alignment for the DCI format 3_x, when specific conditions are met. The specific conditions include at least one of the following: the total number of sizes of different DCIs configured to monitor exceeds a given first threshold; the total number of sizes of different DCIs using a specific RNTI configured to monitor exceeds a given second threshold; the total number of sizes of different DCIs configured to monitor does not exceed a given first threshold; the total number of sizes of different DCIs using a specific RNTI configured to monitor does not exceed a given second threshold. This method may also be similarly added in/before/after specific steps of DCI format alignment in the existing technique.

In a specific example, the sidelink UE performing format alignment for DCI format 3_x based on conditions includes adding the following step in step 4A of the DCI format alignment in the existing technique:

removing the padding bits appended in the following method: if the number of information bits of the DCI format 3_a monitored in a CSS and/or USS is equal to the payload size of the DCI format x_y monitored in a specific search space, appending one padding bit for the DCI format 3 a.

It should be noted that the DCI formats 3_a and 3_b in this example are only schematic numbers and are used to refer to different types of DCI formats, which should not be strictly compared with the existing technique and used to limit the effect in final actual use. For example, the DCI format 3_a may be DCI format 3_0 or DCI format 3_1 or other DCI format for scheduling sidelink transmission, and the DCI format 3 b may be DCI format 3_0 or DCI format 3_1 or other DCI format for scheduling sidelink transmission. In this example, the sidelink UE performing the format alignment for DCI format 3_x may include the above several methods. In different methods, the meanings of the DCI formats 3_a and 3_b may be the same or different. For example, in one method, the DCI format 3 a is DCI format 3_0, the DCI format 3 b is DCI format 3_1, and in another method, the DCI format 3 a is DCI format 3_1, and the DCI format 3_b is DCI format 3_0. The padding bits in this example may be zero padding bit.

For HARQ-based groupcast in a sidelink system, two options for HARQ-ACK feedback are generally considered in the existing technique: a first option is that the receiver UE of the groupcast only feeds an NACK back when the sidelink transmission is not successfully received, otherwise, the receiver UE does not feed HARQ-ACK information back after successfully receiving the sidelink transmission; a second option is that the receiver UE of the groupcast feeds an NACK back when the sidelink transmission is not successfully received, otherwise, the receiver UE feeds an ACK back after successfully receiving the sidelink transmission. For the transmitter UE of the groupcast, if the second option is used, a common processing method is that the transmitter UE considers the groupcast transmission is successful performed only after it determines that all receivers of the groupcast transmission feed an ACK back; otherwise, if any receiver of the groupcast transmission does not feed HARQ-ACK information back or feed an NACK back, the groupcast transmission is considered to be failed. If the transmitter UE performs one or more retransmissions for one groupcast transmission, the transmitter UE determines whether the groupcast transmission is successful according to sidelink HARQ-ACK feedback information corresponding to the last retransmission, and reports HARQ-ACK status of the broadcast transmission to the base station.

At present, the existing processing method only considers the HARQ-ACK feedback corresponding to the latest groupcast retransmission, and does not consider the HARQ-ACK feedback corresponding to the retransmission and/or the initial transmission before the groupcast, which has defects in some specific scenarios. Take a specific scenario as an example, in this scenario, the transmitter UE (referred to be as UE0) transmits groupcast data to two group members (referred to be as UE1 and UE2, respectively). After the initial transmission, if the UE0 receives ACK information fed back by the UE1 and NACK information fed back by the UE2, and the groupcast transmission is considered to be failed; then the UE0 retransmits the groupcast data, and receives ACK information fed back by the UE2 after the first retransmission, and the UE0 does not receive HARQ-ACK information fed back by the UE1. At this time, according to the existing mechanism, the UE0 will consider that the groupcast transmission is failed, but in fact the UE1 and the UE2 have successfully decoded the groupcast data in the initial transmission and the first retransmission and fed back the ACK respectively, that is, the groupcast transmission is actually successful.

In view of the above defect, a feasible method is that when determining whether the groupcast transmission is successful, the transmitter UE considers not only the HARQ-ACK feedback corresponding to the latest groupcast transmission/retransmission, but also the HARQ-ACK feedback corresponding to previous transmission/retransmission of the groupcast data. The method is enhancement at the transmitter UE side.

Another feasible method is enhancement at the receiver UE side of the groupcast. If the sidelink UE successfully decodes the sidelink shared channel (PSSCH), the method performs at least one of the following:

if the UE is configured as providing HARQ-ACK feedback information including ACK and NACK, and the sidelink control information (SCI) associated with the PSSCH indicates the sidelink resource used for the subsequent retransmission of the PSSCH, the UE decodes or does not decode the PSSCH and/or PSCCH in the sidelink resource used for the subsequent retransmission of the PSSCH, and feeds back the ACK on the PSFCH corresponding to the sidelink resource used for the subsequent retransmission of the PSSCH; and if the UE is configured as providing HARQ-ACK feedback information including NACK only, and the SCI associated with the PSSCH indicates the sidelink resource used for the subsequent retransmission of the PSSCH, the UE decodes or does not decode the PSSCH and/or PSCCH in the sidelink resource used for the subsequent retransmission of the PSSCH, and NOT feeds back the NACK on the PSFCH corresponding to the sidelink resource used for the subsequent retransmission of the PSSCH.

This method may be used all the time, or may be (pre)defined/(pre)configured to be enabled/disabled, or used only when certain conditions are met. Wherein, the specific condition may be that the UE is configured to use the second option of groupcast HARQ-ACK feedback. In addition, this method may also be used for receiving unicast services. Because the service being unicast or groupcast is configured at a high layer, the UE will not directly identify at a physical layer, whether the method is used may also be configured at the high layer.

The advantage of this method lies in that if the receiver UE has successfully received a sidelink transmission but missed subsequent retransmission of the sidelink transmission, the receiver UE will not feedback HARQ-ACK information for the missed retransmission in the existing technique, while the lack of this feedback information may be understood as an NACK by the transmitter UE; however, in the above method, if the receiver UE has successfully received a certain sidelink transmission, it will feeds back ACK information or does not feed NACK information back on a PSFCH corresponding to all retransmission positions of the acquired sidelink transmission. Therefore, no matter whether the retransmission at a certain retransmission position of the sidelink transmission is missed, the transmitter UE will not consider that the receiver fails to receive the sidelink transmission.

Embodiment 2

Figure 4:
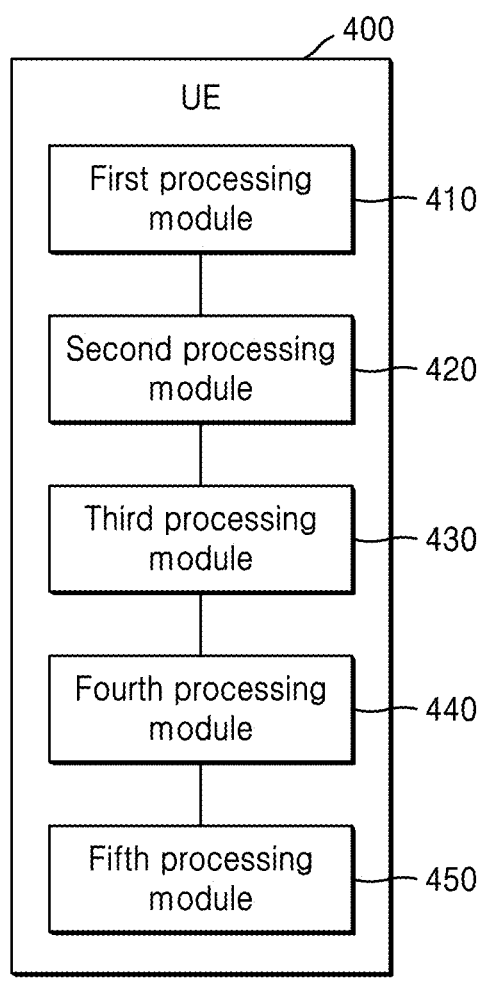
FIG. 4 illustrates a schematic structural diagram of a first UE according to an embodiment of the present application.

Based on the same inventive concept of the above embodiment, the embodiment of the present application further provides a first UE. The structural diagram of the first UE is as shown in FIG. 4, and the first UE 400 includes a first processing module 410, a second processing module 420, a third processing module 430, a fourth processing module 440, and a fifth processing module 450.

The first processing module 410 is configured to transmit a sidelink transmission request to a base station.

The second processing module 420 is configured to receive a SL grant transmitted by the base station, wherein scheduling information carried in the SL grant includes sidelink resources.

The third processing module 430 is configured to transmit the sidelink transmission to a second UE according to the scheduling information carried in the SL grant; the sidelink transmission includes at least one of transmission of the sidelink data on a sidelink data channel, transmission of the sidelink control information (SCI) corresponding to the sidelink data on a sidelink control channel.

The fourth processing module 440 is configured to receive first hybrid automatic repeat request acknowledgement (HARQ-ACK) feedback information transmitted by the second UE, wherein the first HARQ-ACK feedback information is used to determine whether the first UE needs to retransmit the sidelink transmission.

The fifth processing module 450 is configured to report second HARQ-ACK feedback information to the base station, and the second HARQ-ACK feedback information is used to indicate whether the sidelink transmission succeeds.

Optionally, the second HARQ-ACK feedback information comprises at least one of an acknowledgement (ACK), a non-acknowledgement (NACK), and a discontinuous transmission (DTX); wherein the DTX indicates that the first UE fails to receive the first HARQ-ACK feedback information.

Optionally, not reporting the second HARQ-ACK feedback information to the base station for implicitly indicating at least one of ACK, NACK, and DTX.

Optionally, a sidelink retransmission request signaling is reported to the base station, if the first UE determines that the sidelink transmission needs to be retransmitted and the sidelink resource indicated in the SL grant has been used.

Optionally, the sidelink retransmission request signaling carries at least the second HARQ-ACK feedback information indicating whether the sidelink transmission succeeds.

Optionally, information carried in any one of the second HARQ-ACK feedback information and the sidelink retransmission request signaling comprises at least one of the following:

a parameter indicating a service priority, a buffer status report (BSR), a scheduling request (SR), a parameter related to modulation and coding, a parameter related to power control, a sidelink channel state information (CSI), and information related to sidelink resource selection.

Optionally, the use of any one of the second HARQ-ACK feedback information, sidelink retransmission request signaling, includes at least one of the following:

a retransmission resource for requesting the sidelink transmission from the base station; and a transmission resource for requesting at least one other sidelink transmission from the base station.

Optionally, the scheduling information comprises N sidelink resources, and the manner of performing sidelink transmission according to the scheduling information carried in the SL grant comprises at least one of the following:

when N=1, the sidelink resource indicated in the SL grant has been used for an initial transmission or one retransmission of a given sidelink transport block (TB) of the first UE; and when N>1, a specific one sidelink resource of the N sidelink resources indicated in the SL grant is used for an initial transmission or one retransmission of the given sidelink TB of the first UE, and the remaining N−1 sidelink resources other than the specific one sidelink resource are used for another one or more retransmissions of the given sidelink TB of the first UE, and/or for transmission of another sidelink TBs of the first UE other than the given sidelink TB;

wherein, N is a positive integer.

Optionally, when N>1, after the first UE successfully transmits the sidelink TB, and/or after determining that the sidelink TB does not need to be retransmitted, releasing unused sidelink resource, and/or determining the use of the unused resource, if the N sidelink resources indicated in the SL grant still have an unused sidelink resource;

wherein, N is a positive integer.

Optionally, the releasing the unused sidelink resource comprises:

transmitting a sidelink resource release signaling to the base station, to notify the base station that the first UE releases the unused sidelink resource.

Optionally, the sidelink resource release signaling carries at least the second HARQ-ACK feedback information indicating whether the sidelink transmission succeeds.

Optionally, determining the use of unused resources, comprises:

determining that the unused resources are used for transmission of another sidelink TBs of the first UE.

Optionally, the first UE reports at least one of the second HARQ-ACK feedback information, the sidelink retransmission request signaling, and the sidelink resource release signaling, comprising at least one of the following:

determining, by the first UE, that retransmission is needed and that the sidelink retransmission request signaling needs to be transmitted to the base station; and transmitting, by the first UE, the second HARQ-ACK feedback information to the base station, wherein the second HARQ-ACK feedback information includes the NACK or the DTX, and the second HARQ-ACK feedback information is used as the sidelink retransmission request signaling;

determining, by the first UE, that the sidelink resources need to be released and that the sidelink resource release signaling needs to be transmitted to the base station; and transmitting, by the first UE, the second HARQ-ACK feedback information to the base station, and content of the second HARQ-ACK feedback information includes the ACK, and the second HARQ-ACK feedback information is used as the sidelink resource release signaling;

determining, by the first UE, that the retransmission is needed and that the sidelink retransmission request signaling needs to be transmitted to the base station; and transmitting, by the first UE, the sidelink retransmission request signaling to the base station, wherein the sidelink retransmission request signaling and the second HARQ-ACK feedback information are different signaling independent of each other; and determining, by the first UE, that the sidelink resources need to be released and that the sidelink resource release signaling needs to be transmitted to the base station; and transmitting, by the first UE, the sidelink resource release signaling to the base station, wherein the sidelink resource release signaling and the second HARQ-ACK feedback information are different signaling independent of each other.

Optionally, a manner of the first UE determining resources for reporting the second HARQ-ACK feedback information, comprising at least one of the following:

determining resources for reporting the second HARQ-ACK feedback information according to a resource position directly indicated in the first specific signaling; and determining resources for reporting the second HARQ-ACK feedback information according to at least one of a resource position of a second specific signaling, a resource position of a specific channel, a resource mapping relationship between the second specific signaling and the second HARQ-ACK feedback information, a resource mapping relationship between the specific channel and the second HARQ-ACK feedback information, and the information for deriving resources of feedback information.

Optionally, any one of a first specific signaling, the second specific signaling, and the specific channel comprises at least one of the following: an SL grant, a given sidelink transmission, a sidelink channel used for the given sidelink transmission, sidelink transmission scheduled by SL grant, a sidelink channel scheduled by SL grant, and a specific uplink signaling;

wherein the SL grant is an SL grant for scheduling the given sidelink transmission;

the sidelink transmission includes at least one of transmission of sidelink data on a sidelink data channel, transmission of sidelink control information (SCI) corresponding to the sidelink data on a sidelink control channel, and transmission of feedback message corresponding to the sidelink data on a sidelink feedback channel;

the sidelink channel includes at least one of a physical sidelink control channel (PSCCH), a physical sidelink shared channel (PSSCH), and a physical sidelink feedback channel (PSFCH);

and the specific uplink signaling includes at least one of uplink control information (UCI) and physical uplink shared channel (PUSCH).

Optionally, the first UE acquires information for determining resources for reporting the second HARQ-ACK feedback information in at least one of the following signaling or channels:

downlink control information (DCI);

a downlink physical shared channel (PDSCH) carrying the SL grant;

a downlink signaling for indicating the scheduling information of the sidelink transmission; and a higher layer signaling, the higher layer signaling including a radio resource control (RRC) configuration signaling.

Optionally, determining a priority between the transmission of the second HARQ-ACK feedback information and other specific transmission when the time domain resources used by the transmission of the second HARQ-ACK feedback information completely or partially overlap with the time domain resources used by the other specific transmissions;

determining, according to the priority, a first transmission state corresponding to the transmission of the second HARQ-ACK feedback information, wherein, the first transmission state includes at least one of: the delaying transmission of the second HARQ-ACK feedback information, dropping transmission of the second HARQ-ACK feedback information, transmitting the second HARQ-ACK feedback information and other specific transmission separately, transmitting the second HARQ-ACK feedback information and other specific transmission in a multiplexed manner, piggybacking the second HARQ-ACK feedback information on other specific transmission, and piggybacking the other specific transmission on the second HARQ-ACK feedback information;

determining, according to the priority, a second transmission state corresponding to other specific transmission, wherein, the second transmission state includes at least one of delaying the other specific transmission, dropping other specific transmission, transmitting the second HARQ-ACK feedback information and other specific transmission separately, piggybacking the second HARQ-ACK feedback information on other specific transmission, and piggybacking the other specific transmission on the second HARQ-ACK feedback information; and other specific transmission includes at least one of other uplink transmission, other downlink reception, other sidelink transmission, and other sidelink reception.

Optionally, determining the priority according to at least one of the priority between the uplink transmission/the downlink reception/the sidelink transmission/the sidelink reception, and the second HARQ-ACK feedback information, the priority of the channel used for transmission, the priority of the signaling type, and the priority parameters of the service corresponding to the transmission.

Optionally, the SL grant indicates to enable or disable HARQ-ACK feedback; the indicating enabling or disabling HARQ-ACK feedback comprises explicitly or implicitly indicating enabling or disabling HARQ-ACK feedback;

the explicitly indicating includes using a specific field in the SL grant to explicitly indicate to enable or disable HARQ-ACK feedback;

the implicitly indicating comprising at least one of the following:

implicitly indicating by using the number N of the sidelink resources scheduled in the SL grant;

implicitly indicating by using a time domain position of the sidelink resource scheduled in the SL grant;

implicitly indicating by using a frequency domain position of the sidelink resource scheduled in the SL grant;

implicitly indicating by using a code domain position of the sidelink resource scheduled in the SL grant;

implicitly indicating by using a time domain gap between sidelink resources scheduled in the SL grant;

implicitly indicating by using information of the sidelink resource scheduled in the SL grant;

implicitly indicating by using the type of sidelink resource scheduled in the SL grant; and implicitly indicating by using the presence of a sidelink feedback resource in the sidelink resource scheduled in the SL grant.

For the content that is not described in detail in the UE provided by the embodiment of the present application, reference may be made to the method for sidelink transmission. The beneficial effects that the UE can reach are the same as the method for sidelink transmission, and details are not described herein again.

The embodiments of this application shall have at least the following beneficial effects:

by transmitting a sidelink transmission request to a base station; receiving a SL grant transmitted by the base station, wherein scheduling information carried in the SL grant includes sidelink resources; transmitting the sidelink transmission to a second UE according to the scheduling information carried in the SL grant; receiving first HARQ-ACK feedback information transmitted by the second UE, wherein the first HARQ-ACK feedback information is used to determine whether the first UE needs to retransmit the sidelink transmission; reporting second HARQ-ACK feedback information to the base station, and the second HARQ-ACK feedback information is used to indicate whether the sidelink transmission succeeds, the sidelink resources for retransmission are quickly requested after the sidelink transmission fails, so that the timeliness of retransmission of the sidelink transmission is improved.

Figure 5:
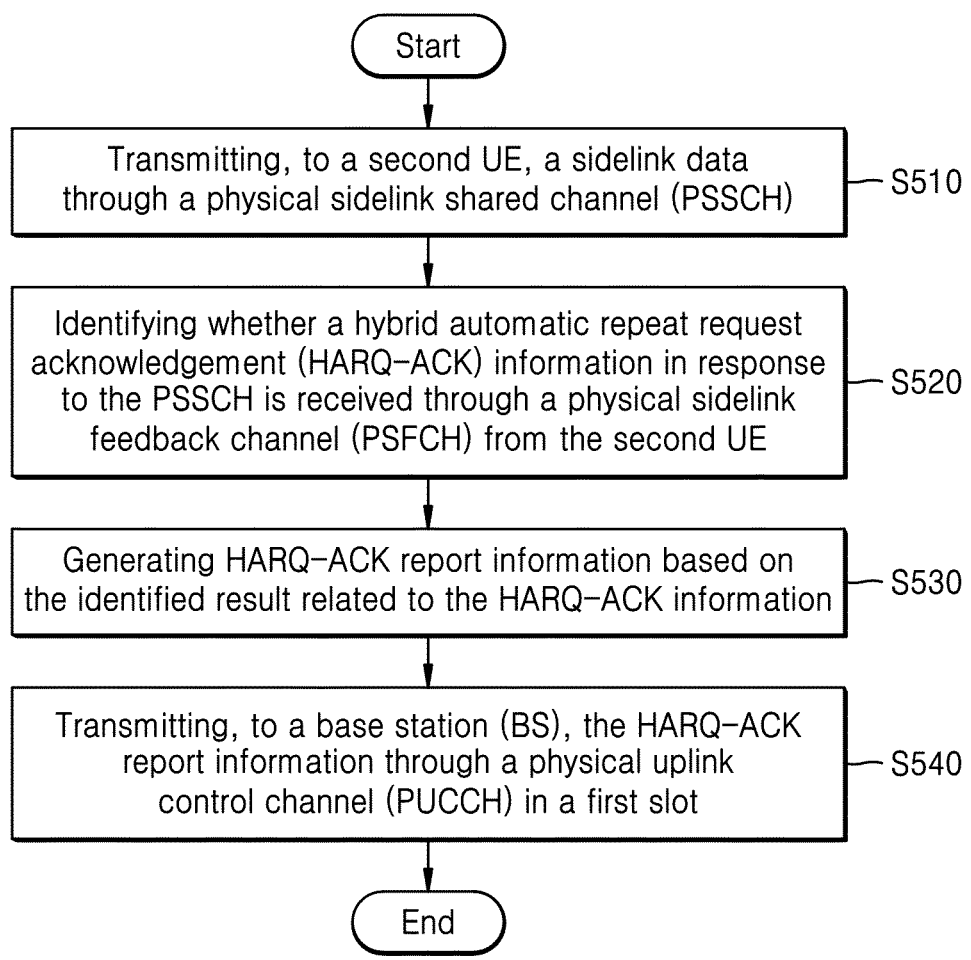
FIG. 5 illustrates a flow chart of a method performed by a first User equipment (UE) in a wireless communication system according to an embodiment of the disclosure.

FIG. 5 is a flow chart of a method performed by a first User equipment (UE) in a wireless communication system according to an embodiment of the disclosure.

At step S510, the first UE may transmit, to a second UE, a sidelink data through a physical sidelink shared channel (PSSCH).

In an exemplary embodiment, the first UE may transmit a first sidelink data in a third slot determined based on a fourth slot of receiving a sidelink grant and a second offset.

In an exemplary embodiment, the third slot may be scheduled by the sidelink grant included in downlink control information (DCI).

At step S520, the first UE may identify whether a hybrid automatic repeat request acknowledgement (HARQ-ACK) information in response to the PSSCH is received through a physical sidelink feedback channel (PSFCH) from the second UE.

At step S530, the first UE may generate HARQ-ACK report information based on the identified result related to the HARQ-ACK information.

In an exemplary embodiment, the HARQ-ACK report information may be generated as a non-acknowledgement (NACK) based on a determination that the HARQ-ACK information is not received from the second UE.

In an exemplary embodiment, the HARQ-ACK report information may be generated as an acknowledgement (ACK) based on a determination that at least one HARQ-ACK information received from the second UE is ACK.

In an exemplary embodiment, the HARQ-ACK report information may be generated as a non-acknowledgement (NACK) based on a determination that at least one ACK is not received from the second UE in the HARQ-ACK information.

At step S540, the first UE may transmit, to a base station (BS), the HARQ-ACK report information through a physical uplink control channel (PUCCH) in a first slot.

In an exemplary embodiment, the first slot may be determined based on a second slot for the PSFCH and a first offset.

In an exemplary embodiment, a value of the first offset may be indicated by a higher layer signaling.

In an exemplary embodiment, a value of the first offset may be indicated by a sidelink grant included in downlink control information (DCI).

In an exemplary embodiment, the UE may transmit the HARQ-ACK report information to the BS, based on a determination that a configured condition is met.

Figure 6:
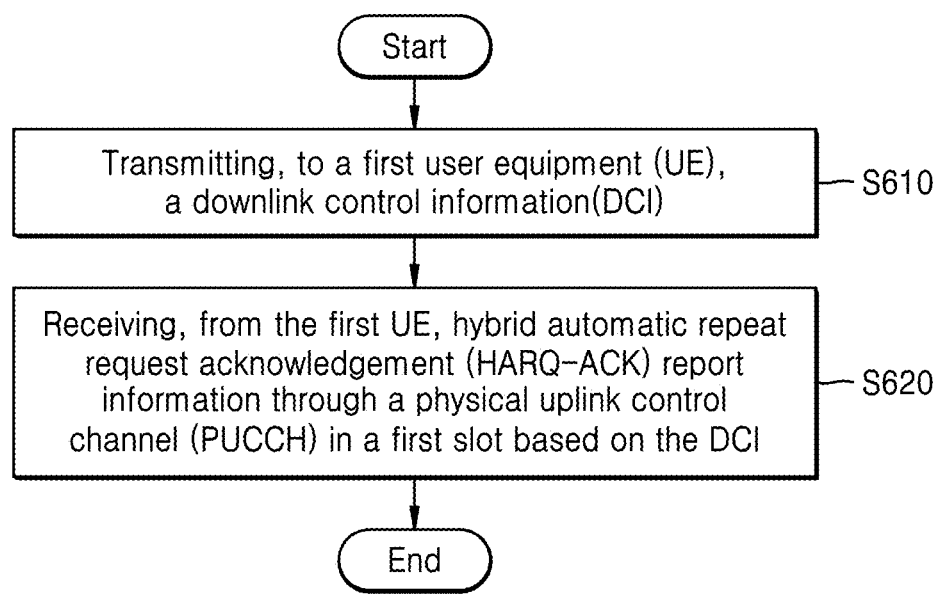
FIG. 6 illustrates a flow chart of a method performed by a base station (BS) in a wireless communication system according to an embodiment of the disclosure.

FIG. 6 is a flow chart of a method performed by a base station (BS) in a wireless communication system according to an embodiment of the disclosure.

At step S610, the BS may transmit, to a first user equipment (UE), a downlink control information (DCI).

At step S620, the BS may receive, from the first UE, hybrid automatic repeat request acknowledgement (HARQ-ACK) report information through a physical uplink control channel (PUCCH) in a first slot based on the DCI.

In an exemplary embodiment, the HARQ-ACK report information based on an identified result related to HARQ-ACK information may be received through a physical sidelink feedback channel (PSFCH) from a second UE.

In an exemplary embodiment, the first slot may be determined based on a second slot for the PSFCH and a first offset.

In an exemplary embodiment, a value of the first offset may be indicated by a higher layer signaling.

In an exemplary embodiment, a value of the first offset may be indicated by a sidelink grant included in the DCI.

Figure 7:
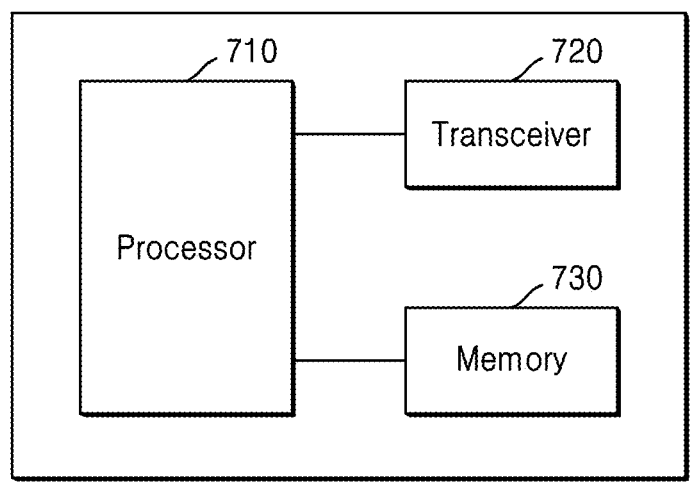
FIG. 7 schematically illustrates the base station according to an embodiment of the disclosure.

FIG. 7 schematically illustrates the base station according to an embodiment of the disclosure.

Referring to the FIG. 7, the Base station 700 may include a processor 710, a transceiver 720 and a memory 730. However, all of the illustrated components are not essential. The Base station 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the Base station 700 may be implemented by the processor 710.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the Base station 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

Figure 8:
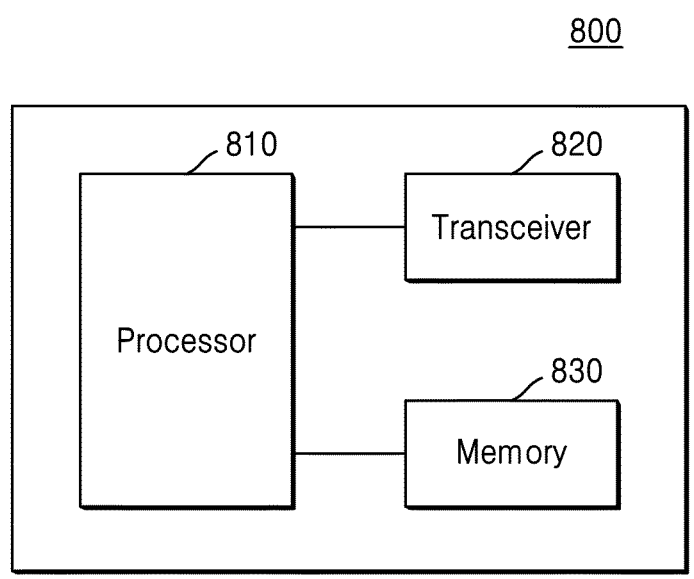
FIG. 8 schematically illustrates a user equipment (UE) according to an embodiment of the disclosure.

FIG. 8 schematically illustrates a user equipment (UE) according to an embodiment of the disclosure.

Referring to the FIG. 8, the UE 800 may include a processor 810, a transceiver 820 and a memory 830. However, all of the illustrated components are not essential. The UE 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the UE 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the UE 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

In an exemplary embodiment, the processor 810 may be configured to control the transceiver 820 to transmit, to a second UE, a sidelink data through a physical sidelink shared channel (PSSCH).

In an exemplary embodiment, the processor 810 may be configured to identify whether a hybrid automatic repeat request acknowledgement (HARQ-ACK) information in response to the PSSCH is received through a physical sidelink feedback channel (PSFCH) from the second UE, In an exemplary embodiment, the processor 810 may be configured to generate HARQ-ACK report information based on the identified result related to the HARQ-ACK information, and In an exemplary embodiment, the processor 810 may be configured to control the transceiver 820 to transmit, to a base station (BS), the HARQ-ACK report information through a physical uplink control channel (PUCCH) in a first slot, wherein the first slot is determined based on a second slot for the PSFCH and a first offset.

In an exemplary embodiment, the processor 810 may be configured to control the transceiver to transmit a first sidelink data in a third slot determined based on a fourth slot of receiving a sidelink grant and a second offset. The third slot may be scheduled by the sidelink grant included in downlink control information (DCI).

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, operations, methods, other steps in the flows, measures and solutions already discussed in the present invention may also be alternated, changed, rearranged, decomposed, combined or deleted. Further, existing techniques having the operations, methods, the steps in the flows, measures and solutions already discussed in the present invention may also be alternated, changed, rearranged, decomposed, combined or deleted.

The above-described descriptions are merely part of embodiments of the present invention. It should be noted that, for a person of ordinary skill in the art, various modifications and embellishments can be made without departing from the principle of the present invention. Such modifications and embellishments shall be regarded as falling into the protection scope of the present invention.

What is claimed is:

1. A method performed by a first user equipment (UE) in a wireless communication system, the method comprising:
receiving, from a base station (BS), information about a first offset;
transmitting, to a second UE, a sidelink data through a physical sidelink shared channel (PSSCH);
identifying whether a hybrid automatic repeat request acknowledgement (HARQ-ACK) information in response to the PSSCH is received through a physical sidelink feedback channel (PSFCH) from the second UE in a first slot;

generating HARQ-ACK report information based on an identified result related to the HARQ-ACK information; and transmitting, to the BS, the HARQ-ACK report information through a physical uplink control channel (PUCCH) in a second slot, wherein the second slot is determined based on the first slot and the first offset, and wherein the HARQ-ACK report information is generated based on whether at least one HARQ-ACK information corresponding to acknowledgement (ACK) is received from the second UE, in case of transmitting the sidelink data based on a groupcast.

2. The method of claim 1, wherein a value of the first offset is indicated by a higher layer signaling.

3. The method of claim 1, wherein a value of the first offset is indicated by a sidelink grant included in downlink control information (DCI).

4. The method of claim 1, wherein the HARQ-ACK report information is generated as a non-acknowledgement (NACK) based on a determination that the HARQ-ACK information is not received from the second UE.

5. The method of claim 1, wherein the HARQ-ACK report information is generated as the ACK based on a determination that the at least one HARQ-ACK information received from the second UE is ACK, in case that transmitting of the sidelink data is the groupcast and the at least one HARQ-ACK information includes ACK or NACK.

6. The method of claim 1, wherein the HARQ-ACK report information is generated as a NACK based on a determination that at least one ACK is not received from the second UE in the HARQ-ACK information, in case that transmitting of the sidelink data is the groupcast and the HARQ-ACK information includes ACK or NACK.

7. The method of claim 1, wherein the UE transmits the HARQ-ACK report information to the BS, based on a determination that a configured condition is met.

8. The method of claim 1, wherein the transmitting of the sidelink data through the PSSCH comprises:

transmitting a first sidelink data in a third slot determined based on a fourth slot of receiving a sidelink grant and a second offset.

9. The method of claim 8, wherein the third slot is scheduled by the sidelink grant included in downlink control information (DCI).

10. The method of claim 1, wherein the HARQ-ACK report information is generated as the ACK based on a determination that each HARQ-ACK information through the PSFCH is not received from the second UE, in case that transmitting of the sidelink data is groupcast and the HARQ-ACK information includes only NACK.

11. A method performed by a base station (BS) in a wireless communication system, the method comprising:

transmitting, to a first user equipment (UE), information about a first offset; and receiving, from the first UE, hybrid automatic repeat request acknowledgement (HARQ-ACK) report information through a physical uplink control channel (PUCCH) in a second slot based on the information on the first offset, wherein the second slot is determined based on a first slot and the first offset, wherein the HARQ-ACK report information is generated based on an identified result related to HARQ-ACK information that is received by the first UE through a physical sidelink feedback channel (PSFCH) from a second UE in the first slot, and wherein the HARQ-ACK report information is generated based on whether at least one HARQ-ACK information corresponding to acknowledgement (ACK) is received from the second UE, in case of transmitting a sidelink data based on a groupcast.

12. The method of claim 11, wherein a value of the first offset is indicated by a higher layer signaling.

13. The method of claim 11, wherein a value of the first offset is indicated by a sidelink grant included in downlink control information (DCI).

14. A first user equipment (UE), the UE comprising:

a transceiver; and at least one processor coupled with the transceiver and configured to:

control the transceiver to receive, from a base station (BS), information about a first offset, control the transceiver to transmit, to a second UE, a sidelink data through a physical sidelink shared channel (PSSCH), identify whether a hybrid automatic repeat request acknowledgement (HARQ-ACK) information in response to the PSSCH is received through a physical sidelink feedback channel (PSFCH) from the second UE, in a first slot, generate HARQ-ACK report information based on an identified result related to the HARQ-ACK information, and control the transceiver to transmit, to the BS, the HARQ-ACK report information through a physical uplink control channel (PUCCH) in a second slot, wherein the second slot is determined based on the first slot and the first offset, and wherein the HARQ-ACK report information is generated based on whether at least one HARQ-ACK information corresponding to acknowledgement (ACK) is received from the second UE, in case of transmitting the sidelink data based on a groupcast.

15. The UE of claim 14, wherein a value of the first offset is indicated by a higher layer signaling.

16. The UE of claim 14, wherein a value of the first offset is indicated by a sidelink grant included in downlink control information (DCI).

17. The UE of claim 14, wherein the HARQ-ACK report information is generated as a non-acknowledgement (NACK) based on a determination that the HARQ-ACK information is not received from the second UE.

18. The UE of claim 14, wherein the HARQ-ACK report information is generated as the ACK based on a determination that the at least one HARQ-ACK information received from the second UE is ACK, in case that transmitting of the sidelink data is the groupcast and the at least one HARQ-ACK information includes ACK or NACK.

19. The UE of claim 14, wherein the HARQ-ACK report information is generated as a NACK based on a determination that at least one ACK is not received from the second UE in the HARQ-ACK information, in case that transmitting of the sidelink data is the groupcast and the HARQ-ACK information includes ACK or NACK.

20. The UE of claim 14,
wherein the HARQ-ACK report information is generated as the ACK based on a determination that each HARQ-ACK information through the PSFCH is not received from the second UE, in case that transmitting of the sidelink data is groupcast and the HARQ-ACK information includes only NACK.

* * * * *